United States Patent
Masui et al.

(10) Patent No.: US 7,142,486 B2
(45) Date of Patent: Nov. 28, 2006

(54) SIGNAL PROCESSING METHOD AND SIGNAL PROCESSING APPARATUS

(75) Inventors: Naruhiro Masui, Kanagawa (JP); Hidetoshi Ema, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 580 days.

(21) Appl. No.: 10/109,696

(22) Filed: Apr. 1, 2002

(65) Prior Publication Data

US 2002/0196717 A1    Dec. 26, 2002

(30) Foreign Application Priority Data

| Apr. 2, 2001 | (JP) | .......... 2001-103731 |
| Apr. 2, 2001 | (JP) | .......... 2001-103746 |
| Apr. 2, 2001 | (JP) | .......... 2001-103762 |
| Apr. 2, 2001 | (JP) | .......... 2001-103776 |
| Sep. 13, 2001 | (JP) | .......... 2001-278494 |

(51) Int. Cl.
  *G11B 7/095* (2006.01)
  *G11B 7/00* (2006.01)

(52) U.S. Cl. ............... 369/44.29; 369/44.34; 369/53.37

(58) Field of Classification Search ............ 369/44.29, 369/44.35, 44.36, 44.41, 44.26, 44.27, 44.34, 369/53.2, 53.22, 53.37
See application file for complete search history.

(56) References Cited

U.S. PATENT DOCUMENTS

| 4,795,958 | A | * | 1/1989 | Nakamura et al. ......... 318/625 |
| 5,710,748 | A | * | 1/1998 | Hofer ....................... 369/44.35 |
| 5,886,964 | A | * | 3/1999 | Fujita ....................... 369/44.37 |
| 5,953,296 | A | * | 9/1999 | Baba ........................ 369/44.32 |
| 6,101,165 | A | * | 8/2000 | Korogi et al. ............... 369/126 |
| 6,483,787 | B1 | * | 11/2002 | Sugasawa et al. ....... 369/44.13 |
| 2002/0034147 | A1 | * | 3/2002 | Lee et al. .............. 369/112.24 |
| 2002/0150004 | A1 | * | 10/2002 | Kadlec ..................... 369/44.29 |
| 2003/0012093 | A1 | * | 1/2003 | Tada et al. ............... 369/44.27 |

FOREIGN PATENT DOCUMENTS

| JP | 63050923 A | * | 3/1988 |
| JP | 11-238245 |   | 8/1999 |

* cited by examiner

*Primary Examiner*—Brian E. Miller
*Assistant Examiner*—Peter Vincent Agustin
(74) *Attorney, Agent, or Firm*—Dickstein Shapiro LLP

(57) ABSTRACT

A signal processing apparatus is provided with a converter for converting at least one analog light detection signal into a digital light detection signal, and a signal generator for generating at least one servo error signal by subjecting the digital light detection signal to a predetermined operation process. The signal generator has a function of modifying contents of the operation process.

26 Claims, 31 Drawing Sheets

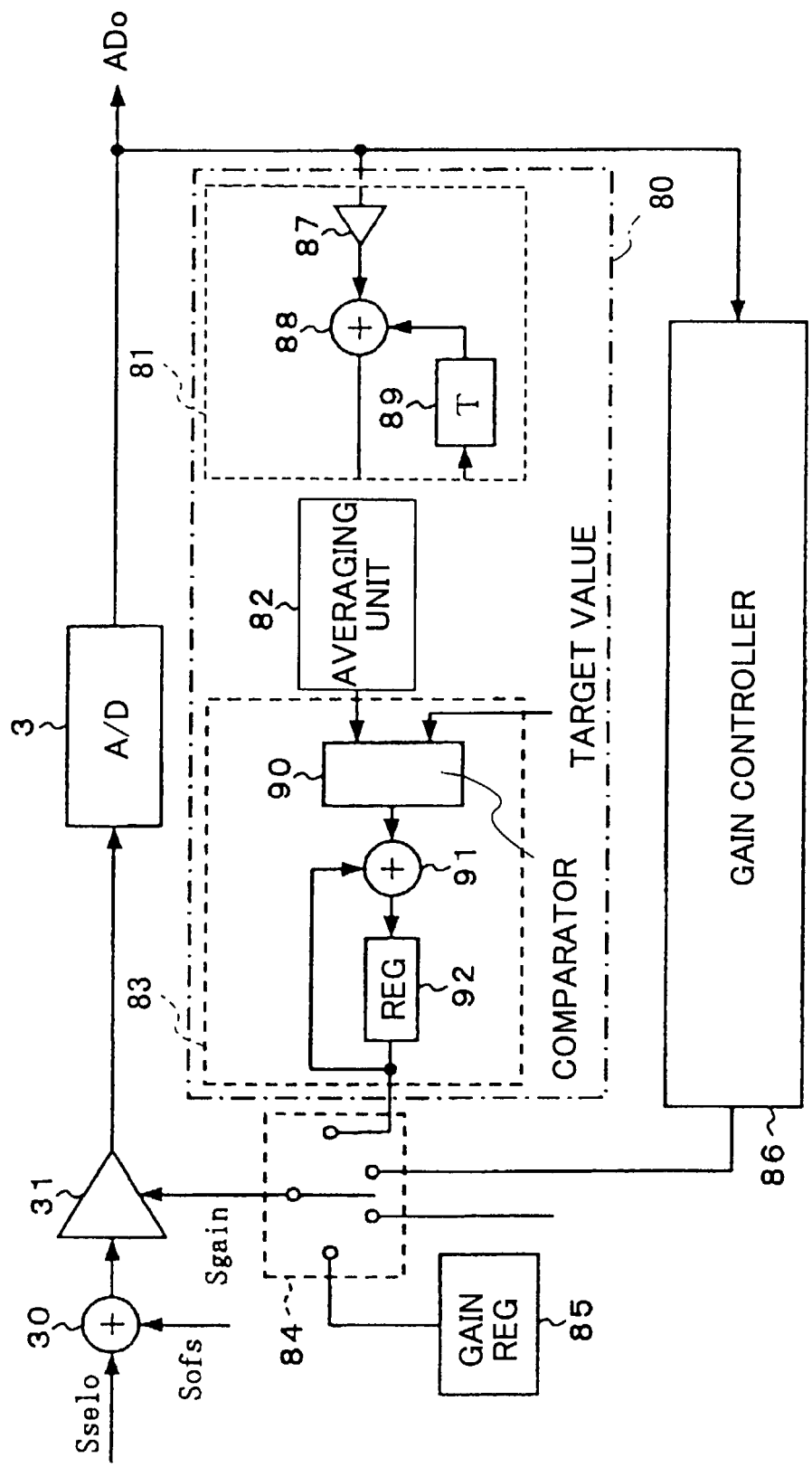

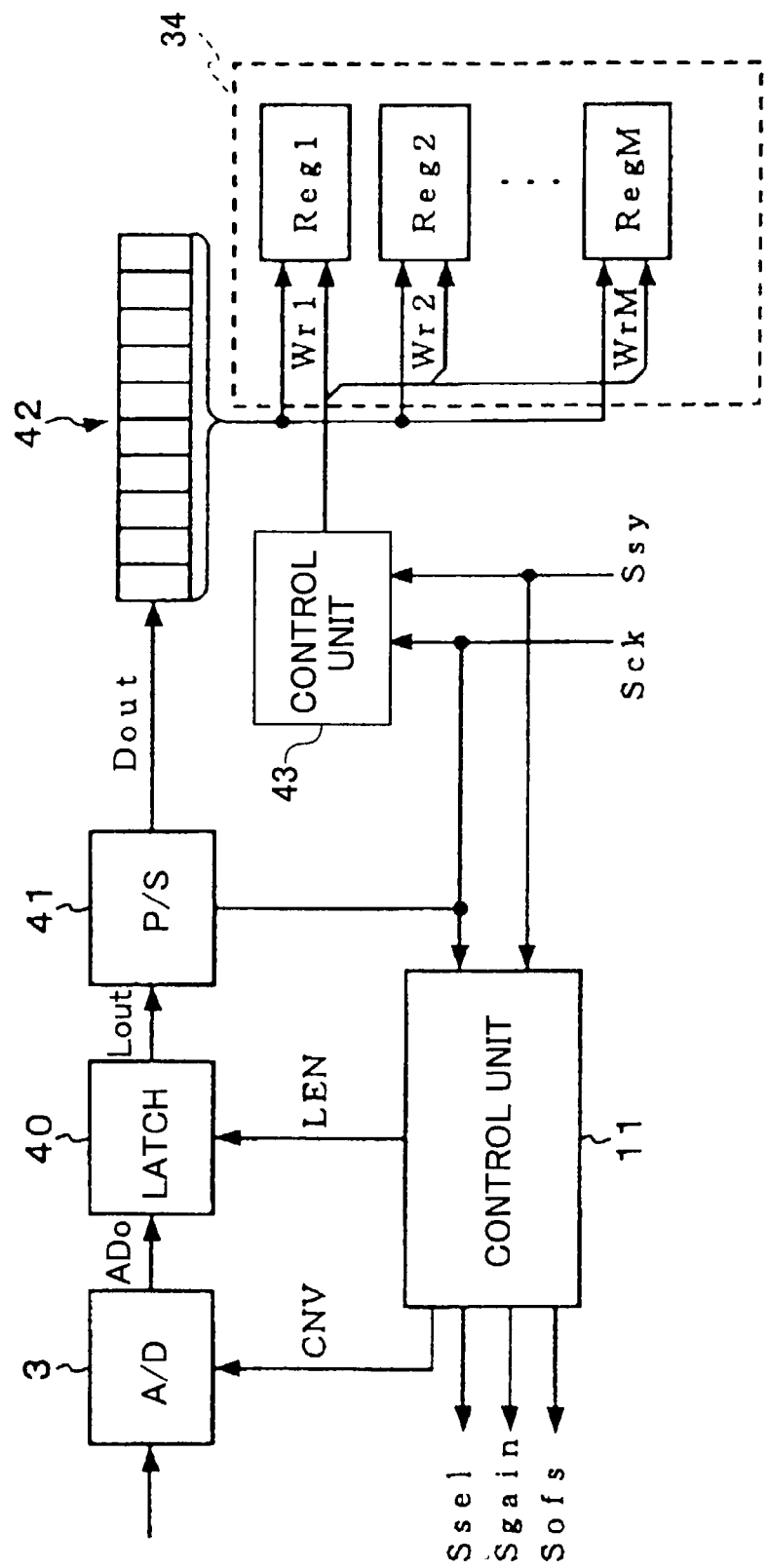

SIGNAL PROCESSING METHOD AND SIGNAL PROCESSING APPARATUS

BACKGROUND OF THE INVENTION

This application claims the benefit of Japanese Patent Applications No. 2001-103731 filed Apr. 2, 2001, No. 2001-103746 filed Apr. 2, 2001, No. 2001-103762 filed Apr. 2, 2001, No. 2001-103776 filed Apr. 2, 2001, and No. 2001-278494 filed Sep. 13, 2001, in the Japanese Patent Office, the disclosures of which are hereby incorporated by reference.

1. Field of the Invention

The present invention generally relates to signal processing methods and signal processing apparatuses, and more particularly to a signal processing method which is suited for carrying out a predetermined signal processing with respect to a light detection signal that is obtained by detecting light received via an information recording medium in an information recording and/or reproducing apparatus such as a CD-ROM drive apparatus, CD-R drive apparatus, CD-RW drive apparatus, DVD-ROM drive apparatus, DVD-R drive apparatus, DVD-RW drive apparatus, DVD-RAM drive apparatus, MD drive apparatus and MO drive apparatus, and to a signal processing apparatus which employs such a signal processing method. CD refers to compact disk, DVD refers to digital versatile disk, MD refers to magnetic disk, and MO refers to magneto-optical disk.

2. Description of the Related Art

In an optical disk drive apparatus, for example, a laser beam is irradiated on an optical information recording medium such as an optical disk, and the laser beam reflected by the optical disk is received and detected by an optical pickup. More particularly, the reflected laser beam is detected by a light receiving element such as a photodetector (PD). A light detection current is output from the photodetector and is supplied to a signal processing unit. Generally, the light detection current is a weak current. Hence, the light detection current is usually subjected to a current-to-voltage conversion so as to generate a light detection signal, and the light detection signal is supplied to the signal processing unit. A high signal-to-noise (S/N) ratio is required of the light detection signal, so as to guarantee a high reproduction quality and a stable servo operation.

An amount of light received by the photodetector and a servo error signal gain vary due to inconsistencies in the amount of light irradiated on the optical disk, inconsistencies in the reflectivity of the optical disk, and inconsistencies in the characteristics of the individual optical pickups. In order to compensate for such inconsistencies, a gain adjustment is made in each signal processing unit.

The optical pickup is moved in a radial direction of the optical disk during a so-called seek operation. Hence, the optical pickup and a circuit board on which the signal processing unit and the like are mounted are, in general, connected by a flexible printed circuit (FPC) substrate which can be bent freely, so as not to interfere with the movement of the optical pickup. A transmission path for the light detection signal is provided on this FPC substrate.

Various kinds of optical disks have been proposed in recent years. In addition, information recording and/or reproducing apparatuses which are operable with different kinds of optical disks having mutually different formats have also been proposed, so as to achieve optical disk compatibility among the information recording and/or reproducing apparatuses to a certain extent. Furthermore, various optical pickups have also been proposed for use in such information recording and/or reproducing apparatuses which achieve optical disk compatibility. There are demands to reduce the size and cost and to improve the performance of such optical pickups.

However, in the conventional information recording and/or reproducing apparatuses, the structure and circuit characteristics required of the signal processing unit differ for each of the optical pickups having the different structures corresponding to the different kinds of optical disks. Particularly, the structure of a processing section for generating a servo error signal differs for each optical pickup corresponding to each kind of optical disk. For this reason, it is necessary to design a signal processing unit (or signal processing integrated circuit) for each optical pickup corresponding to each kind of optical disk. As a result, there are problems in that it is difficult to reduce the time required to design and develop the signal processing unit and that it is difficult to reduce the cost of the signal processing unit.

Moreover, in the information recording and/or reproducing apparatus which is operable with the different kinds of optical disks having the mutually different media formats to achieve the optical disk compatibility, a plurality of kinds of signal processing units must be provided if the different kinds of optical disks require different structures and circuit characteristics of the signal processing unit. Consequently, the need to provide a plurality of signal processing units makes it difficult to reduce the size of the signal processing apparatus of the information recording and/or reproducing apparatus.

On the other hand, when an attempt is made to increase as much as possible a common part which may be used in common for each of the plurality of signal processing units, the specifications required of the optical pickup become extremely severe, thereby making the structure of the optical pickup complex and expensive. For this reason, it is difficult from the practical point of view to provide a large common part which may be used in common for each of the plurality of signal processing units.

Accordingly, a method of eliminating the above described problems was proposed in a Japanese Laid-Open Patent Application No. 11-238245, for example. According to this proposed method, the optical pickup converts the light detection current into the light detection signal by carrying out the current-to-voltage conversion, and this light detection signal is subjected to an analog-to-digital (A/D) conversion. Processes which are carried out thereafter, such as a process of extracting a reproduced RF signal and a process of computing an RF matrix for the various servo operations, are realized by a digital signal processing. Moreover, an operation process for generating a tracking error signal, switching of various servo gains, and a switching of a passband of a bandpass filter when extracting an address from a wobbled groove of the optical disk, are carried out depending on the media format of the optical disk. As a result, it is possible to realize a signal processing apparatus which carries out all of the various processes by the digital signal processing using a relatively simple structure.

However, according to the signal processing apparatus employing this previously proposed method, a processing section (or operation unit) must be provided with respect to each of the required servo error signals. In addition, in order to obtain the servo error signals which are computed by different operations due to the differences among the media formats of the optical disks, it is not only necessary to provide different processing sections for the servo error signals depending on the media format, but also to switch and use one of the processing sections depending on the media format of the optical disk in use. Consequently, there is a problem in that it is difficult to further reduce the size of the signal processing apparatus. Furthermore, if the structure of the optical pickup is modified and the computations for obtaining the servo error signal needs to be changed in accordance with the modification, there is another problem in that a circuit modification must be made in the signal processing apparatus depending on the structural modification of the optical pickup.

SUMMARY OF THE INVENTION

Accordingly, it is a general object of the present invention to provide a novel and useful signal processing method and signal processing apparatus, in which the problems described above are eliminated.

Another and more specific first object of the present invention is to provide a signal processing method and a signal processing apparatus, which can share a processing section for various servo error signals, easily cope with a modification in computations for obtaining the servo error signal, and compute the servo error signal using a minimum structure even when the computations for obtaining the servo error signal differs depending on a medial format of each of a plurality of different kinds of information recording media, so as to achieve information recording medium compatibility.

Still another object of the present invention is to provide a signal processing apparatus comprising digital signal conversion means for converting at least one analog light detection signal into a digital light detection signal; and servo error signal generating means for generating at least one servo error signal by subjecting the digital light detection signal to a predetermined operation process, where said servo error signal generating means includes operation content modifying means for modifying contents of the operation process. According to the signal processing apparatus of the present invention, the effects that are obtainable are that, it is possible to easily cope with a situation where the operation process for computing the servo error signal changes due to a change in the structure of an optical pickup, without the need to modify the circuit structure.

A further object of the present invention is to provide a signal processing apparatus comprising signal output switching means for inputting light detection signals and switching outputs to a plurality of kinds of circuit stages; and signal output switching control means for controlling the switching of outputs of said signal output switching means according to an output rule which is programmed in advance. According to the signal processing apparatus of the present invention, the effects that are obtainable are that, regardless of input terminal to which the light detection signals from a plurality of light receiving elements are supplied, it is possible to cope with each situation by programming the signal output switching control means. As a result, it is possible to improve the degree of freedom of design, including the arrangement of the light receiving elements, the arrangement of the terminals, and the arrangement with which parts of an optical pickup such as light sources and LD drivers may be arranged.

Another object of the present invention is to provide a signal processing apparatus comprising signal output switching means for inputting light detection signals and switching outputs to a plurality of kinds of circuit stages; temporary holding means for temporarily holding the light detection signals output from said signal output switching means; operation process means for carrying out an operation process of the plurality of kinds of circuit stages based on the light detection signals held by said temporary holding means; and signal holding control means for generating hold signals for storing the light detection signals output from said signal output switching means in said temporary holding means according to a hold rule which is programmed in advance and controlling the holding of said temporary holding means based on the hold signals. According to the signal processing apparatus of the present invention, it is also possible to obtain the above described effects.

Still another object of the present invention is to provide a signal processing apparatus comprising signal output switching means for switching output of analog light detection signals to a plurality of kinds of circuit stages; digital signal conversion means for time-sequentially converting the light detection signals output from said signal output switching means from analog signals into digital signals; transfer means for transferring the light detection signals output from said digital signal conversion means; and operation process means for carrying out operation processes of the plurality of circuit stages based on the light detection signals transferred by said transfer means. According to the signal processing apparatus of the present invention, digital signals can be transferred on signal lines of a FPC substrate forming the transfer means. Since the signal lines may be arranged close to each light receiving element which outputs the analog light detection signal, it becomes unnecessary to transfer the light detection signals which are often signals having small amplitudes over a long distance, thereby making the light detection signals less likely to be affected by noise. In addition, the process in the operation process means can be realized by a digital signal processing, and it is possible to simplify the process and carry out the process using a simple structure.

A further object of the present invention is to provide a signal processing apparatus comprising signal output switching means for switching output of analog light detection signals to a plurality of kinds of circuit stages; digital signal conversion means for time-sequentially converting the light detection signals output from said signal output switching means from analog signals into digital signals; a plurality of first holding means for temporarily holding the digital signals output from said digital signal conversion means; operation process means for carrying out operation processes of the plurality of circuit stages based on the digital signals held by said first holding means; a plurality of second holding means for temporarily holding the output signals of said operation process means; and transfer means for transferring the output signals held by said second holding means or the light detection signals held by said first holding means and a portion of the output signals held by said second holding means. The number of transfer data may decrease by transferring each of the light detection signal data prior to the operation process, and in this case, it is possible to reduce the transfer rate according to the present invention. As a result, it is possible to reduce unwanted radiation.

Another object of the present invention is to provide a signal processing apparatus comprising analog signal processing means for inputting analog light detection signals and carrying out an analog signal processing in an RF signal band; signal output switching means for switching output of the analog light detection signals and the light detection signals output from said analog signal processing means to a plurality of kinds of circuit stages; digital signal conversion means for time-sequentially converting the light detection signals output from said signal output switching means from analog signals into digital signals; transfer means for transferring the light detection signals output from said digital signal conversion means; and operation process means for carrying out operation processes of the plurality of circuit stages based on the light detection signals transferred by said transfer means. According to the signal processing apparatus of the present invention, the analog signal processing means is used for the portion which requires the signal processing in the RF band. In addition, since the analog-to-digital (A/D) conversion is carried out and the digital data is transferred when the required band becomes narrow, it is possible to prevent signal deterioration caused by noise during the data transfer, even when a high-speed A/D converter is not used. Moreover, the same circuit can be used for the light detection signals prior to the generation of the other servo error signals, and the transfer signal lines can also be shared. As a result, it is possible to reduce the circuit scale and to reduce the number of transfer signal lines.

Still another object of the present invention is to provide a signal processing apparatus comprising signal output switching means for switching output of analog light detection signals to a plurality of kinds of circuit stages; signal output switching control means for controlling the switching of outputs of said signal output switching means according to an output rule which is programmed in advance; digital signal conversion means for time-sequentially converting the light detection signals output from said signal output switching means from analog signals into digital signals; transfer means for transferring the light detection signals output from said digital signal conversion means; and operation process means for carrying out operation processes of the plurality of circuit stages based on the light detection signals transferred by said transfer means. According to the signal processing apparatus of the present invention, it is possible to obtain the above described effects, and it is also possible to easily realize an integrated circuit which is suited for being mounted on an optical pickup to process light detection signals output from light receiving elements and to realize an information recording and/or reproducing apparatus which uses such an integrated circuit.

A further object of the present invention is to provide a signal processing apparatus comprising signal output switching means for switching output of analog light detection signals to a plurality of kinds of circuit stages; signal output switching control means for controlling the switching of outputs of said signal output switching means according to an output rule which is programmed in advance; digital signal conversion means for time-sequentially converting the light detection signals output from said signal output switching means from analog signals into digital signals; a plurality of first holding means for temporarily holding the digital signals output from said digital signal conversion means; operation process means for carrying out operation processes of the plurality of circuit stages based on the light detection signals held by said first holding means; a plurality of second holding means for temporarily holding the output signals of said operation process means; and transfer means for transferring the output signals held by said second holding means or the light detection signals held by said first holding means and a portion of the output signals held by said second holding means. According to the signal processing apparatus of the present invention, it is possible to obtain the above described effects, and it is also possible to easily realize an integrated circuit which is suited for being mounted on an optical pickup to process light detection signals output from light receiving elements and to realize an information recording and/or reproducing apparatus which uses such an integrated circuit.

Another object of the present invention is to provide a signal processing apparatus comprising analog signal processing means for inputting analog light detection signals and carrying out an analog signal processing in an RF signal band; signal output switching means for switching output of the analog light detection signals and the light detection signals output from said analog signal processing means to a plurality of kinds of circuit stages; signal output switching control means for controlling the switching of outputs of said signal output switching means according to an output rule which is programmed in advance; digital signal conversion means for time-sequentially converting the light detection signals output from said signal output switching means from analog signals into digital signals; transfer means for transferring the light detection signals output from said digital signal conversion means; and operation process means for carrying out operation processes of the plurality of circuit stages based on the light detection signals transferred by said transfer means. According to the signal processing apparatus of the present invention, it is possible to obtain the above described effects, and it is also possible to easily realize an integrated circuit which is suited for being mounted on an optical pickup to process light detection signals output from light receiving elements and to realize an information recording and/or reproducing apparatus which uses such an integrated circuit.

Still another object of the present invention is to provide a signal processing apparatus comprising signal output switching means for switching output of analog light detection signals to a plurality of kinds of circuit stages; digital signal conversion means for time-sequentially converting the light detection signals output from said signal output switching means from analog signals into digital signals; transfer means for transferring the light detection signals output from said digital signal conversion means; temporary holding means for temporarily holding the light detection signals transferred by said transfer means; operation process means for carrying out operation processes of the plurality of circuit stages based on the light detection signals held by said temporary holding means; and signal holding control means for generating hold signals for storing the light detection signals output from said signal output switching means in said temporary holding means according to a hold rule which is programmed in advance and controlling the holding of said temporary holding means based on the hold signals. According to the signal processing apparatus of the present invention, it is possible to obtain the above described effects, and it is also possible to easily realize an integrated circuit which is suited for being mounted on an optical pickup to process light detection signals output from light receiving elements and to realize an information recording and/or reproducing apparatus which uses such an integrated circuit.

A further object of the present invention is to provide a signal processing apparatus comprising signal output switching means for switching output of analog light detection signals to a plurality of kinds of circuit stages; digital signal conversion means for time-sequentially converting the light detection signals output from said signal output switching means from analog signals into digital signals; a plurality of first holding means for temporarily holding the digital signals output from said digital signal conversion means; signal holding control means for generating hold signals for storing the light detection signals output from said signal output switching means in said first holding means according to a hold rule which is programmed in advance and controlling the holding of said first holding means based on the hold signals; operation process means for carrying out operation processes of the plurality of circuit stages based on the light detection signals held by said first holding means; a plurality of second holding means for temporarily holding the output signals of said operation process means; and transfer means for transferring the output signals held by said second holding means or the light detection signals held by said first holding means and a portion of the output signals held by said second holding means. According to the signal processing apparatus of the present invention, it is possible to obtain the above described effects, and it is also possible to easily realize an integrated circuit which is suited for being mounted on an optical pickup to process light detection signals output from light receiving elements and to realize an information recording and/or reproducing apparatus which uses such an integrated circuit.

Another object of the present invention is to provide a signal processing apparatus comprising analog signal processing means for inputting analog light detection signals and carrying out an analog signal processing in an RF signal band; signal output switching means for switching output of the analog light detection signals and the light detection signals output from said analog signal processing means to a plurality of kinds of circuit stages; digital signal conversion means for time-sequentially converting the light detection signals output from said signal output switching means from analog signals into digital signals; transfer means for transferring the light detection signals output from said digital signal conversion means; temporary holding means for temporarily holding the light detection signals transferred by said transfer means; operation process means for carrying out operation processes of the plurality of circuit stages based on the light detection signals held by said temporary holding means; and signal holding control means for generating hold signals for storing the light detection signals output from said signal output switching means in said temporary holding means according to a hold rule which is programmed in advance and controlling the holding of said temporary holding means based on the hold signals. According to the signal processing apparatus of the present invention, it is possible to obtain the above described effects, and it is also possible to easily realize an integrated circuit which is suited for being mounted on an optical pickup to process light detection signals output from light receiving elements and to realize an information recording and/or reproducing apparatus which uses such an integrated circuit.

Still another object of the present invention is to provide a signal processing apparatus comprising signal output switching means for switching output of analog light detection signals to a plurality of kinds of circuit stages; signal output switching control means for controlling the switching of outputs of said signal output switching means according to an output rule which is programmed in advance; digital signal conversion means for time-sequentially converting the light detection signals output from said signal output switching means from analog signals into digital signals; and servo error signal generating means for generating servo signals by carrying out operation processes of the plurality of circuit stages based on the light detection signals output from said digital signal conversion means. According to the signal processing apparatus of the present invention, it is possible to obtain the above described effects, and it is also possible to easily realize an integrated circuit which is suited for being mounted on an optical pickup to process light detection signals output from light receiving elements and to realize an information recording and/or reproducing apparatus which uses such an integrated circuit.

A further object of the present invention is to provide a signal processing apparatus comprising signal output switching means for switching output of analog light detection signals to a plurality of kinds of circuit stages; temporary holding means for temporarily holding the light detection signals output from said signal output switching means; signal holding control means for generating hold signals for storing the light detection signals output from said signal output switching means in said temporary holding means according to a hold rule which is programmed in advance and controlling the holding of said temporary holding means based on the hold signals; servo error signal generating means for generating servo signals by carrying out operation processes of the plurality of circuit stages based on the light detection signals held by said temporary holding means; and operation content modifying means for modifying contents of the operation process of said servo error signal generating means. According to the signal processing apparatus of the present invention, it is possible to obtain the above described effects, and it is also possible to easily realize an integrated circuit which is suited for being mounted on an optical pickup to process light detection signals output from light receiving elements and to realize an information recording and/or reproducing apparatus which uses such an integrated circuit.

Another object of the present invention is to provide a signal processing apparatus comprising signal output switching means for switching output of analog light detection signals to a plurality of kinds of circuit stages; digital signal conversion means for time-sequentially converting the light detection signals output from said signal output switching means from analog signals into digital signals; transfer means for transferring the light detection signals output from said digital signal conversion means; servo error signal generating means for generating servo signals by carrying out operation processes of the plurality of circuit stages based on the light detection signals transferred by said transfer means. According to the signal processing apparatus of the present invention, it is possible to obtain the above described effects, and it is also possible to easily realize an integrated circuit which is suited for being mounted on an optical pickup to process light detection signals output from light receiving elements and to realize an information recording and/or reproducing apparatus which uses such an integrated circuit.

Still another object of the present invention is to provide a signal processing apparatus comprising signal output switching means for switching output of analog light detection signals to a plurality of kinds of circuit stages; digital signal conversion means for time-sequentially converting the light detection signals output from said signal output switching means from analog signals into digital signals; servo error signal generating means for generating servo signals by carrying out operation processes of the plurality of circuit stages based on the digital signals output from said digital signal conversion means; transfer means for transferring the servo error signals output from said servo error signal generating means; and operation content modifying means for modifying contents of the operation process of said servo error signal generating means. According to the signal processing apparatus of the present invention, it is possible to obtain the above described effects, and it is also possible to easily realize an integrated circuit which is suited for being mounted on an optical pickup to process light detection signals output from light receiving elements and to realize an information recording and/or reproducing apparatus which uses such an integrated circuit.

A further object of the present invention is to provide a signal processing apparatus comprising analog signal processing means for inputting analog light detection signals and carrying out an analog signal processing in an RF signal band; signal output switching means for switching output of the analog light detection signals and the light detection signals output from said analog signal processing means to a plurality of kinds of circuit stages; digital signal conversion means for time-sequentially converting the light detection signals output from said signal output switching means from analog signals into digital signals; transfer means for transferring the light detection signals output from said digital signal conversion means; servo error signal generating means for generating servo signals by carrying out operation processes of the plurality of circuit stages based on the light detection signals transferred by said transfer means; and operation content modifying means for modifying contents of the operation process of said servo error signal generating means. According to the signal processing apparatus of the present invention, it is possible to obtain the above described effects, and it is also possible to easily realize an integrated circuit which is suited for being mounted on an optical pickup to process light detection signals output from light receiving elements and to realize an information recording and/or reproducing apparatus which uses such an integrated circuit.

Another object of the present invention is to provide a signal processing apparatus comprising signal output switching means for switching output of analog light detection signals to a plurality of kinds of circuit stages; signal output switching control means for controlling the switching of outputs of said signal output switching means according to an output rule which is programmed in advance; digital signal conversion means for time-sequentially converting the light detection signals output from said signal output switching means from analog signals into digital signals; transfer means for transferring the digital signals output from said digital signal conversion means; servo error signal generating means for generating servo signals by carrying out operation processes of the plurality of circuit stages based on the light detection signals transferred by said transfer means; and operation content modifying means for modifying contents of the operation process of said servo error signal generating means. According to the signal processing apparatus of the present invention, it is possible to obtain the above described effects, and it is also possible to easily realize an integrated circuit which is suited for being mounted on an optical pickup to process light detection signals output from light receiving elements and to realize an information recording and/or reproducing apparatus which uses such an integrated circuit.

Still another object of the present invention is to provide a signal processing apparatus comprising signal output switching means for switching output of analog light detection signals to a plurality of kinds of circuit stages; signal output switching control means for controlling the switching of outputs of said signal output switching means according to an output rule which is programmed in advance; digital signal conversion means for time-sequentially converting the light detection signals output from said signal output switching means from analog signals into digital signals; servo error signal generating means for generating servo signals by carrying out operation processes of the plurality of circuit stages based on the light detection signals output from said digital signal conversion means; transfer means for transferring the servo error signals output from said servo error signal generating means; and operation content modifying means for modifying contents of the operation process of said servo error signal generating means. According to the signal processing apparatus of the present invention, it is possible to obtain the above described effects, and it is also possible to easily realize an integrated circuit which is suited for being mounted on an optical pickup to process light detection signals output from light receiving elements and to realize an information recording and/or reproducing apparatus which uses such an integrated circuit.

A further object of the present invention is to provide a signal processing method which carries out a signal processing related to a recording operation or a reproducing operation with respect to an information recording medium based on light detection signals which are output from light receiving means which detects a light beam reflected from the information recording medium, comprising a digital signal conversion step which converts the light detection signals into digital signals; a servo error signal computing step which generates servo error signals by carrying out a predetermined operation process with respect to the digital signals obtained in the digital signal conversion step; and an operation content modifying step which modifies contents of the predetermined operation process carried out in the servo error signal computing step. According to the signal processing method of the present invention, it is possible to share the computing unit in common for generating the various servo error signals, and to not require a modification in the circuit structure even when the method of computing the servo error signals changes due to a modification in the structure of the optical pickup. The present invention enables sharing of the circuit in common for different methods of computing the servo error signals by compatibly coping with various media formats of the information recording medium.

Other objects and further features of the present invention will be apparent from the following detailed description when read in conjunction with the accompanying drawings.

BRIEF DESCRIPTION OF THE DRAWINGS

FIG. 7 is a system block diagram showing a structure of a gain controller;

FIG. 8 is a system block diagram showing an important part of the first embodiment of the signal processing apparatus;

DESCRIPTION OF THE PREFERRED EMBODIMENTS

Figure 1:
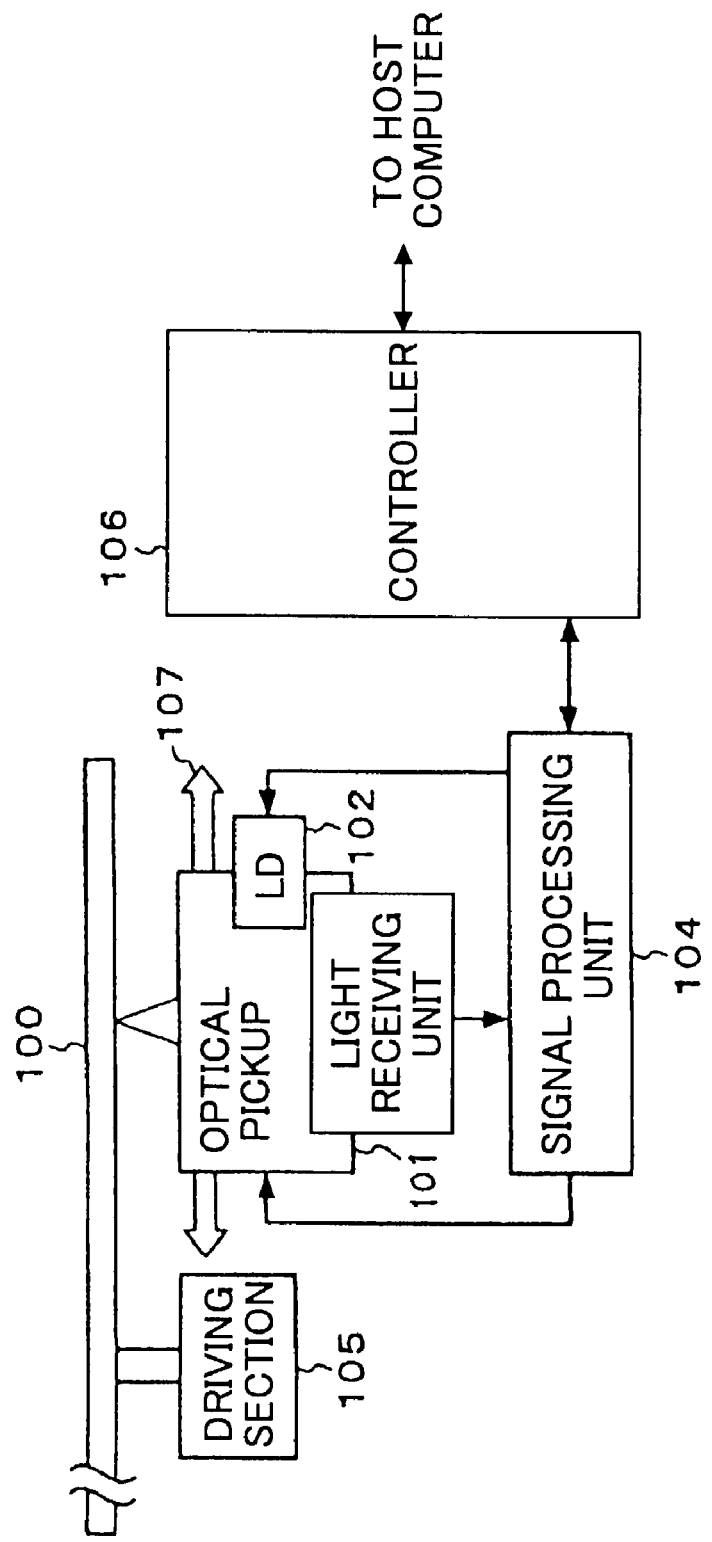
FIG. 1 is a diagram showing a general structure of an information recording and/or reproducing apparatus to which a signal processing apparatus according to the present invention is applied.

A description will be given of various embodiments of a signal processing method according to the present invention and a signal processing apparatus according to the present invention, by referring to the drawings.

First, a description will be given of a general structure and operation of an information recording and/or reproducing apparatus to which the signal processing apparatus according to the present invention is applied, by referring to FIG. 1. FIG. 1 is a diagram showing the general structure of the information recording and/or reproducing apparatus to which the signal processing apparatus according to the present invention is applied.

The information recording and/or reproducing apparatus shown in FIG. 1 is designed to record information (data) on and/or reproduce information (data) from an information recording medium (hereinafter simply referred to as a recording medium) 100. For example, the recording medium 100 is formed by an optical disk such as a CD-ROM, DVD-ROM, CD-R, CD-RW, DVD-R, DVD-RAM, MD and MO. The information is recorded on the optical disk and/or the information to be reproduced is prerecorded on the optical disk.

An optical pickup 101 shown in FIG. 1 includes a light source 102 which emits a light beam that is irradiated on the recording medium 100, and a light receiving unit 103 which receives the light beam reflected from the recording medium 100. The light source 102 is formed by at least one semiconductor laser or laser diode (LD), for example. As is well known, the light beam is irradiated on the recording medium 100 when recording information on the recording medium 100 and also when reproducing information from the recording medium 100. The light receiving unit 103 is formed by at least one photodetector unit, for example. The light receiving unit 103 detects the reflected light beam from the recording medium 100, and outputs a light detection current or signal. The light source 102 itself, a light source driving section (not shown) which drives the light source 102, the light receiving unit 103 itself, and other parts (not shown) of the optical pickup 101 are known, and a description and illustration thereof will be omitted in this specification.

The optical pickup 101 also includes a monitoring light receiving unit (not shown) which monitors a portion of the light beam emitted from the light source 102, and an output monitor signal of this monitoring light receiving unit is used to control deviations in the amount of light of the light beam emitted from the light source 102. The monitoring light receiving unit itself and the means for controlling the light source 102 based on the output monitor signal are also known, and a description and illustration thereof will be omitted in this specification.

Of course, the optical pickup 101 may further include a tilt detecting light receiving unit (not shown) for detecting a tilt of the recording medium 100 with respect to the light beam irradiated thereon. The tilt detecting light receiving unit itself and the associated means for correcting the tilt are also known, and a description and illustration thereof will be omitted in this specification.

In a case where the information recording and/or reproducing apparatus is designed to be operable with a plurality of kinds of information recording media having different media formats, such as a case where the information recording and/or reproducing apparatus is to be operable with one particular kind of DVD and one particular kind of CD, at least two semiconductor lasers (or laser diodes) which emit laser beams suited for the particular DVD and CD are provided within the light source 102. The laser beams emitted from the two semiconductor laser in this case may have mutually different wavelengths and/or laser power. The light receiving unit 103 may also be formed by a corresponding pair of photodetector units. Similarly, the monitoring light receiving unit may also be formed by a corresponding pair of photodetector units.

A signal processing unit 104 receives output light detection signals from the various light receiving units within the optical pickup 101, and carries out various signal processing operations based on the received signals. For example, the signal processing unit 104 detects the information reproduced from the recording medium 100 based on the light detection signal received from the light receiving unit 103. The signal processing unit 104 also generates servo error signals for carrying out a focus servo operation and a track servo operation, based on the received signal. The focus servo operation and the track servo operation are carried out so that the light beam is always irradiated on the recording medium 100 within a predetermined error range with respect to deviations such as a surface fluctuation and track deviation in a radial direction of the recording medium 100 caused by rotation of the recording medium 100. The optical pickup 101 is controlled in a known manner based on the servo error signals. In addition, the signal processing unit 104 modulates the information which is to be recorded on the recording medium 100 according to a predetermined rule, and supplies a modulated recording signal to the light source 102 (or a light source driving section). The signal processing unit 104 also controls the amount of light output from the light source 102 when irradiating the light beam emitted from the light source 102 onto the recording medium 100.

A rotational driving section 105 includes a spindle motor for rotating the recording medium 100. A rotational speed of the spindle motor is controlled by the signal processing unit 104 in a known manner. When carrying out a constant linear velocity (CLV) rotation control, a rotation control signal which is embeddedly recorded on the recording medium 100 in order to carry out a highly accurate rotation control is detected via the optical pickup 101, and the rotation control is carried out based on the detected rotation control signal.

For example, in the case of an information recording medium exclusively for reproduction (read-only), a synchronizing signal which is arranged at predetermined intervals with respect to the recorded information may be used as the rotation control signal. On the other hand, in the case of a recordable (writable) information recording medium, a wobble of the recording track which wobbles at a predetermined frequency may be used as the rotation control signal.

A controller 106 receives commands from a host computer (not shown), and exchanges recording information and/or reproduced information with the host computer. The controller 106 generally controls the entire operation of the information recording and/or reproducing apparatus.

The optical pickup 101 is moved in a radial direction 107 of the recording medium 100, indicated by arrows in FIG. 1, during a so-called seek operation. Hence, the optical pickup 101 and a circuit board (not shown) on which the signal processing unit 104 and the like are mounted are, in general, connected by a flexible printed circuit (FPC) substrate (or cable, not shown) which can be bent freely, so as not to interfere with the movement of the optical pickup 101. Parts of the optical pickup 101, such as the light source 102 and the light receiving unit 103, may also be mounted on the FPC substrate.

Next, a description will be given of a first aspect of the present invention.

Figure 2:
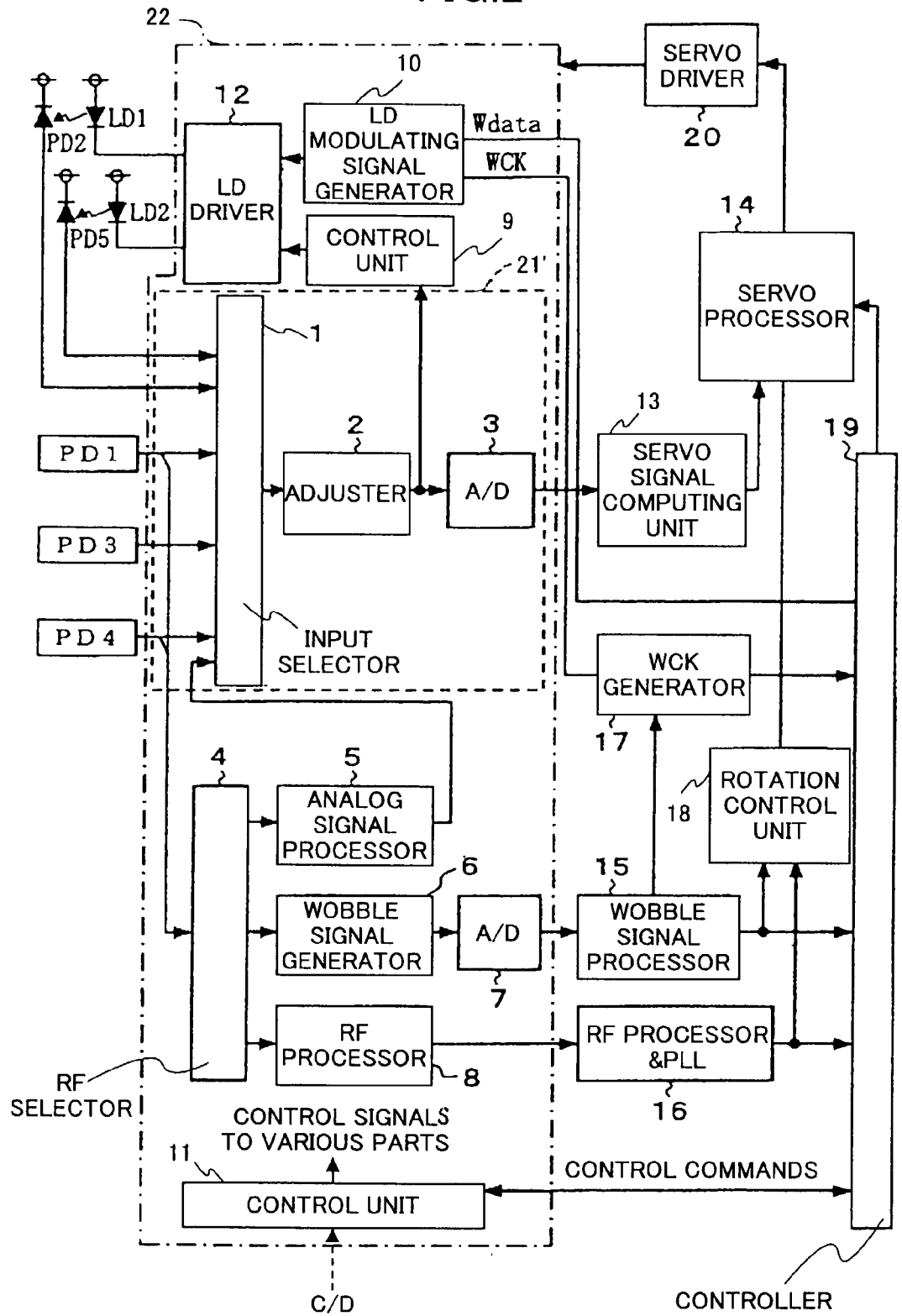
FIG. 2 is a system block diagram showing an internal structure of a signal processing unit which forms a first embodiment of the signal processing apparatus according to the present invention.

A description will be given of the signal processing unit 104 which forms a first embodiment of the signal processing apparatus according to the present invention in the information recording and/or reproducing apparatus shown in FIG. 1, by referring to FIG. 2. FIG. 2 is a system block diagram showing an internal structure of the signal processing unit 104 of the first embodiment.

In order to cope with information recording media having different media formats, the signal processing unit 104 shown in FIG. 2 is connected to two laser diodes LD1 and LD2 which form the light source 102. The signal processing unit 104 is also connected to photodetectors PD2 and PD5 which form the monitoring light receiving unit. The photodetectors PD2 and PD5 detect portions of the laser beams emitted from the corresponding laser diodes LD1 and LD2, and the signal processing unit 104 monitors the laser beam portions detected by the photodetectors PD2 and PD5.

A photodetector PD1 receives the light beam reflected by the recording medium 100 when the laser beam emitted from the laser diode LD1 is irradiated on the recording medium 100. A photodetector PD4 receives the light beam reflected by the recording medium 100 when the laser beam emitted from the laser diode LD2 is irradiated on the recording medium 100. The photodetectors PD1 and PD4 form the light receiving unit 103. A photodetector PD3 forms the tilt detecting light receiving unit for detecting the tilt of the recording medium 100 with respect to the light beam irradiated thereon. Each of the photodetectors PD1, PD3 and PD4 is formed by a multi-part photodetector which is made up of a plurality of divided photodetector parts (or elements), and each photodetector part (or element) detects the light beam irradiated thereon.

The optical pickup 101 may be designed to monitor the light beams from the laser diodes LD1 and LD2 using the same photodetector. Similarly, the optical pickup 100 may be designed to monitor the reflected light beams from the recording medium 100 originating from the laser diodes LD1 and LD2 using the same photodetector.

An input selector 1 receives output light detection signals of the photodetectors PD1 through PD5, and successively selects and outputs one of the light detection signals depending on a selection signal received from a control unit 11. An adjuster 2 adjusts offset and gain of the light detection signal output from the input selector 1. An analog-to-digital (A/D) converter 3 converts the analog light detection signal output from the adjuster 2 into a digital light detection signal. The light detection signals processed in the path formed by the input selector 1, the adjuster 2 and the A/D converter 3 are in a relatively low band, as will be described later, and a plurality of signals are processed time-sequentially in this path. The input selector 1, the adjuster 2 and the A/D converter 3 form a light detection signal converter 21'.

A servo signal computing unit 13 carries out a digital computing process to generate a servo error signal based on each digital light detection signal output from the A/D converter 3. At the same time, the servo signal computing unit 13 also carries out an offset adjustment and a gain adjustment, before supplying the generated servo error signal to a servo processor 14.

An RF selector 4 receives the output light detection signals from the photodetectors PD1 and PD4, and selects a signal which is required in a subsequent circuit stage or carries out an operation such as a partial add-subtract. An output signal of the RD selector 4 is supplied to a high-speed analog signal processor 5, a wobble signal generator 6 and an RF signal pre-processor 8 in the subsequent circuit stage.

The high-speed analog signal processor 5 carries out a high-speed analog signal processing such as DPD signal generation and RF envelope signal generation. A more detailed description of such signal generation process will be described later. The signal generated in the high-speed analog signal processor 5 does not require a broad-band, and are supplied to the input selector 1 to be processed time-sequentially similarly to the other signals. The wobble signal generator 6 generates a wobble signal by detecting a wobble (signal) which is preformatted on the recording medium 100 which is recordable.

An A/D converter 7 converts the analog wobble signal generated in the wobble signal generator 6 into a digital wobble signal. A wobble signal processor 15 extracts a binary wobble signal from the output digital wobble signal of the A/D converter 7, and supplies the binary wobble signal to a WCK generator 17 and a rotation control unit 18. In addition, the wobble signal processor 15 also demodulates, from the wobble signal, address information which is modulated according to a predetermined rule which is determined for each kind of recording medium 100. The address information is supplied to a controller 19.

The RF signal pre-processor 8 generates a binary RF signal based on the reproduced RF signal received from the RF selector 4, together with an RF signal after-processor and phase locked loop (PLL) circuit 16 in a subsequent circuit stage, and carries out a demodulation according to a rule of the modulation system employed by the recording medium 100 which is being reproduced. In addition, a PLL circuit of the RF signal after-processor and PLL circuit 16 extracts a reproducing clock from the binary RF signal. The demodulated data from the RF after-processor and PLL circuit 16 is supplied to the controller 19. Further, the RF after-processor and PLL circuit 16 extracts a rotation control signal based on a synchronizing signal which is inserted into the binary RF signal at predetermined intervals, and supplies the rotation control signal to the rotation control unit 18.

The rotation control unit 18 generates a spindle error signal which is used for the rotation control, based on the binary wobble signal received from the wobble signal processor 15 or the rotation control signal received from the RF signal after-processor and PLL circuit 16. The spindle error signal is supplied to a servo processor 14. When rotating the recording medium 100 according to the constant angular velocity (CAV) system, the spindle error signal is generated from a signal (not shown) which indicates the rotation of the recording medium 100 and is output from a rotation control driving section (not shown).

The servo processor 14 generates a servo control signal from the various servo error signals received, based on an instruction from the controller 19. The servo control signal is supplied to a servo driver 20. The servo driver 20 generates a servo drive signal based on the servo control signal received from the servo processor 14, and supplies the servo drive signal to each driving section. Each driving section which is supplied with the servo drive signal carries out a servo operation based on the servo drive signal. The servo operation includes focus control, track control, seek control, spindle control and tilt control.

The WCK generator 17 generates a recording clock signal WCK based on the binary wobble signal received from the wobble signal processor 15. The recording clock signal WCK is supplied to a laser diode (LD) modulating signal generator 10 and the controller 19. At the time of the recording, the recording data is generated using the recording clock signal WCK as a reference. In addition, at the time of the recording, a recording data signal Wdata is supplied from the controller 19 to the LD modulating signal generator 10 in synchronism with the recording clock signal WCK. The information which is to be recorded is modulated according to a predetermined rule in the recording data signal Wdata.

The LD modulating signal generator 10 generates a LD modulating signal for modulating the laser diode LD1 or LD2, based on the recording clock signal WCK received from the WCK generator 17 and the recording data signal Wdata received from the controller 19. The LD modulating signal is supplied to a LD driver 12.

An LD control unit 9 receives the light detection signal from the photodetector PD2 or PD5 via the input selector 1 and the adjuster 2, and supplies a LD control signal to the LD driver 12 based on the received light detection signal so that the amount of light emitted from the laser diode LD1 or LD2 becomes a desired value. In other words, the LD controller 9 carries out a so-called automatic power control (APC). The LD driver 12 drives the laser diode LD1 or LD2 by supplying a current, based on the LD control signal received from the LD control unit 9 and the LD modulating signal received from the LD modulating signal generator 10, so that the driven laser diode LD1 or LD2 emits the laser beam.

The laser diodes LD1 and LD2, the photodetectors PD1 through PD5, the light detection signal converter 21' and the servo signal computing unit 13 form an important part of this embodiment.

An integrated circuit 22 indicated by a one-dot chain line in FIG. 2 is mounted on the optical pickup 101 shown in FIG. 1. The control unit 11 supplies control signals to various parts within the integrated circuit 22 to control the various parts of the integrated circuit 22. Instructions related to the control of the various parts of the integrated circuit 22 are issued by control commands from the controller 19 which are supplied to the control unit 11.

Figure 3:
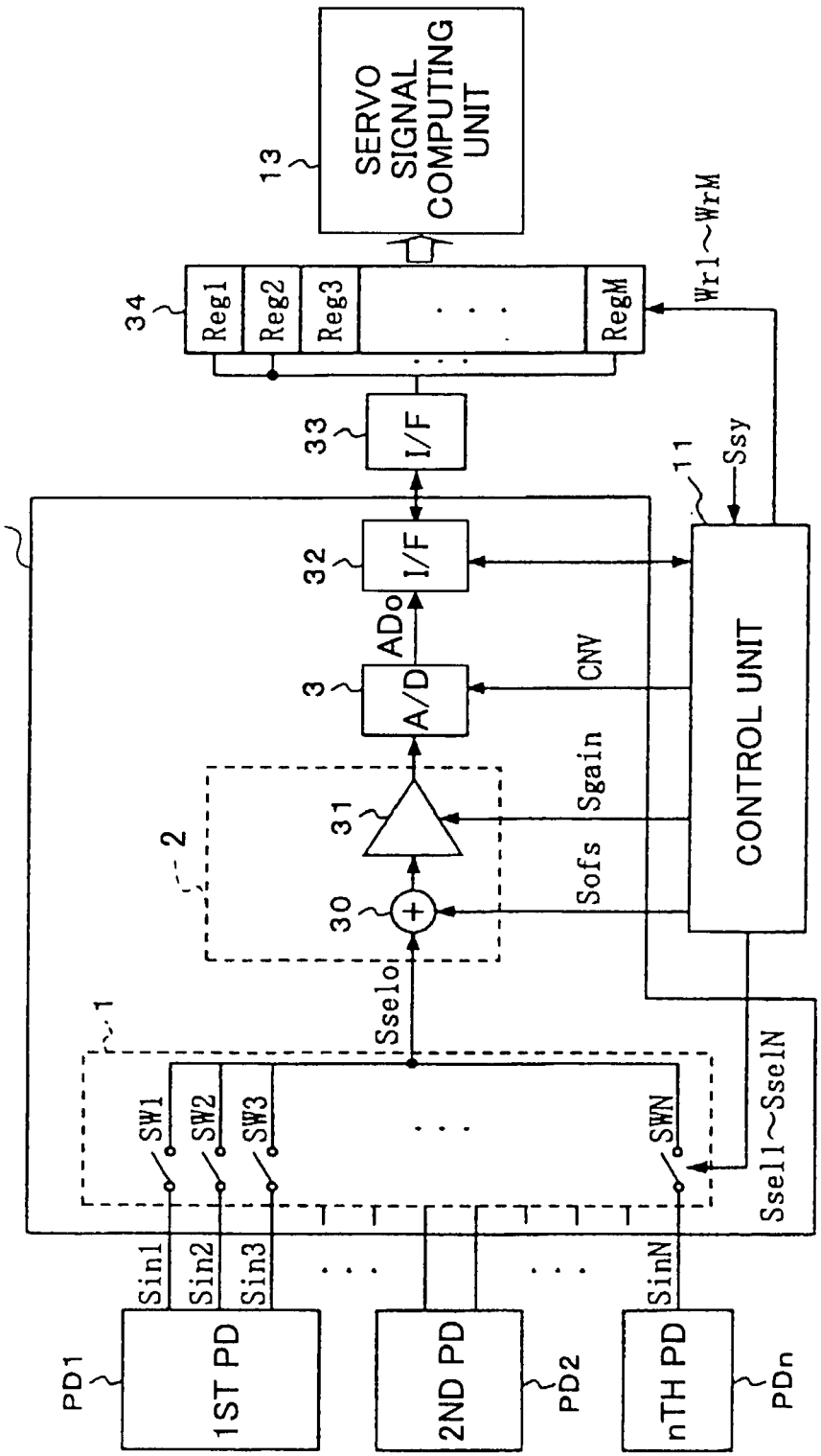
FIG. 3 is a system block diagram showing an important part of the first embodiment of the signal processing apparatus according to the present invention.
Figure 4:
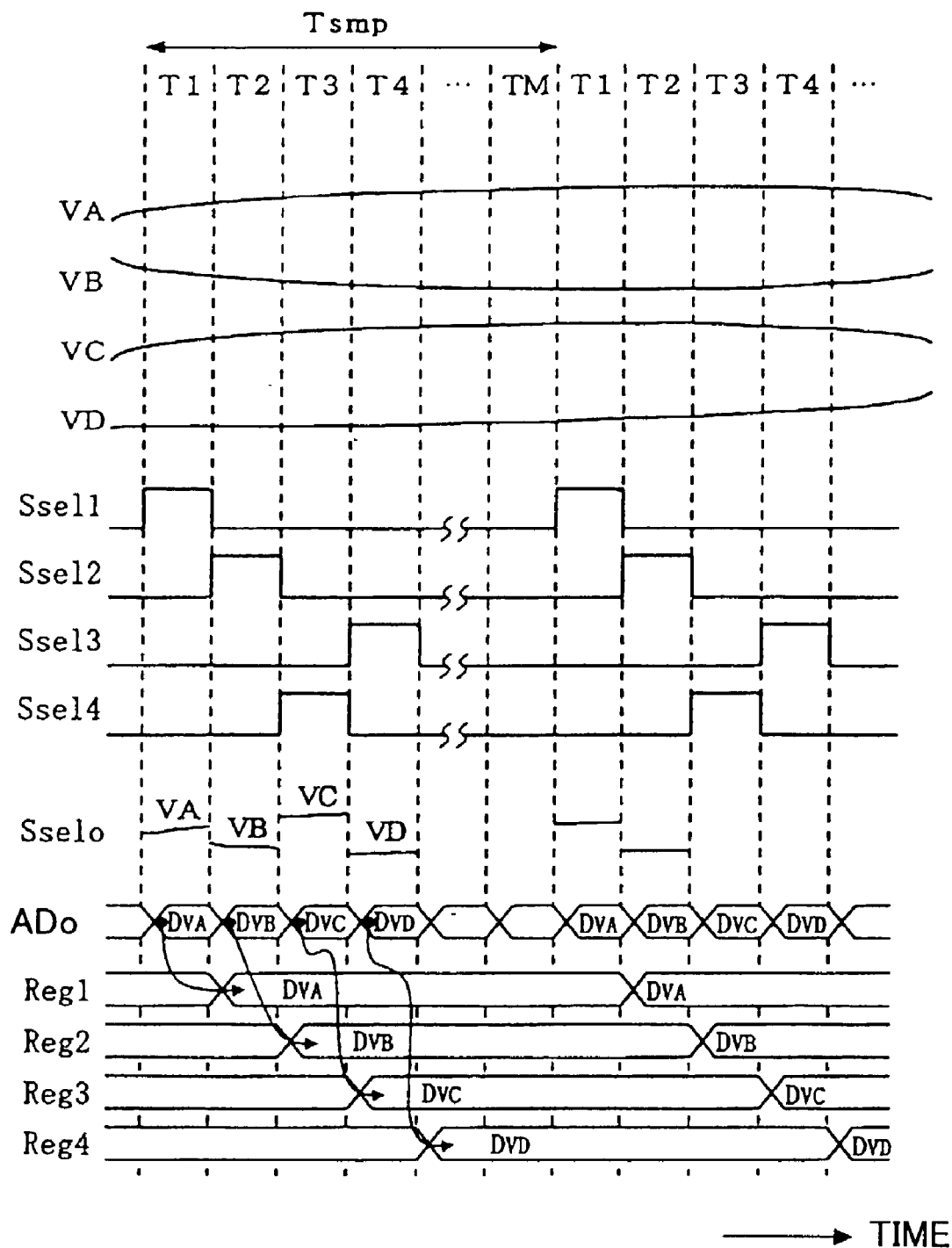
FIG. 4 is a timing chart for explaining an operation of the signal processing apparatus shown in FIG. 3.
Figure 5:
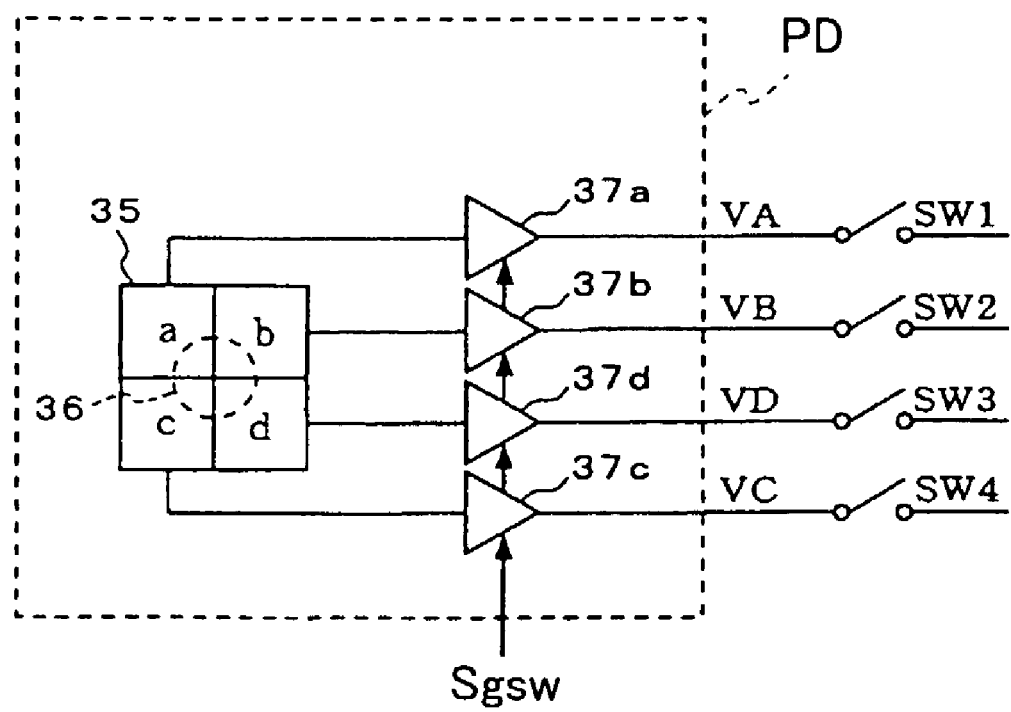
FIG. 5 is a diagram showing a structure of a light receiving section.

Next, a description will be given of the structure and operation of a light detection signal converter 21 which may be used in place of the light detection signal converter 21', by referring to FIGS. 3 through 5. FIG. 3 is a system block diagram showing an important part of this first embodiment of the signal processing apparatus according to the present invention. FIG. 4 is a timing chart for explaining an operation of the signal processing apparatus shown in FIG. 3. In addition, FIG. 5 is a diagram showing a structure of a light receiving section.

As shown in FIG. 3, the light detection signal converter 21 receives a plurality of light detection signals (or light detection signal components) from each of first through nth photodetectors PD1 through PDn.

An input selector 1 includes N switches SW1 through SWN, and input ends of the switches SW1 through SWN receive corresponding light detection signals Sin1 through SinN output from the photodetectors PD1 through PDn. Selection signals Ssel1 through SselN are supplied to the corresponding switches SW1 through SWN from a control unit 11, and one of the switches SW1 through SWN is turned ON. One of the light detection signals Sin1 through SinN corresponding to one of the switches SW1 through SWN which is turned ON, is selectively output from the input selector 1 as a light detection signal Sselo.

An adjuster 2 includes an offset adjuster 30 and a gain adjuster 31. The offset adjuster 30 and the gain adjuster 31 respectively adjust the offset and the gain of the light detection signal Sselo based on an offset control signal Sofs and a gain control signal Sgain which are received from the control unit 11. The adjuster 2 outputs a light detection signal ADin.

An A/D converter 3 converts the analog light detection signal ADin (analog value) which has been subjected to the offset adjustment and the gain adjustment, into an n-bit digital signal (digital value) ADo. The n-bit digital signal (data) ADo is transferred to a data holding unit 34 via a first interface (I/F) 32 and a second interface (I/F) 33, and is successively stored in registers Reg1 through RegM in response to write signals Wr1 through WrM which are received from the control unit 11.

A servo signal computing unit 13 carries out a computing process to generate a servo error signal from the data of the light detection signals stored in the registers Reg1 through RegM of the data holding unit 34. In addition, the servo signal computing unit 13 also carries out an offset adjustment and a gain adjustment to adjust gain inconsistencies among individual recording media and individual optical pickups.

The number of light receiving units, the kind of light receiving units, and the number of light detection signals are not limited to those used in this embodiment. The number of light receiving units, the kind of light receiving units, and the number of light detection signals may be set differently as in the above described case, as long as the total number of light detection signals is less than or equal to the number N of inputs of the input selector 1.

It will be assumed for the sake of convenience that the light receiving units of the information recording and/or reproducing apparatus are formed by the photodetectors PD1 through PD5, similarly to the case shown in FIG. 2.

The photodetector PD1 which receives the reflected light beam from the recording medium 100 is formed by a 4-part photodetector 35 shown in FIG. 5. The 4-part photodetector 35 is made up of four photodetector parts (or elements) a, b, c and d, and a beam spot 36 of the reflected light beam is irradiated on the 4-part photodetector 35. Each of the photodetector parts a, b, c and d outputs a current depending on the amount of light received, and this output current is subjected to a current-to-voltage conversion in a corresponding one of current-to-voltage converters 37a through 37d. The current-to-voltage converters 37a through 37d respectively output light detection signals (voltages) VA, VB, VC and VD.

The amount of light received differs greatly depending on the amount of light emitted from the light source and the reflectivity of the recording medium. Hence, the gain of each of the current-to-voltage converters 37a through 37d, that is, the current-to-voltage conversion rate, is switched in response to a gain switching signal Sgsw. In this case, it is normally possible to switch the gain by switching a resistance of a feedback resistor. It is sufficient to switch the resistance between the recording mode and the reproducing mode.

The light detection signals VA, VB, VC and VD are respectively supplied to the switches SW1, SW2, SW4 and SW3.

It is assumed for the sake of convenience that the focus servo system employs the astigmatism technique, and the track servo system employs the push-pull technique. A focus error signal FE and a track error signal TE can be computed based on the following formulas (1) and (2). The astigmatism technique and the push-pull technique are well known techniques, and a description thereof will be omitted in this specification.

$$FE=(VA+VD)-(VB+VC) \tag{1}$$

$$TE=(VA+VC)-(VB+VD) \tag{2}$$

The control unit 11 shown in FIG. 3 successively changes one of the selection signals Ssel1 through SselN which is turned ON, depending on the time based on a predetermined rule, and repeats this change at a period Tsmp. The period Tsmp is divided into M intervals, and one of the switches SW1 through SWN within the input selector 1, which is turned ON, changes for each of the M divided intervals. The light detection signal which is supplied to one of the switches SW1 through SWN which is turned ON, is selectively output to the adjuster 2 provided in the next circuit stage.

As shown in FIG. 4, when the selection signals Ssel1 through SselN are successively turned ON so that the selection signal Ssel1 is turned ON during an interval T1, the selection signal Ssel2 is turned ON during an interval T2, the selection signal Ssel3 is turned ON during an interval T3, the selection signal Ssel4 is turned ON during an interval T4, . . . , the light detection signals VA, VB, VC, VD, . . . are successively output as the output light detection signal of the input selector 1.

In the A/D converter 3, the output light detection signal ADin of the adjuster 2, which has be subjected to the gain adjustment and the offset adjustment, is subjected to an A/D conversion once for every interval Ti, where i=1, . . . , M. If the output digital light detection signal ADo of the A/D converter 3 has been subjected to the A/D conversion during the interval Ti, the value of the digital light detection signal ADo is stored in the register Regi of the data holding unit 34. In other words, the light detection signal VA is stored in the register Reg1, and the light detection signal VB is stored in the register Reg2. Accordingly, each light detection signal can be subjected to the A/D conversion at a sampling rate fsmp (=1/Tsmp), and the servo error signal can be generated by carrying out the digital computing process with respect to the stored light detection signal.

The servo error signal and each of the light detection signals which are used to generate the servo error signal do not require a broad-band. Hence, the servo operation can be carried out by sampling at the sampling rate fsmp which is sufficiently high compared to the required band of several kHz, for example.

Similarly, the control of the amount of light emitted from the light source and the control of the tilt normally do not require a high-speed control. Hence, the light detection signals output from the monitoring light receiving unit (photodetectors PD2 and PD4) and the tilt detecting light receiving unit (photodetector PD3) can be processed similarly.

The switching order of the selection signals Ssel1 through SselN is programmable in the control unit 11. For example, in a case where the light detection signals VA, VB, VC and VD are respectively input to the switches differently from the case described above, the switching order of the selection signals Ssel1 through SselN is programmed in the control unit 11 so that the switches which respectively receive the light detection signals VA, VB, VC and VD are successively turned ON in this order. Hence, it is possible to store the light detection signal VA in the register Reg1 and to store the light detection signal VB in the register Reg2, thereby making it unnecessary to modify the subsequent circuit stages.

For example, assume a case where the light detection signal VA is input to the switch SW5, the light detection signal VB is input to the switch SW6, the light detection signal VC is input to the switch SW3, and the light detection signal VC is input to the switch SW2. In this case, the control unit 11 is programmed so that the selection signal Ssel5 is turned ON during the interval T1, the selection signal Ssel6 is turned ON during the interval T2, the selection signal Ssel3 is turned ON during the interval T3, and the selection signal Ssel2 is turned ON during the interval T4.

When using a plurality of light sources, the switch which receives from the light receiving unit 103 the output light detection signal of the photodetector corresponding to the light source which is not used, is not selected or turned ON.

In addition, when receiving the reflected light beam from the recording medium 100 by another photodetector such as the photodetector PD4, the control unit 11 may be programmed so that the light detection signal output from the photodetector PD4 is successively selected by the input selector 1. In this case, it is possible to carry out the subsequent signal processings using the same circuit system, and the circuit scale can further be reduced.

Therefore, even when a plurality of photodetectors are provided, and regardless of the terminals of the input selector 1 to which each of the output light detection signals of the photodetectors are input, it is possible to appropriately cope by the programming of the control unit 11. For this reason, the degree of freedom with which the parts of the optical pickup 101 may be arranged is improved, including the arrangements of the photodetectors, the terminals of the input selector 1, the light sources (laser diodes) of the light source 102 and the LD driver 12.

Furthermore, even in cases where the photodetectors are formed by multi-part photodetectors having divided photodetector parts with different shapes and the techniques used to generate the servo error signals are different, the light detection signals output from the light receiving unit 103 can be successively selected by programming the control unit 11, so that the A/D conversion and the operation processes may be carried out thereafter to generate the servo error signals. Hence, it is possible to cope with various situations and carry out various processes without modifying the existing circuit system.

Figure 6:
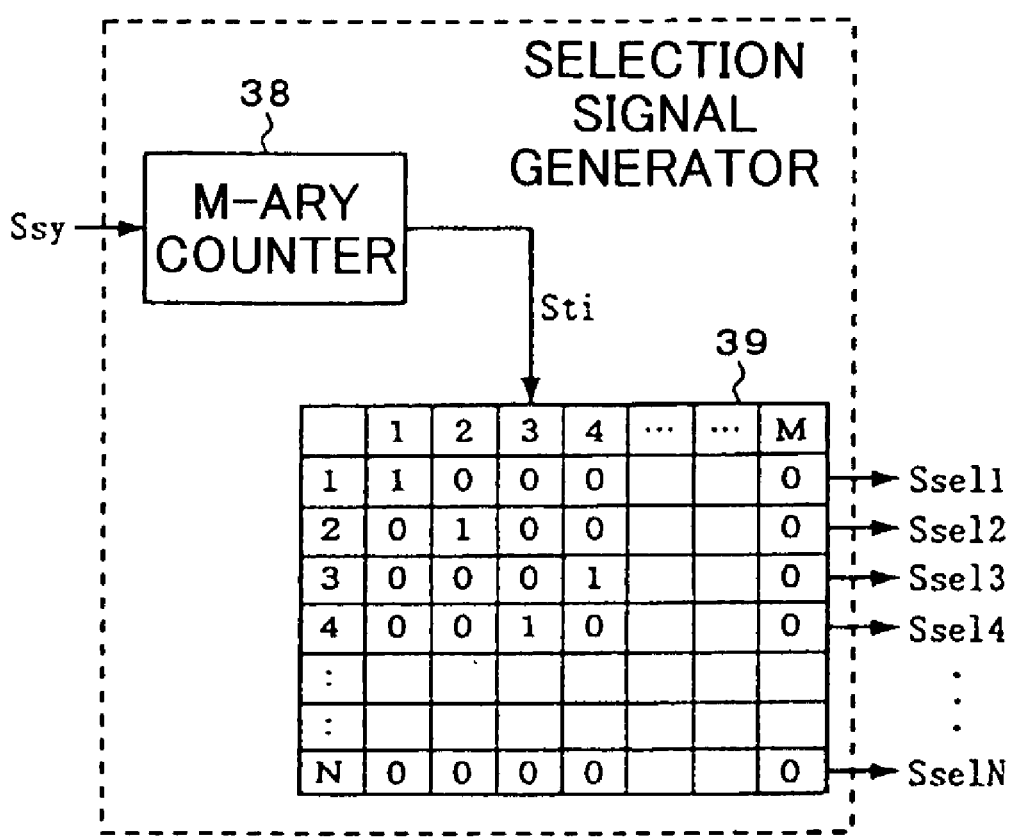
FIG. 6 is a diagram showing a structure of a programmable selection signal generator provided within a control unit shown in FIG. 3.

FIG. 6 is a diagram showing a structure of a programmable selection signal generator provided within the control unit 11 shown in FIG. 3. The programmable selection signal generator shown in FIG. 6 includes an M-ary counter 38 which starts counting in response to a synchronizing signal Ssy, and a writable look-up table (LIT) 39 which selects an address of a data storage destination of the data holding unit 34 based on an interval information signal Sti which is output from the M-ary counter 38 by carrying out a conversion to one of the selection signals Ssel1 through SselN.

The LUT 39 stores a switching order of the selection signals Ssel1 through SselN which is programmed in advance. The LUT 39 determines the one of the selection signals Ssel1 through SselN which is to be output according to this switching order based on the interval information signal Sti. For example, when the interval information signal Sti is Sti=3, that is, during the interval T3, the LUT 39 outputs the selection signal Ssel4 which is "1" and outputs the other selection signals Ssel1 through Ssel3 and Ssel5 through SselN which are all "0". In addition, the switching order of the selection signals Ssel1 through SselN is programmed by rewriting the contents of the LUT 39.

Even if the switching order of the selection signals Ssel1 through SselN is fixed, effects similar to those described above may be obtained by making it possible to program the writing order to each of the registers Reg1 through RegM of the data holding unit 34. In other words, when the selection signals Ssel1, Ssel2, Ssel3, Ssel4, . . . are switched in this switching order, the light detection signals VA, VB, VD, VC, are output in this order from the input selector 1. Thus, the value obtained after the A/D conversion may be written to the register Reg1 during the interval T1, to the register Reg2 during the interval T2, to the register Reg4 during the interval T3, to the register Reg3 during the interval T4, . . . . This may be achieved by controlling the write signals Wr1 through WrM to the registers Reg1 through RegM. In addition, a programmable write signal generator provided within the control unit 11 shown in FIG. 3 may have a structure similar to that of the programmable selection signal generator shown in FIG. 6.

Moreover, it is possible to program a combination of the switching order of the selection signals Ssel1 through SselN and the writing order to the registers Reg1 through RegM. It is also possible to successively select only the inputs necessary for the programming of the switching order of the selection signals Ssel1 through SselN by not selecting the switch which does not receive a selection signal, for example, and to rearrange the data by the writing order to the registers Reg1 through RegM.

Furthermore, it is possible to make M, the number of time divisions, programmable depending on the number of data systems (number of registers) required in the subsequent circuit stages. It is also possible to change the sampling period Tsmp within a range such that the interval Ti can secure a sufficient A/D conversion time even when the delay times of each of the circuits are taken into consideration.

When generating the selection signals by the programmable selection signal generator or the programmable writing signal generator shown in FIG. 6, the number M of time divisions can be changed by changing the M-ary number of the M-ary counter 38.

The offset adjuster 30 and the gain adjuster 31 shown in FIG. 3 are provided to effectively utilize the input range of the A/D converter 3. By providing the offset adjuster 30 and the gain adjuster 31 at a circuit stage subsequent to the input selector 1, it is possible to share a circuit section.

By changing the offset control signal Sofs and the gain control signal Sgain in response to the switching of the selection signals Ssel1 through SselN, it is possible to independently carry out the gain and offset adjustments of each of the light detection signals using the same circuit. Hence, even if a difference exists in the levels of the light detection signals output from each of the photodetectors of the light receiving unit 103, it is possible to carry out the A/D conversion of each of the light detection signals with a high accuracy. For example, since the amount of light received usually changes for each of the photodetectors, the gain may be changed for each of the photodetectors.

The offset adjustment value and the gain adjustment value are prestored in the control unit 11.

The gain adjustment value may be computed in the following manner, for example. The amount of light received by the photodetector changes depending on the amount of light irradiated on the recording medium 100, the reflectivity of the recording medium, the inconsistencies in the characteristics of each of the individual optical pickups 101, and the like. Accordingly, it is possible to absorb the change in the amount of light irradiated on the recording medium 100, by detecting the output monitor signal of the monitoring light receiving unit which monitors the light beam emitted from the light source 102 and computing the gain adjustment value based on the detected monitor signal.

When receiving the reflected light from the recording medium 100 using a multi-part photodetector, it is possible to detect the amount of light received by computing a sum of each of the light detection signals output from the photodetector parts forming the multi-part photodetector. Thus, the gain may be computed based on the sum signal.

Similarly, a peak envelope signal of the RF signal (or a bottom envelope signal in a case where the polarity of the RF signal is negative) is also dependent on the amount of light received. Hence, the peak (or bottom) envelope signal of the RF signal may be used to compute the gain.

In this embodiment, these detection values may be detected by the A/D converter 3.

A data converter (not shown) may be provided to carry out a data conversion with respect to the output of the A/D converter 3 so as to increase the number of bits depending on the offset adjustment value of the offset adjuster 30 and the gain adjustment value of the gain adjuster 31. The data conversion value may be processed in the servo signal computing unit 13. In this case, it is possible to carry out a highly accurate operation without increasing the number of bits of the A/D converter 3.

FIG. 7 is a system block diagram showing a structure of a gain controller 80 which automatically controls the gain of the gain adjuster 31 depending on the amount of light received, in this embodiment of the information recording and/or reproducing apparatus.

The gain controller 80 is provided within the control unit 11. The gain controller 80 includes an adder 81 for adding predetermined data of each of the light detection signals which are subjected to the A/D conversion, an averaging unit 82 for averaging an output of the adder 81, and a gain computing unit 83 for computing the gain based on a predetermined target value and an output of the averaging unit 82.

The adder 81 includes a multiplier 87 for multiplying a coefficient "1" or "0" to the output signal of the A/D converter 3, a delay register 89, and an adder 88 for adding an output of the multiplier 87 and an output of the delay register 89. The delay register delays an output of the adder 88 by a delay time of 1 clock. The output of the adder 88 is output as the output of the adder 81.

In the above described case, the light detection signals are subjected to the A/D conversion and output from the A/D converter 3 in the order of light detection signals Dva, Dvb, Dvc, Dvd output from the photodetector PD1 and the light detection signals output from the other photodetectors. By setting the multiplying coefficient of the multiplier 87 to "1" with respect to the light detection signals Dva through Dvd and to "0" with respect to the other light detection signals, it is possible to obtain the sum signal for the photodetector PD1, that is, the added result of the light detection signals Dva through Dvd, in one cycle (Tsmp). A D.C. component of the sum signal is detected by averaging the sum signal by the averaging unit 82.

The gain computing unit 83 compares the predetermined target value and the output of the averaging unit 82 by a comparator 90, and sets the gain again by increasing or decreasing the present value of the gain based on the compared result. In other words, the gain is increased if the sum signal is smaller than the target value, decreased if the sum signal is larger than the target value, and is maintained to the present value if the sum signal is equal to the predetermined value. An adder 91 adds a gain increasing or decreasing signal which is output from the comparator 90 and the present value of the gain output from a holding unit (register) 92, to update the gain.

Accordingly, it is possible to automatically control the gain so that the sum signal (or each light detection signal) becomes approximately equal to the predetermined value, and the A/D conversion can be carried out stably and accurately even in a case where the amount of light received changes due to a change in the amount of light emitted from the light source 102 or a change in the reflectivity of the recording medium 100. As a result, it is possible to carry out a stable servo operation.

The signal which is subjected to the above described control is not limited to the sum signal, and may be any signal which varies proportionally to the amount of light received. For example, the peak hold signal (or bottom hold signal) of the RF signal which will be described later may be subjected to the above described control. By using such a signal which is subjected to the above described control, it becomes unnecessary to carry out an operation in an adder within gain control unit 80, and the circuit can be simplified.

The same effects can be obtained if the connecting order of the averaging unit 82 and the comparator 90 is reversed from that shown in FIG. 7. In addition, if a gain controller 86 which has the same structure as the gain controller 80 is provided in parallel to the gain control unit 80, it is possible to automatically control the gain for each photodetector.

A gain selector 84 switches the gains computed by the gain control units 80 and 86 or the gain adjustment value stored in a gain register 85, in response to the selection signal Ssel. For example, in the case of the signal or situation where the automatic gain control is unnecessary, such as the monitor signal or when detecting the reflectivity of the recording medium 100 by the sum signal, it is possible to use the gain adjustment value stored in the gain register 85. Moreover, by reading the gain computed by the gain control unit 80, it is possible to carry out the above described conversion of the increase in the number of bits of the A/D conversion data.

Next, a description will be given of the transfer of the A/D conversion data.

The light detection signal converter 21 shown in FIG. 3 includes the input selector 1, the offset adjuster 30 and the gain adjuster 31 which form the adjuster 2, the A/D converter 3 and the first interface 32. The light detection signal converter 21 is mounted on the optical pickup 101 together with the control unit 11 which controls the light detection signal converter 21, separately from the signal processing unit 104 which is provided at the subsequent circuit stage. As a result, signal lines on a FPC substrate connecting the first interface 32 and the second interface 33 transfer digital signals, and the elements of the light detection signal converter 21 can be arranged very close to each of the photodetectors PD1 through PDn. Hence, the light detection signals which are analog signals usually having an extremely small amplitude do not need to be transferred over a long distance, thereby making it more difficult for the light detection signals to be affected by noise.

In addition, by making the data transfer between the first and second interfaces 32 and 33 by a serial data transfer, it is possible to greatly reduce the number of signal lines.

When supplying the light detection signals from each of the photodetectors to specific input terminals on the FPC substrate (or optical pickup substrate), the signal lines required to make the necessary connections may become long, and the number of intersecting signal lines may increase. In some cases, the wiring itself of the signal lines may become impossible particularly due to the intersecting signal lines. But because the connections to the input terminals of the input selector 1 can be made freely by the above described programming of the control unit 11, this embodiment can positively enable the wiring of the necessary signal lines. Moreover, because each of the light detection signals are converted into the digital signals and transferred before carrying out the computing process in the servo signal computing unit 13, the servo signal computing unit 13 can be realized by a servo signal computing unit which is programmable of the computing method and has a simple structure which carries out a simple process, as will be described later.

Figure 9A:
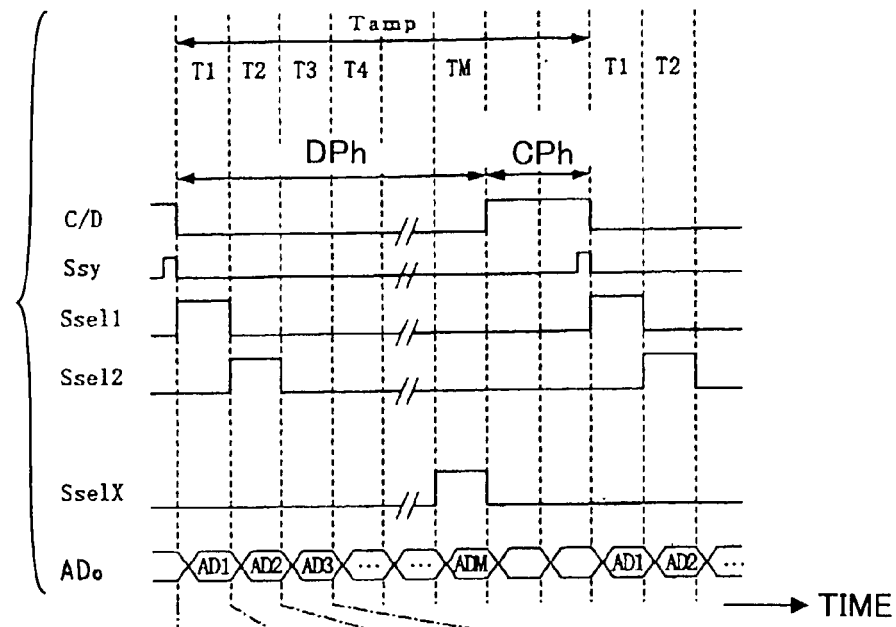
FIGS. 9A and 9B are timing charts for explaining a data communication method employed by the first embodiment of the signal processing unit.
Figure 9B:
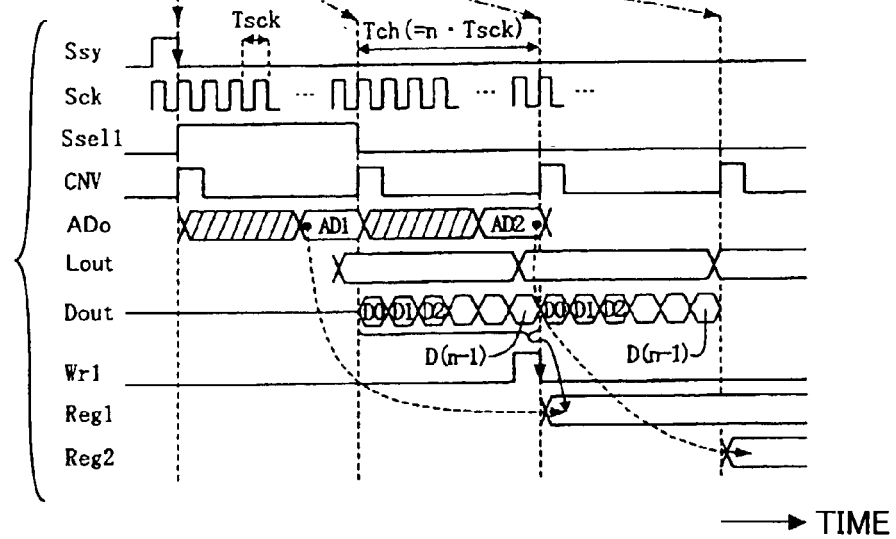

Next, a description will be given of the operation of the interface and the data communication method. FIG. 8 is a system block diagram showing an important part of the first embodiment of the signal processing apparatus related to the data communication. FIGS. 9A and 9B are timing charts for explaining the data communication method employed by the first embodiment of the signal processing unit.

As shown in FIG. 8, the important part related to the data communication subjects the signal ADin which has been subjected to the offset and gain adjustments to an A/D conversion in the A/D converter 3 in response to a conversion start signal CNV which is received from the control unit 11. A latch unit 40 holds the n-bit digital data output from the A/D converter 3 in response to a latch signal LEN which is received from the control unit 11.

A parallel-to-serial (P/S) converter 41 subjects the n-bit latched output Lout of the latch unit 40 to a parallel-to-serial (P/S) conversion in synchronism with a data communication clock Sck which has a period Tsck. A serial data Dout is output from the P/S converter 41. The serial data Dout from the P/S converter 41 is temporarily held in a shift register (SR) 42 which carries out a serial-to-parallel (S/P) conversion. The parallel output of the shift register 42 is successively stored in the registers Reg1 through RegM of the data holding unit 34 in response to the write signals Wr1 through WrM.

A control unit 43 carries out a communication control on the side of the second interface 33. The control unit 11 and the control unit 43 generate and output control signals to various parts based on the synchronizing signal Ssy which is output from the controller (not shown).

The control unit 11 outputs the selection signals Ssel1 through SselN in synchronism with the synchronizing signal Ssy. As described above, the selection signals Ssel1 through SselM are output in the order which is programmed in advance.

An ON-time Tch per channel is described by Tch=n×Tsck, where n denotes the number of bits of the A/D conversion. In addition, the offset control signal Sofs and the gain control signal Sgain may be changed and synchronized at the same time to the synchronizing signal Ssy. The control unit 11 outputs the conversion start signal CNV to the A/D converter 3 for every ON-time Tch.

In FIGS. 9A and 9B, it is assumed that the output timing of the conversion start signal CNV is such that the switching time of the input selector 1, the delay time of each of the circuits and the like are negligibly short, but it is of course possible to delay the conversion start signal CNV by a predetermined delay time if necessary. In addition, the latch signal LEN is output for every ON-time Tch so as to hold the converted data. Such an operation is carried out for M channels (hereinafter referred to as 1 frame). Of course, it is assumed that the period Tsmp of the synchronizing signal Ssy satisfy a relationship Tsmp≧M×Tch.

On the other hand, the control unit 43 outputs the write signal Wri (i=1, . . . , M) based on the synchronizing signal Ssy. In the case shown in FIGS. 9A and 9B, the first write signal Wr1 is output after a time 2Tch(=2n×Tsck) of the synchronizing signal Ssy, and the write signal Wr is successively output for every ON-time Tch per channel. The output order of the write signals Wr1 through WrM may be programmed as described above.

In addition, the synchronizing signal Ssy may be synchronized once for every k frames, where k is a natural number, or synchronized for every one or a plurality of channels, instead of synchronizing the synchronizing signal Ssy for each frame.

Next, a description will be given of the time-division-multiplexing of the command communication and the data transfer to the control unit 11.

The signal lines from the controller 19 to the control unit 11 shown in FIG. 2 may be shared, that is, used in common, for the command communication and the data transfer. In other words, the signal lines are used in time division, by providing a command communication phase CPh in which the command communication is made from the controller 19 to the control unit 11, and a data transfer phase DPh in which the data transfer is made. As a result, it is possible to reduce the number of required signal lines. Normally, the need to make the command communication does not occur frequently, and the command communication phase CPh will not interfere with the data transfer in the data transfer phase DPh.

A description will now be given of the communication method which time-divisionally provides the command communication phase CPh and the data transfer phase DPh. A signal line C/D is provided to supply to the control unit 11 a signal C/D for identifying the command communication CPh and the data transfer phase DPh, as indicated by a dotted line in FIG. 2 and also shown in FIG. 9A. The signal C/D indicates the command communication phase CPh during a high-level period thereof, and indicates the data transfer phase DPh during a low-level period thereof. If the data transfer is synchronized to a falling edge of the signal C/D, it is possible to use the signal C/D as the synchronizing signal Ssy.

In FIGS. 9A and 9B, the time amounting to 1 channel is allocated to the command communication phase CPh after the interval TM. When time-division-multiplexing the command communication, the definition of the frame is extended to the interval from the interval T1 to the next interval T1. In other words, the frame is added with the interval amounting to the command communication phase CPh inserted in the interval amounting to M channels.

In addition, the command communication to the control unit 11 is made by an access to a command register (not shown) within the control unit 11. One command is made up of an address of a command register, an access distinguishing bit distinguishing a read access and a write access, and write or read data. For example, the address is 7 bits, and the write or read data is 8 bits. The interval of the command communication phase CPh inserted within 1 frame may amount to a time in which one or a plurality of commands can be transferred or, a time in which one command can be transferred in a plurality of frames. That is, it is possible to transfer the address and the access distinguishing bit during the command communication phase CPh within the first frame, and to transfer the read or write data during the communication phase CPh within the next frame. By determining the method of inserting the command communication phase CPh in advance in this manner, it is possible to eliminate the signal line C/D indicated by the dotted line in FIG. 2.

It is not essential to provide a signal line exclusively for supplying the synchronizing signal Ssy to the control units 11 and 43 shown in FIG. 8. The synchronizing signal Ssy may be supplied to the control units 11 and 43 by the command communication. In other words, when an access is made to a predetermined command register within each of the control units 11 and 43, the synchronizing signal Ssy may be generated in the control units 11 and 43 at the same timing after completion of the access to the predetermined command register. In this case, it is possible to further reduce the signal lines.

Moreover, during a time in which no information recording or reproducing operation is carried out and the optical pickup 101 does not operate, such as during a start-up of the information recording and/or reproducing apparatus or a standby (or wait) mode of the information recording and/or reproducing apparatus, there is no need to transfer the A/D conversion data. Hence, if this time is always regarded as the command communication phase CPh, it is possible to quickly perform the initialization of the command registers and the like required when a large amount of command communication needs to be made. The operation mode of the information recording and/or reproducing apparatus may change to a mode which time-divisionally multiplexes the command communication phase CPh and the data transfer phase DPh when the optical pickup 101 starts to operate.

Figure 10:
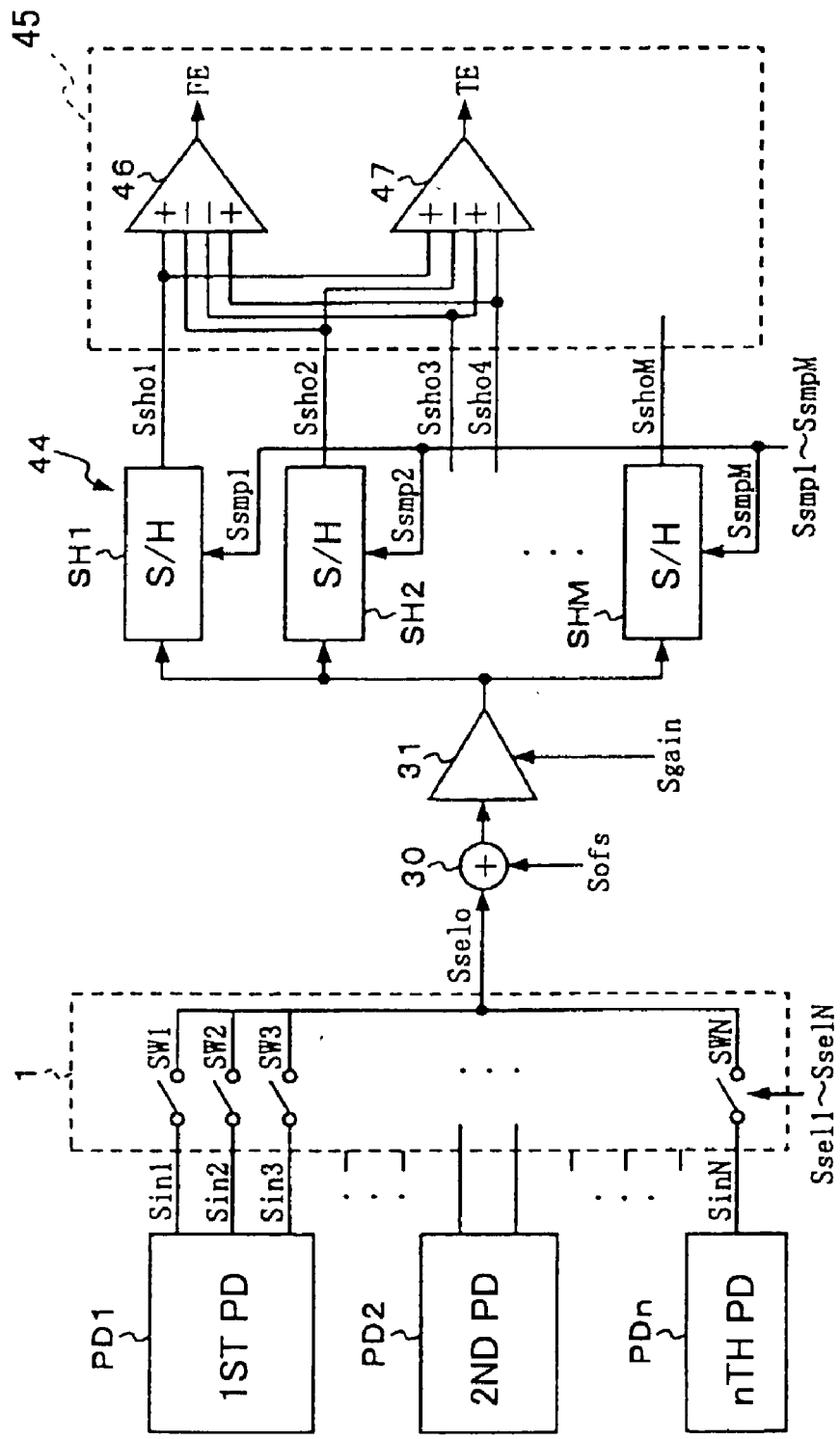
FIG. 10 is a system block diagram showing a structure of a light detection signal input section.

FIG. 10 is a system block diagram showing a structure of a light detection signal input section which is made up of the light receiving unit 103 and the light detection signal converter 21 described above.

In FIG. 10, the N photodetectors PD1 through PDN and the input selector 1 are the same as those shown in FIG. 3. Each of the selection signals Ssel1 through SselN are successively selected and output as the output signal Sselo depending on the programming of the control unit 11. The offset and gain of the output signal Sselo are adjusted by the offset adjuster 30 and the gain adjuster 31, similarly as described above. A sample-and-hold (S/H) circuit 44 is made up of M S/H circuits SH1 through SHM. Each of the S/H circuits SH1 through SHM samples and holds each of the light detection signals. A signal computing unit 45 generates servo error signals from at least a part of the outputs of the S/H circuits SH1 through SHM.

A description will be given of a case where the light receiving unit 103 is made up of the 4-part photodetector 35 shown in FIG. 5 and the signal computing unit 45 generates the focus error signal FE and the track error signal TE according to the formulas (1) and (2) described above.

In this case, the input selector 1 successively outputs the light detection signals VA, VB, VC, VD, . . . during the intervals T1, T2, T3, T4, . . . as the output signal Sselo, similarly as described above. The S/H circuit SH1 carries out a sampling operation during the interval T1 in response to a sampling signal Ssmp1, and carries out a hold operation during other intervals. In other words, the light detection signal VA which is selected during the interval T1 is sampled at the period Tsmp. Similarly, the S/H circuits SH2, SH3 and SH4 respectively carry out the sampling operation during the corresponding intervals T2, T3 and T4.

Accordingly, regardless of the input terminals of the input selector 1 to which the light detection signals are input, it is possible to program the selection order (or switching order) in the control unit 11 so that the light detection signal VA is output from the first S/H circuit SH1, the light detection signal VB is output from the second S/H circuit SH2, the light detection signal VC is output from the third S/H circuit SH3 and the light detection signal VD is output from the fourth S/H circuit SH4. For this reason, normal computing circuits may be used for the signal computing unit 45, and the focus error signal FE can be generated by a computing circuit 46 which carries out a computing process according to the formula (1), while the track error signal TE can be generated by a computing circuit 47 which carries out a computing process according to the formula (2). Even if the switching order of the selection signal Ssel is fixed, it is possible to realize the above described process by making the timings of the sampling signals Ssmp1 through SsmpM for the first through Mth S/H circuits SH1 through SHM programmable.

Figure 11:
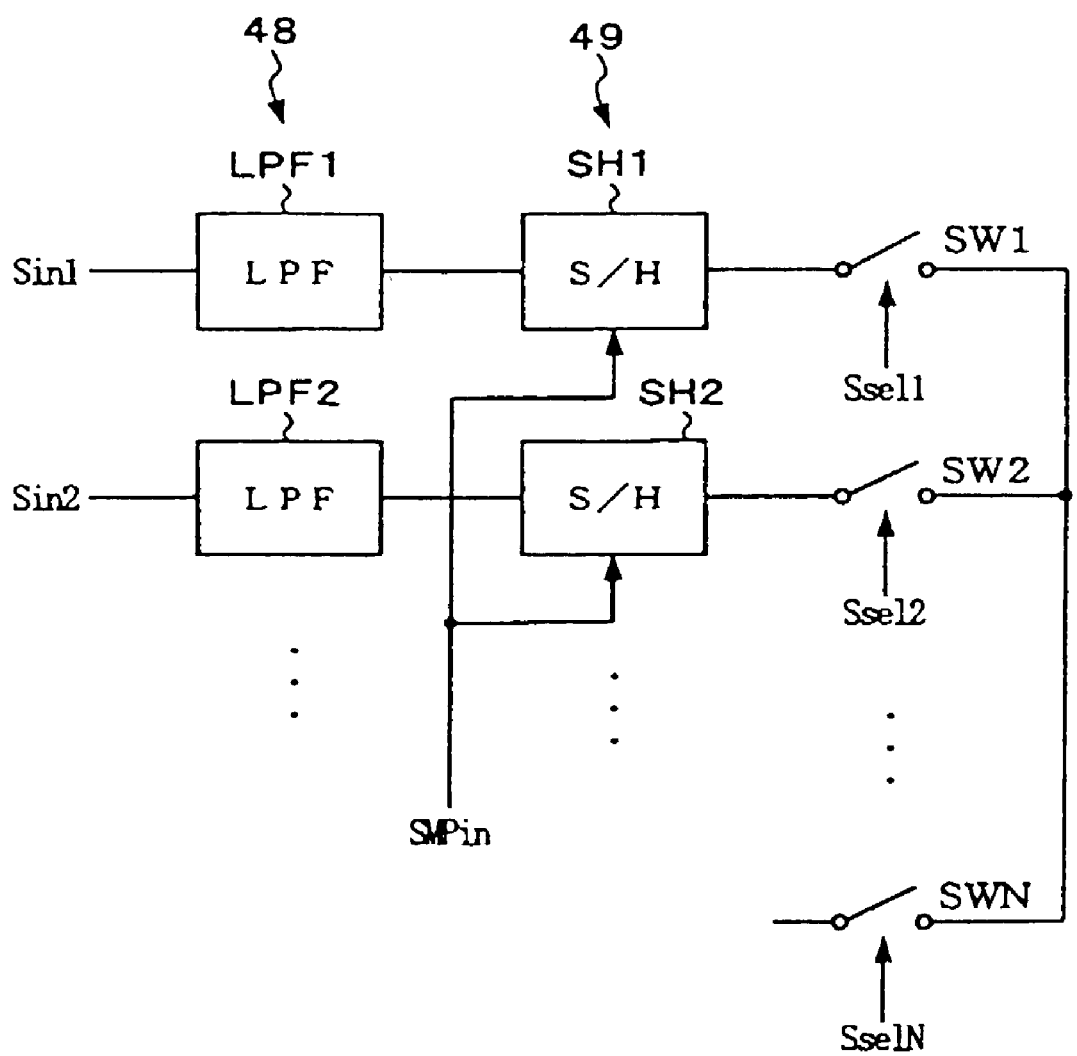
FIG. 11 is a system block diagram showing another structure of the input selector shown in FIG. 10.

Next, a description will be given of another structure of the input selector 1, by referring to FIG. 11. FIG. 11 is a system block diagram showing this another structure of the input selector 1 shown in FIG. 10.

As shown in FIG. 11, the input selector 1 includes a lowpass filter (LPF) 48, a sample-and-hold (S/H) circuit 49, and the switches SW1 through SWN. The lowpass filter 48 includes lowpass filters LPF1 through LPFN with respect to the switches SW1 through SWN. In addition, the S/H circuit 49 includes S/H circuits SH1 through SHN with respect to the switches SW1 through SWN. For the sake of convenience, only the lowpass filters LPF1 and LPF2 and the S/H circuits SH1 and SH2 are shown in FIG. 11 to simplify the drawing. With respect to the input light detection signal Sin, the lowpass filters LPF1 through LPFN of the lowpass filter 48 eliminates an unwanted high-frequency component, and the S/H circuits SH1 through SHN of the S/H circuit 49 sample and hold outputs of the lowpass filters LPF1 through LPFN at the same timing of a timing signal SMPin, before supplying the input light detection signal Sin to the switches SW1 through SWN. Although a maximum delay error of Tsmp may occur, it is possible in this case to obtain the A/D conversion value at the same time. For this reason, when generating the servo error signal at the subsequent circuit stage, it is possible to mutually cancel the noise component of the same phase which cannot be completely eliminated by the lowpass filter 48, and the servo error signal can be generated more accurately.

As a conventional method of stabilizing the servo operation during the recording mode, there is a method which holds the light detection signal obtained from the reflected light beam from the recording medium during an interval which is synchronized to a write interval in which the amount of light is large, and samples the light detection signal during other intervals, so as not to use the signal during the write interval for the generation of the servo signal. The servo operation is stabilized in this case by eliminating the change in the servo gain caused by the change in the amount of light during the recording mode.

Hence, when the S/H circuit 49 in this embodiment is controlled to carry out the sampling operation in the recording mode during the interval in which the timing signal SMPin has the high level and which is other than the write interval, it is possible to eliminate the change in the servo gain caused by the change in the amount of light during the recording mode, and accordingly stabilize the servo operation.

The light receiving unit 103 may be formed by a photodetector package which does not include an internal current-to-voltage converter, and in this case, the light detection signal output from the light receiving unit 103 is a current. In this case, from the point of view of reducing the space and cost required for providing the current-to-voltage converter, it is desirable to integrate the current-to-voltage converter in the signal processing unit 104 in the form of an integrated circuit (IC).

Figure 12:
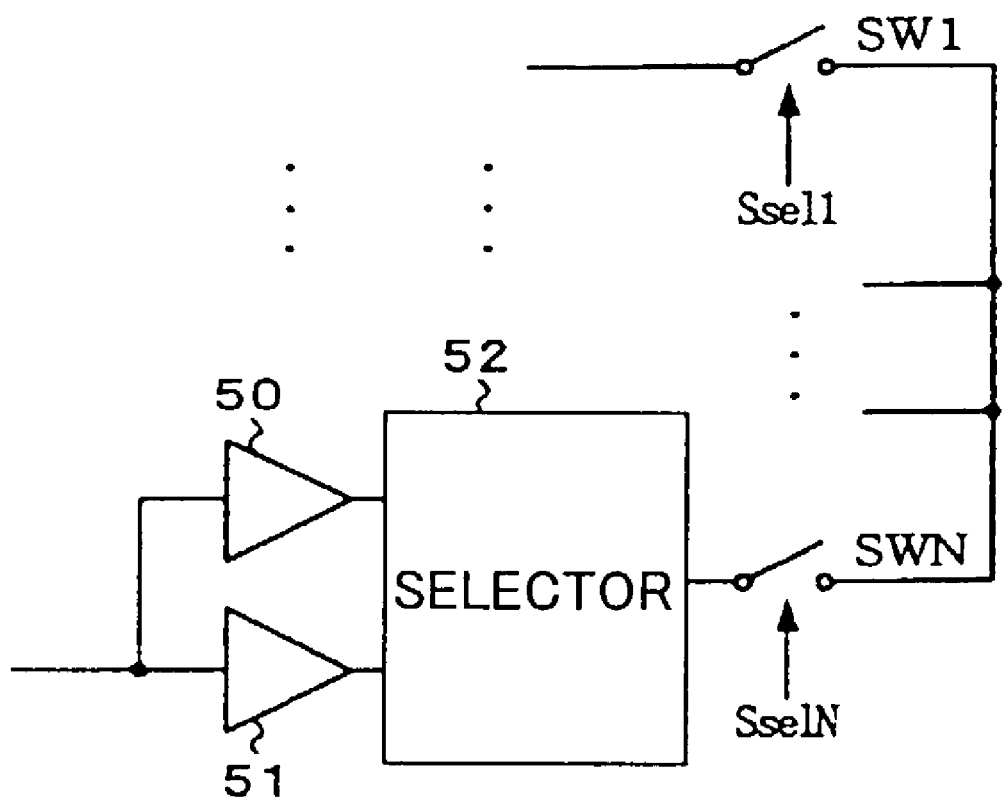
FIG. 12 is a system block diagram showing still another structure of the input selector shown in FIG. 10.

A description will be given of still another structure of the input selector 1, by referring to FIG. 12. FIG. 12 is a system block diagram showing still another structure of the input selector 1 shown in FIG. 10.

As shown in FIG. 12, a circuit part made up of a current-to-voltage (I/V) converter 50, a voltage buffer 51 and a selector 52 is connected at a stage preceding at least one of the switches SW1 through SWN. The selector 52 selectively outputs the output signal from one of the I/V converter 50 and the voltage buffer 51. The voltage buffer 51 may be omitted. In addition, the selector 52 may be set in advance, that is programmed, to select one of the output signals of the I/V converter 50 and the voltage buffer 51. In FIG. 12, the circuit part made up of the I/V converter 50, the voltage buffer 51 and the selector 52 is provided only with respect to the switch SWN, but it is of course possible to provide this circuit part with respect to some or all of the other switches SW1 through SWN−1.

Therefore, it is possible to cope with the situation by appropriately programming the control unit 11, regardless of whether the light receiving unit 103 is made up of the type which outputs a current or a voltage as the light detection signal, and also regardless of the input terminals to which the light detection signals are supplied to the input selector 1.

The light detection signal which is output from the I/V converter 50 may be a positive polarity signal with respect to a predetermined reference voltage such that the voltage becomes larger as the amount of received light becomes larger or, a negative polarity signal with respect to the predetermined reference voltage. In order to effectively utilize the A/D converter 3 which is provided at the subsequent circuit stage, it is desirable to unify the kind (or polarity) of light detection signal.

Figure 13:
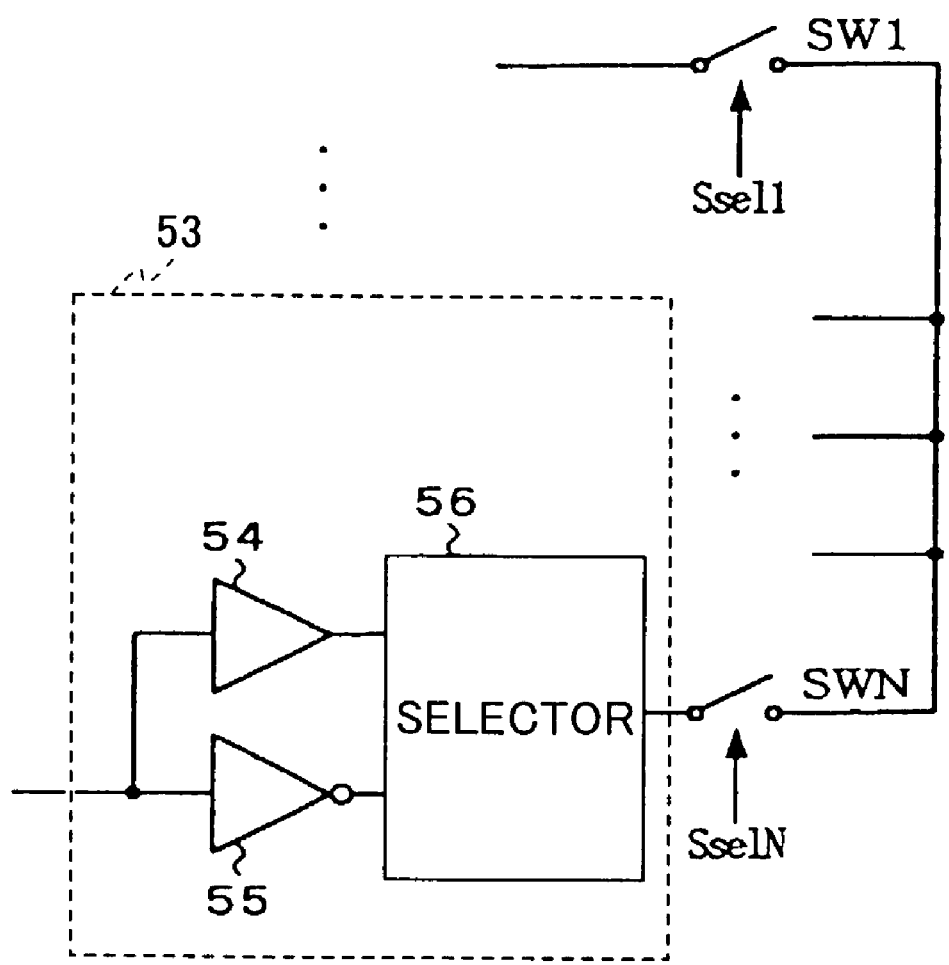
FIG. 13 is a system block diagram showing a another structure of the input selector shown in FIG. 10.

Next, a description will be given of another structure of the input selector 1 which can unify the kind of light detection signal, by referring to FIG. 13. FIG. 13 is a system block diagram showing another structure of the input selector 1 shown in FIG. 10.

As shown in FIG. 13, a polarity selector 53 is connected at a stage preceding at least one of the switches SW1 through SWN. The polarity selector 53 can invert the polarity of the input light detection signal. The polarity selector 53 is made up of a non-inverting amplifier 54, an inverting amplifier 55, and a selector 56 which selectively outputs an output of one of the amplifiers 54 and 55. The selector 56 may be set in advance, that is programmed, to select one of the output signals of the amplifiers 54 and 55. In FIG. 13, the polarity selector 53 is provided only with respect to the switch SWN, but it is of course possible to provide this polarity selector 53 with respect to some or all of the other switches SW1 through SWN−1.

Figure 14:
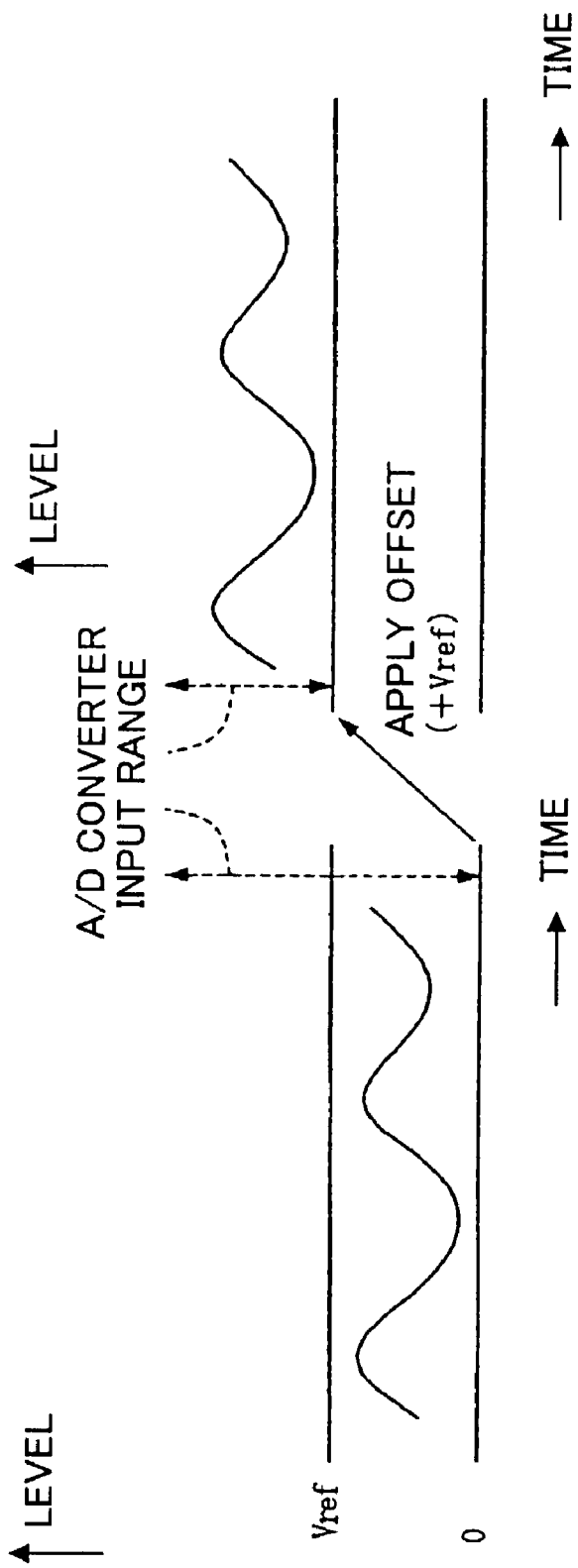
FIGS. 14A and 14B are diagrams for explaining an offset of an offset adjuster.

Instead of using the polarity selector 53, it is also possible to apply a predetermined offset to the offset adjuster 30. FIGS. 14A and 14B are diagrams for explaining the offset of the offset adjuster 30. For example, if the input light detection signal is a negative polarity signal with respect to a reference voltage Vref as shown in FIG. 14A and an input dynamic range is 0 to Vref, the input to the A/D converter 3 becomes a positive polarity signal with respect to the reference voltage Vref as shown in FIG. 14B by applying the reference voltage Vref as the offset to the offset adjuster 30. Accordingly, the input range of the A/D converter 3 does not need to be unnecessarily large. In addition, it is possible to carry out a correction by an amount corresponding to the applied offset voltage after the A/D conversion, such as in the servo signal computing unit 13.

Figure 15:
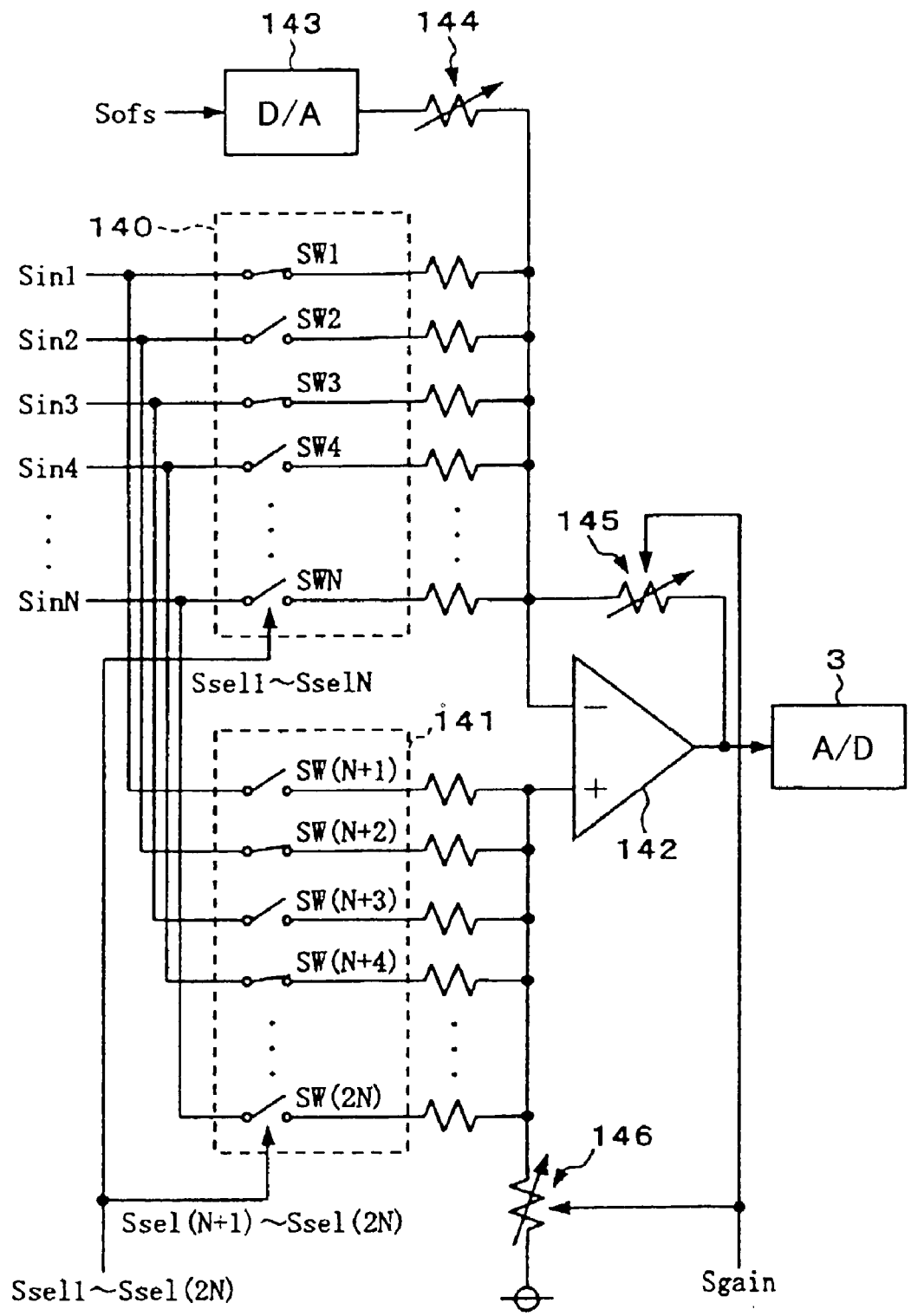
FIG. 15 is a system block diagram showing another structure of the input selector and the adjuster.

FIG. 15 is a system block diagram showing another structure of the input selector 1 and the adjuster 2. The input light detection signals Sin1 through SinN are respectively supplied to input terminals of N switches SW1 through SWN which form a switching circuit 140. Output terminals of the N switches SW1 through SWN are connected to an inverting input terminal of an operational amplifier 142 via corresponding resistors. The input light detection signals Sin1 through SinN are also respectively supplied to input terminals of N switches SW(N+1) through SW(2N) which form a switching circuit 141. Out put terminals of the N switches SW(N+1) through SW(2N) are connected to a non-inverting input terminal of the operational amplifier 142 via corresponding resistors.

The resistors which are connected to the switches SW1 through SWN and the switches SW(N+1) through SW(2N) all have the same resistance. In addition, the switches SW1 through SWN are turned ON/OFF in response to the selection signals Ssel1 through SselN, and the switches SW(N+1) through SW(2N) are turned ON/OFF in response to the selection signals Ssel(N+1) through Ssel(2N). A variable resistor 145 is provided as a feedback resistor with respect to the operational amplifier 142. A variable resistor 146 is connected between the non-inverting input terminal of the operational amplifier 142 and a reference voltage. Resistances of the variable resistors 145 and 146 are set by the gain control signal Sgain. A digital-to-analog (D/A) converter 143 subjects the offset control signal Sofs to a digital-to-analog (D/A) conversion, and an output of the D/A converter 143 is supplied to the inverting input terminal of the operational amplifier 142 via a variable resistor 144. The offset adjusting range can be changed by varying the resistance of the variable resistor 144.

For example, if the selection signals Ssel are supplied so as to turn ON the switches SW1, SW3, SW(N+2) and SW(N+4) during the input selecting interval Ti, an output OUT of the operational amplifier 142 can be described by the following formula (3), thus making it possible to carry out an add-subtract operation with respect to the input light detection signals. In the formula (3), G denotes a gain, and Ofs denotes an offset.

$$OUT = G \times (-Sin\ 1 + Sin\ 2 - Sin\ 3 + Sin\ 4 - Ofs) \quad (3)$$

Accordingly, by using the structure shown in FIG. 15, the add-subtract operation with respect to arbitrary ones of the input light detection signals Sin1 through SinN and the gain and offset adjustments can be carried out by the operational amplifier 142 depending on the setting of the selection signals Ssel, and the output OUT of the operational amplifier 142 can be converted into a digital value by supplying the output OUT to the A/D converter 3. If only one of the switches SW1 through SW(2N) is selected, the light detection signal can be selected by the same circuit, and the polarity selection can also be made by appropriately controlling the switching circuits 140 and 141.

Although not shown in FIG. 15, a switch may be provided in parallel with each of the resistors connected to the output terminals of the switches SW1 through SWN within the switching circuit 140, so as to short-circuit each of these resistors when the switch is turned ON. In this case, if the input light detection signals are small currents, the switch can be turned ON to short-circuit each of the resistors and operate the operational amplifier 142 as a current-to-voltage converter.

By converting the signal subjected to the add-subtract operation into the digital value and transferring the digital value, it is possible in some cases to reduce the number of data to be transferred between the first and second interfaces 32 and 33 compared to the case where each light detection signal data prior to the operation is transferred and the digital operation is carried out after the transfer. As a result, it is possible to reduce the transfer rate, and accordingly reduce unwanted radiation. Furthermore, an operation means such as the adder 81 shown in FIG. 7 may be omitted.

Next, a description will be given of the A/D conversion of the processed broad-band signal.

In the DVD-ROM or the like, a tracking technique called a phase error detection method is employed. This phase error detection method (hereinafter simply referred to as a DPD method) compares the phases of two light detection signals which are output from two diagonally arranged photodetector parts of the 4-part photodetector, and carries out the tracking operation by detecting the phase error between the beam spot and the track from an amount of phase lead or phase lag of the two light detection signals when the beam spot passes a position deviated from the pit center.

Each of the light detection signals and the signal processing unit 104 therefor require the RF band. Hence, when carrying out a digital signal processing by carrying out the A/D conversion, it is necessary to use a high-speed A/D converter, which consequently leads to increase in the circuit scale and increase in the power consumption. On the other hand, if the speed of the A/D converter is not sufficiently high, it may not be possible to accurately generate the signals.

In addition, when generating the other servo error signals, it is unnecessary to carry out the broad-band signal processing described above, and it is inefficient when sharing the circuit in common for the signal processings.

On the other hand, the DPD signal which is generated by carrying out the signal processing described above has a band similar to the bands of the other servo error signals.

Figure 16:
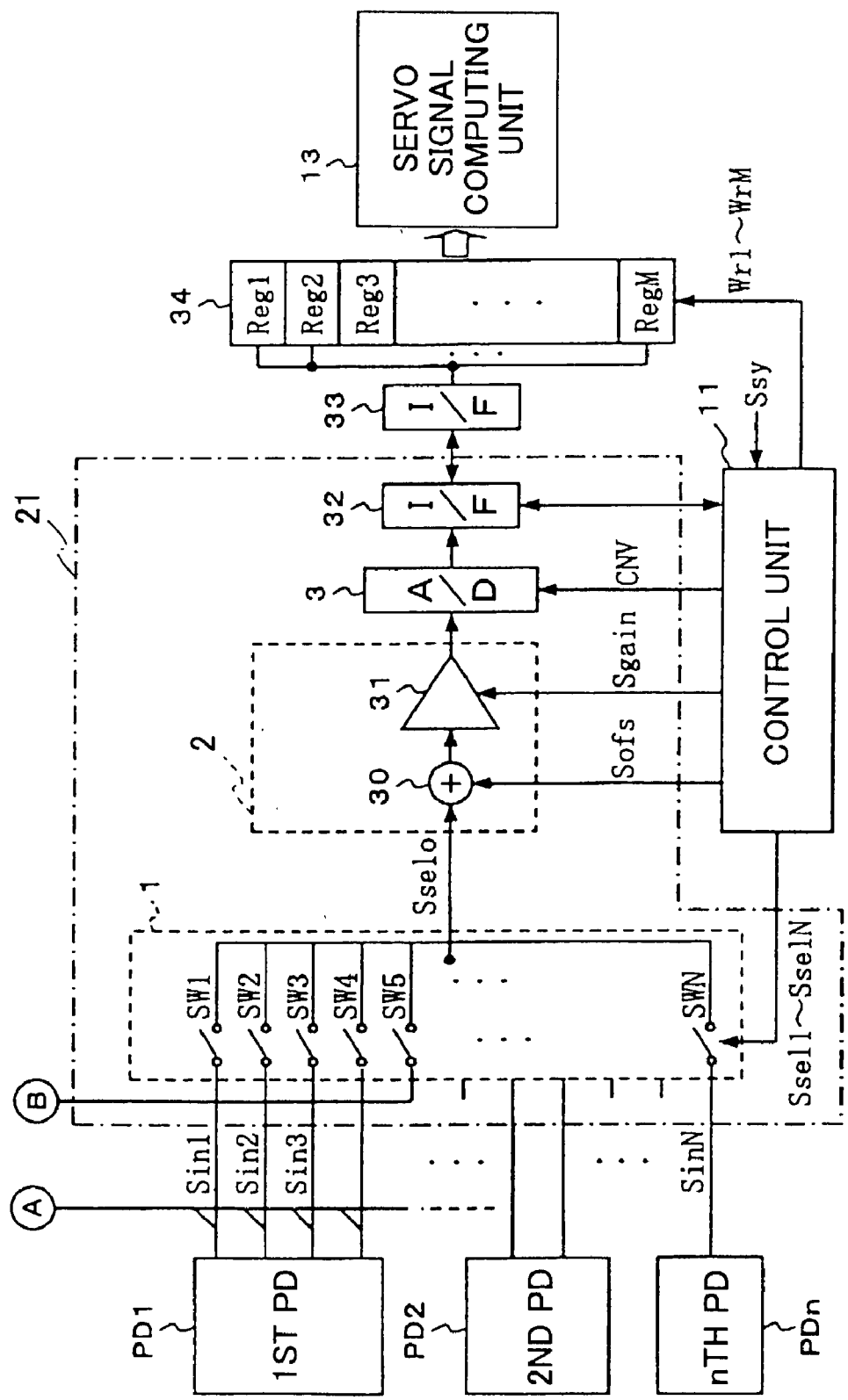
FIG. 16 is a system block diagram showing an important part of a second embodiment of the signal processing apparatus according to the present invention.
Figure 17:
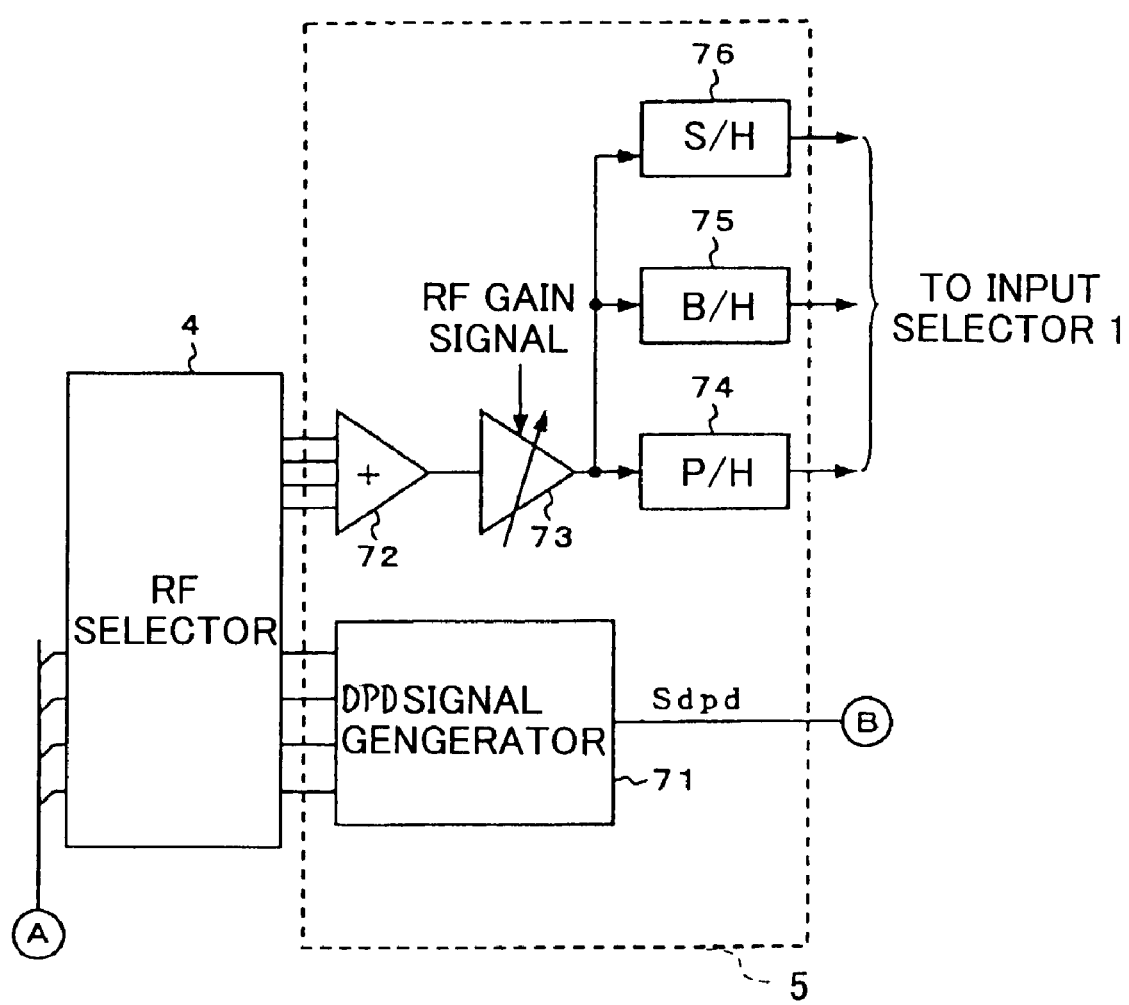
FIG. 17 is a system block diagram showing an important part of the second embodiment of the signal processing apparatus.

FIGS. 16 and 17 are system block diagrams showing important parts of a second embodiment of the signal processing apparatus according to the present invention. In FIGS. 16 and 17, those parts which are the same as those corresponding parts in FIGS. 2 and 3 are designated by the same reference numerals, and a description thereof will be omitted.

The first photodetector PD1 shown in FIG. 16 receives the reflected light beam from the recording medium 100 when carrying out the tracking operation according to the DPD method, and has a structure shown in FIG. 5, for example.

A DPD signal generator 71 shown in FIG. 17 may be realized by a known signal processing circuit, and a detailed description thereof will be omitted. The DPD signal generator 71 generates a DPD signal Sdpd which is supplied to one of the input terminals of the input selector 1. In this particular case, the DPD signal Sdpd is supplied to the input terminal of the switch SW5 of the input selector 1 shown in FIG. 16. The signal processing band required for the DPD signal Sdpd may be the same as those of the other servo error signals and the light detection signals prior to the generation of the servo error signals. Hence, the signal processing in the subsequent circuit stage is carried out similarly to that described above, and the digital value obtained by the A/D conversion is stored in a predetermined one of the registers Reg1 through RegM of the data holding unit 34.

Accordingly, the signals can be generated with a high accuracy because the high-speed analog signal processor 5 is used for the portion which requires the signal processing in the RF band. In addition, since the A/D conversion is carried out and the digital data is transferred when the required band becomes narrow, it is possible to prevent signal deterioration caused by noise during the data transfer, even when a high-speed A/D converter is not used. Moreover, the same circuit can be used for the light detection signals prior to the generation of the other servo error signals, and the transfer signal lines can also be shared. As a result, it is possible to reduce the circuit scale and to reduce the number of transfer signal lines.

When the RF selector 4 having a structure similar to that of the input selector 1 shown in FIG. 3 is provided at the circuit stage preceding-the DPD signal generator 71, and one of the light detection signals Sin1 through SinN is selected, it is also possible to obtain the effects of improving the degree of freedom with which the parts of the optical pickup 101 may be arranged. The selection of one of the light detection signals Sin1 through SinN by the switches forming the RF selector 4 is peculiar to each optical pickup 101, and the switch which is turned ON to select one light detection signal is not changed during operation.

The high-speed analog signal processor 5 includes the DPD signal generator 71, an adder amplifier 72, a variable gain amplifier 73, a peak hold (P/H) circuit 74, a bottom hold (B/H) circuit 75, and a sample and hold (S/H) circuit 76, as shown in FIG. 17. The envelope signal of the RF signal is generated by the P/H circuit 74 or the B/H circuit 75. The S/H circuit 76 samples and holds a predetermined level of the RF signal at the time of the recording used for carrying out a running optimum power control (OPC) which controls the recording power according to the change in the amount of the reflected light beam caused by recording marks which are formed on the recording medium 100 during the recording. The signal processing unit with respect to the envelope signal of the RF signal and the output of the S/H circuit 76 needs to carry out the signal processing in the high band, similarly to the DPD signal. But since the generated signals themselves do not require a broad-band, the signal processing may be carried out similarly for these signals.

The adder amplifier 72 adds the light detection signals with respect to the main spot, and generates the RF signal. The adder amplifier 72 may be provided within the light receiving unit 103 to output the RF signal from the light receiving unit 103, depending on the structure of the light receiving unit 103. In the case where the adder amplifier 72 is provided within the light receiving unit 103, it is possible to omit the adder amplifier 72 within the high-speed analog signal processor 5. Of course, the light receiving unit 103 may be designed so that it is possible to selectively output the output of the photodetector directly or the output of the internal adder amplifier 72.

The variable gain amplifier 73 amplifies the RF signal based on an RF gain signal which is supplied from the control unit 11. The variable gain amplifier 73 amplifies the RF signal so that the input level to the circuits provided at the subsequent circuit stages can be increased to improve the accuracy of detecting the error signals.

Figure 18:
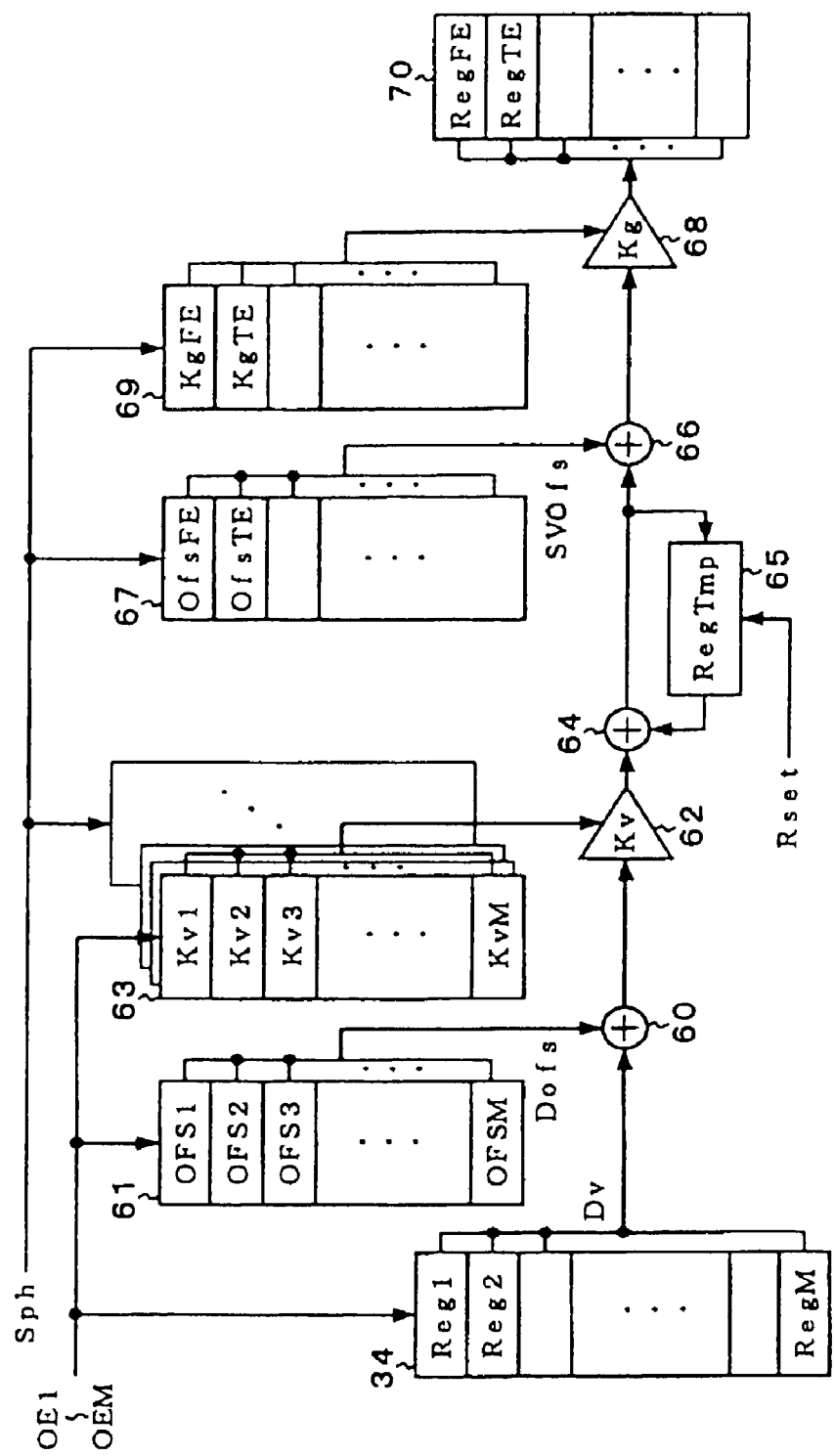
FIG. 18 is a system block diagram showing an internal structure of a servo signal computing unit.
Figure 19:
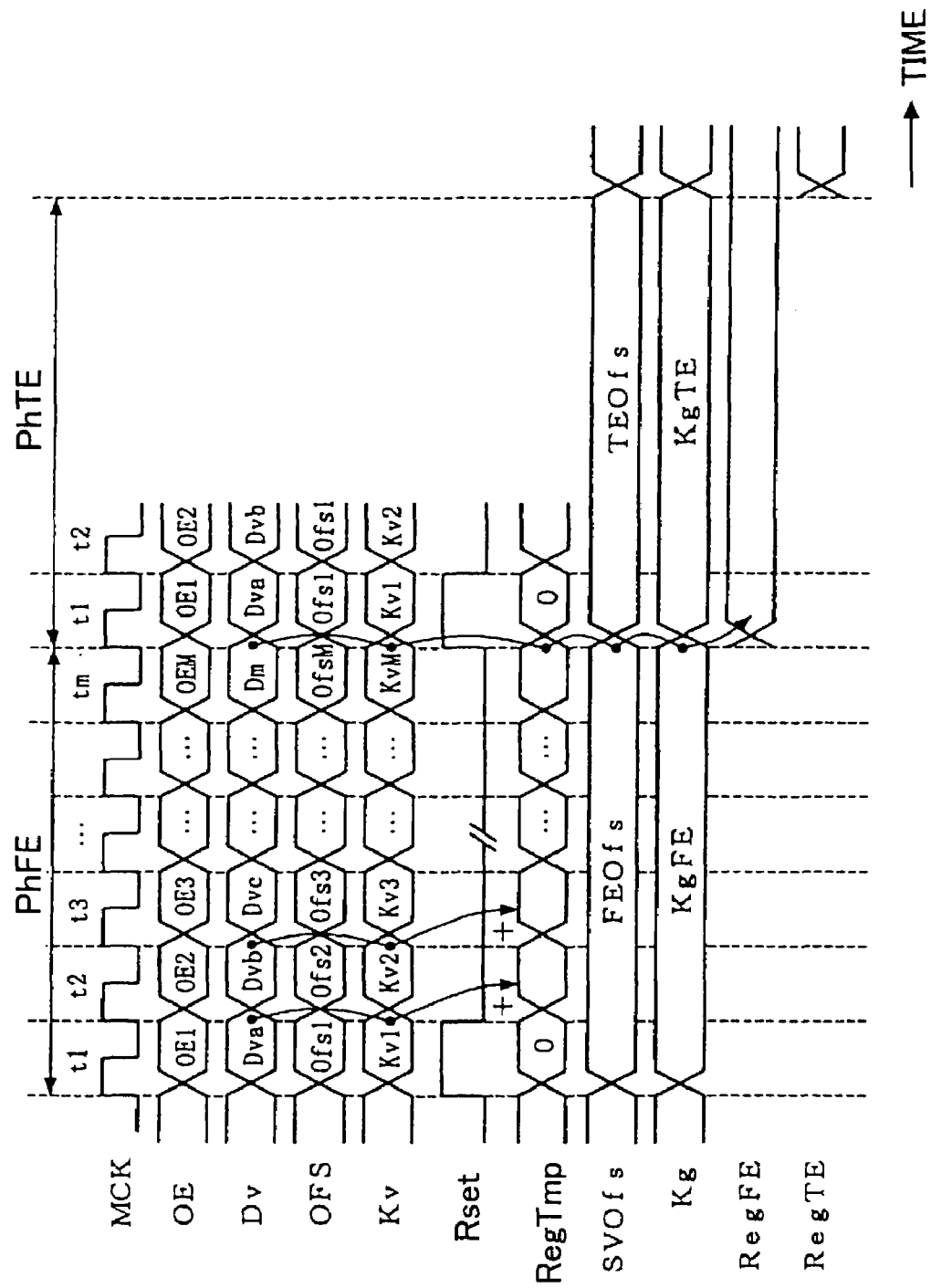
FIG. 19 is a timing chart for explaining the operation of the servo signal computing unit shown in FIG. 18.

Next, a description will be given of the generation of the servo error signal by the digital signal processing, by referring to FIGS. 18 and 19. FIG. 18 is a system block diagram showing an internal structure of the servo signal computing unit 13, and FIG. 19 is a timing chart for explaining the operation of the servo signal computing unit 13 shown in FIG. 18.

According to the servo signal computing unit 13 having the structure shown in FIG. 18, it is possible to cope with various methods or operations of generating the servo error signals, by changing the coefficients which will be described later. For the sake of convenience, a description will be given of a case where the focus error signal FE is generated according to the astigmatism technique and the track error signal TE is generated according to the differential push-pull technique, based on the operations described by the following formulas (4) and (5). In the formula (5), K1 denotes a constant which is determined from a ratio of the amount of light between the main beam and the sub beam, and it is possible to correct the offset component which is generated due to a deviation of the optical axis.

$$FE=(VA+VD)-(VB+VC) \quad (4)$$

$$TE=(VA+VC)-(VB+VD)-K1\{(VE+VG)-(VF+VH)\} \quad (5)$$

The registers Reg1 through RegM of the data holding unit 34 shown in FIG. 18 respectively store digital values which are obtained by A/D conversion of the light detection signals. In this particular case, the registers Reg1 through Reg8 of the data holding unit 34 respectively store digital values Dva through Dvh of light detection signals VA through VH. The contents of the registers Reg1 through RegM are updated for every period Tsmp. The registers Reg1 through RegM output the register value thereof when selected by corresponding output enable signals OE1 through OEM. The output enable signal OE is successively switched from OE1 to OEM in response to a clock MCK. Hence, the values Dva, Dvb, ..., Dvh, ... are successively output as an output Dv of the data holding unit 34.

The circuits following the data holding unit 34 also operate in response to the clock MCK.

An adder 60 adds the output Dv of the data holding unit 34 and a pre-operation offset value Dofs, and a multiplier 62 multiplies a coefficient Kv to an output of the adder 60. The offset value Dofs is obtained from one of pre-operation offset registers OFS1 through OFSM of a pre-operation offset register group 61 in response to the output enable signals OE1 through OEM. The coefficient Kv is obtained from one of operation coefficient registers Kv1 through KvM of an operation coefficient register group 63 in response to the output enable signals OE1 through OEM. For example, during an ON-period (or high-level period) of the output enable signal OE1, an output of the multiplier 62 becomes Kv1(Dva+ofs1).

The pre-operation offset registers OFS1 through OFSM of the pre-operation offset register group 61 respectively store offset adjustment values with respect to the light detection signals VA through VH in this particular case. The operation coefficient register group 63 includes a plurality of banks, and each bank is made up of M operation coefficient registers Kv1 through KvM. The bank of the operation coefficient register group 63 is switched in response to an computing phase signal Sph. The computing phase signal Sph indicates computing phases for generating the various servo error signals, including a FE computing phase PhFE for generating the focus error signal FE and a TE computing phase PhTE for generating the track error signal TE. When generating the focus error signal FE and the track error signal TE based on the formulas (4) and (5) described above, coefficients shown in the following Table 1 are stored in the operation coefficient register group 63.

TABLE

|  | BANK FE | BANK TE |
| --- | --- | --- |
| Kv1 | 1 | 1 |
| Kv2 | −1 | −1 |
| Kv3 | −1 | 1 |
| Kv4 | 1 | −1 |
| Kv5 | 0 | −K1 |
| Kv6 | 0 | K1 |
| Kv7 | 0 | −K1 |
| Kv8 | 0 | K1 |
| ... | 0 | 0 |
| KvM | 0 | 0 |

An adder 64 adds the output of the multiplier 62 and an output of a register (RegTmp) 65. The register 65 holds an output of the adder 64 of 1 clock before, and is reset by a reset signal Rset during an ON-period (or high-level period) of the output enable signal OE1.

An adder 66 adds the output of the adder 64 and a servo signal offset SVOfs, and a multiplier 68 multiplies a coefficient Kg to an output of the adder 66. The servo signal offset SVOfs is an offset adjustment value for the servo error signal, and the coefficient Kg is a gain for the servo error signal. The servo signal offset SVOfs is obtained from one of registers of a register group 67, and the servo signal offset SVOfs is switched in response to the computing phase signal Sph. The coefficient Kg is obtained from one of registers of a register group 69, and the coefficient Kg is switched in response to the computing phase signal Sph. A servo error signal register group (RegSV) 70 is made up of a plurality of registers which form a holding means for storing the servo error signals.

During the FE computing phase PhFE shown in FIG. 19, the output RegTmp of the register 65 successively takes the values according to the following formulas (6) through (9) at times t1, t2, t3 and t4. The focus error signal FE is generated from the output of the adder 64 at a time tm.

$$\text{RegTmp(at time } t1) = 0 \quad (6)$$

$$\text{RegTmp(at time } t2) = Dva + OFS1 \quad (7)$$

$$\text{RegTmp(at time } t3) = (Dva+OFS1) + \{-1 \times (Dvb+OFS2)\} \quad (8)$$

$$\text{RegTmp(at time } t4) = (Dva+OFS1) + \{-1 \times (Dvb+OFS2)\} + \{-1 \times (Dvc+OFS3)\} \quad (9)$$

In other words, the output RegTmp of the register 65 at the time tm becomes as indicated by the following formula (10) if the offset adjustment values are omitted.

$$\text{RegTmp(at time } tm) = Dva - Dvb - Dvc + Dvd + \{0 \times (Dve + \ldots)\} \quad (10)$$

In addition, at this time tm, an FE offset value FEOfs is added to the output of the adder 64 and an FE gain is thereafter multiplied to generate the focus error signal FE, and this focus error signal FE is stored in the register RegFE of the register group 70.

Similarly, when the computing phase switches to the TE computing phase PhTE, the output O of the adder 64 at the time tm becomes as indicated by the following formula (11) if the offset adjustment values are omitted.

$$O = Dva - Dvb + Dvc - Dvd - K1 \times Dve + K1 \times Dvf - K1 \times Dvg + K1 \times Dvh \quad (12)$$

In addition, at this time tm, an TE offset value TEOfs is added to the output of the adder 64 and an TE gain is thereafter multiplied to generate the track error signal TE, and this track error signal TE is stored in the register RegTE of the register group 70.

Furthermore, the other servo signals which are required for the control are generated during the subsequent computing phases. For example, such other servo signals include a lens position signal, a track cross signal, a sum signal, and a tilt servo signal. The lens position signal indicates a position of a lens within the optical pickup 101 or optical system. The track cross signal indicates a timing when the light beam crosses a track. The sum signal indicates a sum of predetermined light detection signals output from the light receiving unit 103. The tilt servo signal is used for correcting the tilt.

Therefore, the same circuit can be used to generate a plurality of kinds of servo error signals, thereby making it possible to reduce the circuit scale. In addition, the servo error signals can be generated according to various methods or operations by changing the operation coefficient Kv, so as to cope with various kinds of the optical pickup 101.

A media format judging section (not shown) may be provided to judge the media format of the recording medium. A known media format judging circuit which judges the type or media format of the recording medium may be used for such a media format judging section. In this case, the servo signal computing unit 13 may change the contents of the operation based on the media format judged by the media format judging section. Hence, if the information recording and/or reproducing apparatus is designed to operate with recording media having a plurality of different media formats and the methods of generating the servo error signals differ, it is possible to cope with each case by identifying the type of the recording medium and changing the operation coefficient Kv depending on the identified type of the recording medium. As a result, it becomes unnecessary to provide an independent circuit for generating each servo error signal, and the circuit scale can be effectively reduced.

If a high-speed operation process is required, similar computing units may be provided in parallel, and the operation process may be carried out by a parallel processing.

During the computing phases described above, each A/D conversion data must be made definite so as not to be updated. By using the command communication phase for the computing phases, it is possible to efficiently make the data and command communications.

In addition, if the output of the servo error signal register group (RegSV) 70 which stores the operation result is converted into an analog signal by a D/A converter (or D/A converting means), it becomes possible to use an existing servo processor which is designed to operate in response to an analog servo error signal. Moreover, if a plurality of sample-and-hold circuits are provided to sample and hold the output of this D/A converter so as to hold the servo error signals generated at each of the, computing phases, it is possible to share the D/A converter in common by the plurality of servo error signals.

Figure 20:
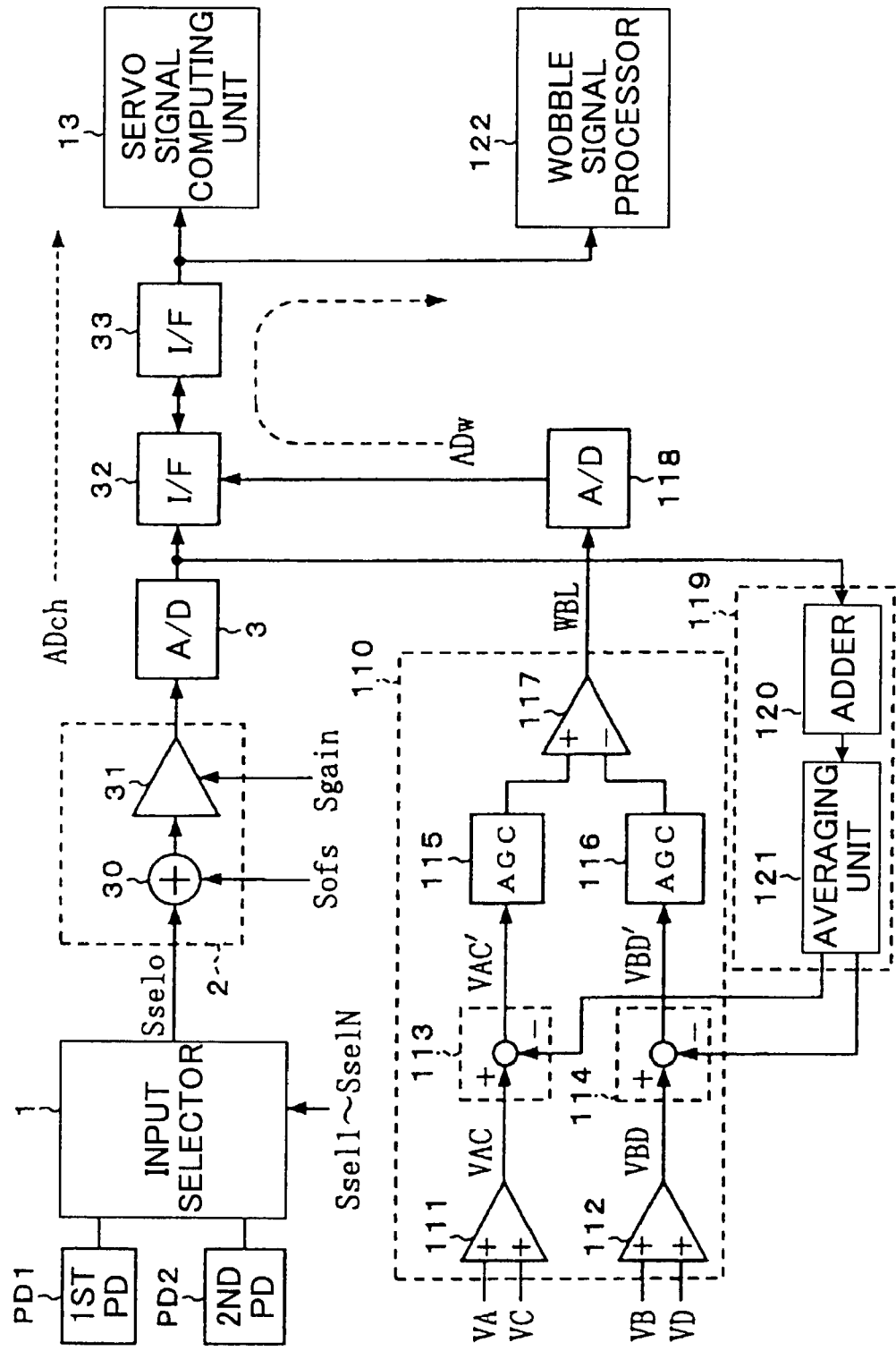
FIG. 20 is a system block diagram showing an internal structure of a wobble signal generator shown in FIG. 2 together with related parts.

Next, a description will be given of the wobble signal generator 6, by referring to FIG. 20. FIG. 20 is a system block diagram showing an internal structure of the wobble signal generator 6 shown in FIG. 2 together with related parts. In FIG. 20, those parts which are the same as those corresponding parts in FIGS. 2 and 3 are designated by the same reference numerals, and a description thereof will be omitted.

In FIG. 20, it is assumed for the sake of convenience that a wobble signal generating circuit 110 receives the light detection signals from the light receiving unit 103 having the structure shown in FIG. 5. The wobble signal generating circuit 110 generates a so-called push-pull signal PP based on the following formula (12), and generates a wobble signal WBL by extracting a wobble signal component from the push-pull signal PP. The wobble signal component is caused by a recording track (for example, groove) which wobbles at a predetermined frequency.

$$PP=(VA+VC)-(VB+VD) \tag{12}$$

An adder amplifier 111 adds the light detection signals VA and VC to output a signal VAC, and an adder amplifier 112 adds the light detection signals VB and VD to output a signal VBD.

D.C. component eliminating circuits 113 and 114 respectively eliminate D.C. components of the signals VAC and VBD output from the adder amplifiers 111 and 112, by subtracting D.C. elimination signals generated from a D.C. component extracting circuit 119 from the signals VAC and VBD. Output signals VAC' and VBD' of the D.C. component eliminating circuits 113 and 114 are respectively supplied to automatic gain control (AGC) circuits 115 and 116.

In the D.C. component extracting circuit 119, an adder 120 adds the digital values of the light detection signals VA through VD which are obtained from the A/D converter 3, to obtain signals VA+VC and VB+VD. In addition, an averaging circuit 121 calculates the D.C. elimination signals from the signals VA+VC and VB+VD. Further, the added digital values are increased or decreased by the amount of gain adjusted by the gain adjuster 31, and thus, it is necessary to carry out a correction to match the gains of the adder amplifiers 111 and 112. Each of the D.C. component eliminating circuits 113 and 114 may be formed by a highpass filter (HPF). But normally, a highpass filter having a low cutoff frequency so as to eliminate the D.C. component requires a capacitor having a large capacitance, which consequently increases the chip size of the integrated circuit and requires a terminal for externally connecting the capacitor.

However, according to this embodiment, the problems caused by the capacitor having the large capacitance will not occur, and the band of the D.C. component eliminating signals which are generated can be changed by modifying the averaging circuit 121.

The AGC circuits 115 and 116 respectively adjust the gains of the signals VAC' and VBD' automatically so that the amplitudes of the signals VAC' and VBD' become a predetermined value. A subtracter amplifier 117 subtracts an output of the AGC circuit 116 from an output of the AGC circuit 115, and generates the wobble signal WBL.

The wobble signal WBL is subjected to an A/D conversion in an A/D converter 118, and is transferred via the first and second interfaces 32 and 33. The data communication method and the operation of the interfaces 32 and 33 may be realized similarly to the operation of the structure shown in FIG. 8 described above in conjunction with the timing charts shown in FIGS. 9A and 9B.

A wobble signal processor 122 carries out a digital signal processing to generate the binary wobble signal and to demodulate the address information according to a predetermined media format of the recording medium 100.

When tracking a prerecorded region on the recording medium 100, the recorded RF signals are multiplexed (superimposed or mixed) with the same phase and detected in the signals VAC and VBD. The amplitudes of the multiplexed RF signal components are dependent on the amounts of light received, and can be eliminated by a subtraction if the amounts of light received are the same.

However, if the center of the beam spot deviates from division lines or from a central intersecting point of the division lines which partition the photodetector parts of the multi-part photodetector due to a deviation in the optical axis or an initial adjustment error of the photodetector, the amount of light received differs considerably among the photodetector parts, and it becomes impossible to sufficiently eliminate the RF signal component. Similarly, the elimination of the modulation component of the light source 102 becomes insufficient during the recording.

If the A/D conversion and the signal processing are carried out in such a state where the noise is multiplexed (superimposed or mixed), an accurate detection of the wobble signal cannot be made. In addition, in order to eliminate this noise component by the digital signal processing at the subsequent circuit stage, it becomes necessary to use an extremely high-speed A/D converter capable of sampling at several times the band of the noise component and an extremely high-speed digital processing circuit. But it is difficult from the practical point of view to use such extremely high-speed A/D converter and digital processing circuit.

However, according to this embodiment, the signal amplitudes can be made constant by the AGC circuits 115 and 116. For this reason, it is possible to eliminate the RF signal component and the modulation component of the light source 102, even when the amount of light received differs considerably among the photodetector parts of the multi-part photodetector. As a result, it is possible to improve the S/N ratio, and to accurately detect the wobble signal.

This embodiment generates the wobble signal which is eliminated of the RF signal component and the modulation component by use of an analog circuit, and subjects the wobble signal to an A/D conversion to process the wobble signal by a digital signal processing. Hence, it is possible to accurately detect the wobble signal without the use of a high-speed A/D converter. Furthermore, since the wobble signal is transferred in the form of the digital signal, no signal deterioration occurs due to the transfer.

Figure 21:
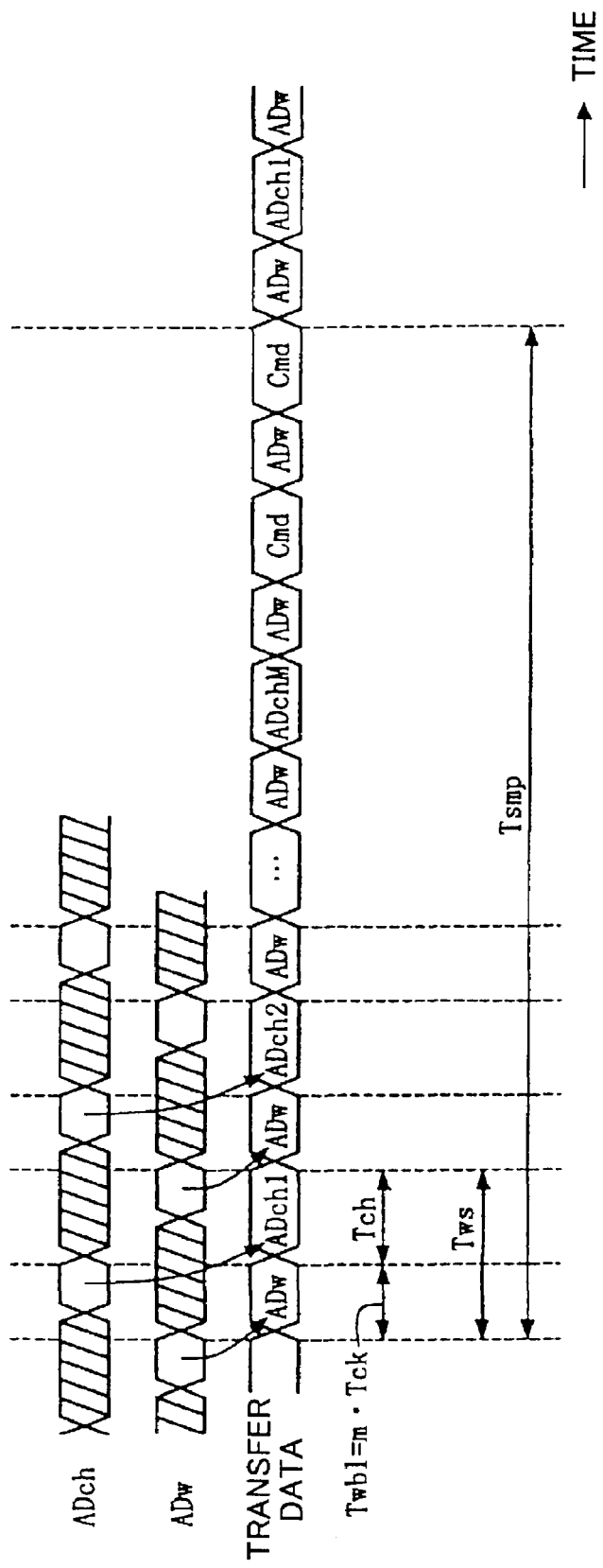
FIG. 21 is a timing chart for explaining a communication method for transferring conversion data of the wobble signal.

FIG. 21 is a timing chart for explaining a communication method for transferring conversion data of the wobble signal (hereinafter simply referred to as a wobble signal conversion data) when sharing transfer lines for a servo pre-operation signal in common for the transfer of the conversion data.

The wobble frequency requires a relatively high frequency compared to the band of the servo error signals. Hence, this embodiment inserts and transfers one wobble signal conversion data ADw output from the A/D converter 118 shown in FIG. 20 for every one channel of a servo pre-operation signal ADch which is output from the A/D converter 3.

When the number of conversion bits of the A/D converter 3 is denoted by m, a sampling frequency Tws of the wobble signal can be described by Tws=(n+m)×Tck, where Tck denotes a transfer clock period. In addition, the sampling period (frame period) Tsmp of each servo pre-operation signal can be described by Tsmp=(M+α)×Tws, where M denotes a number of channels to be transferred and a denotes a number corresponding to a channel transfer time Tch when inserting the command communication phase CPh. In FIG. 21, α=2. Hence, it is possible to reduce the number of signal lines required for the transfer.

Figure 22:
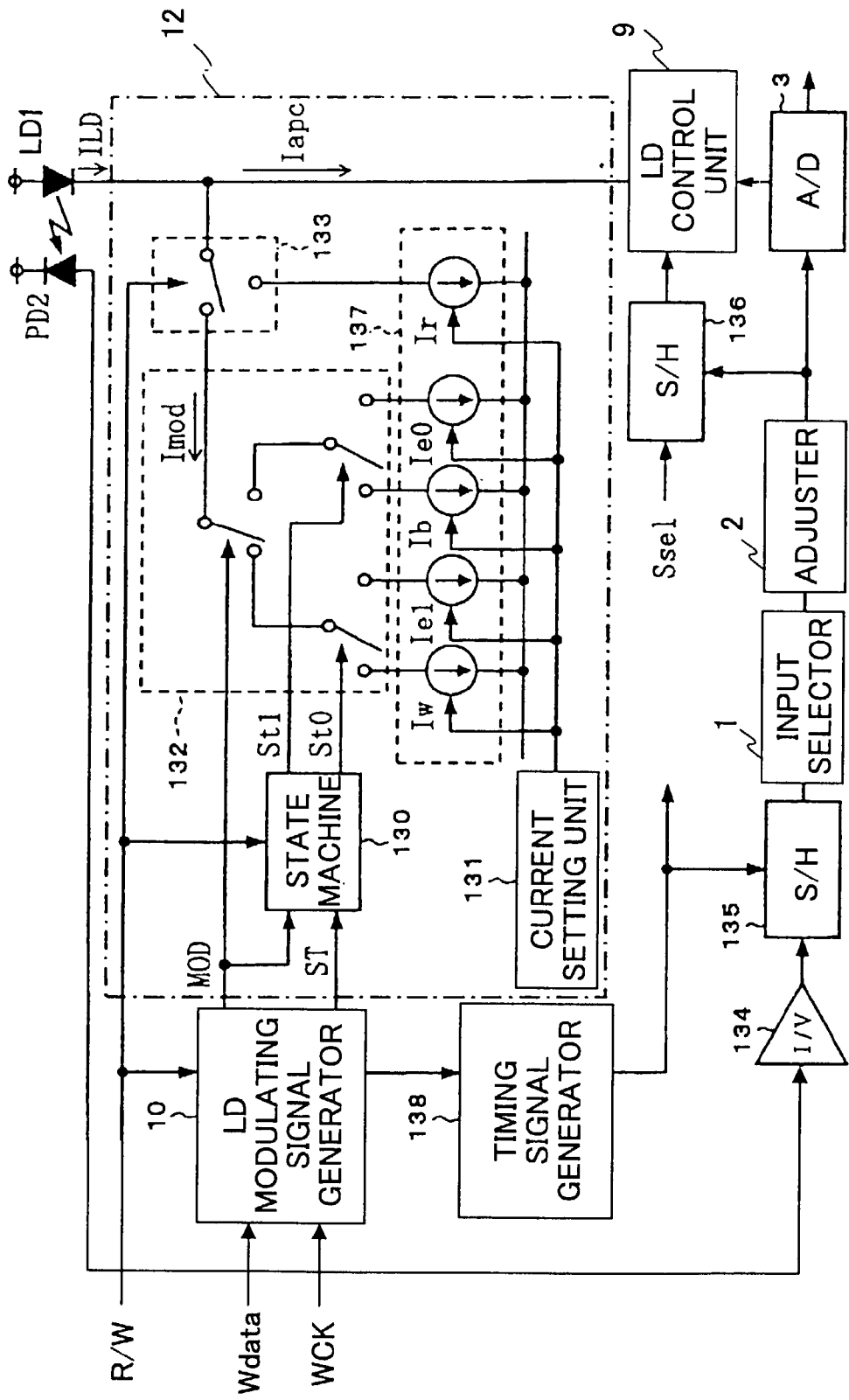
FIG. 22 is a system block diagram showing an internal structure of a LD driver shown in FIG. 2 together with related parts.
Figure 23:
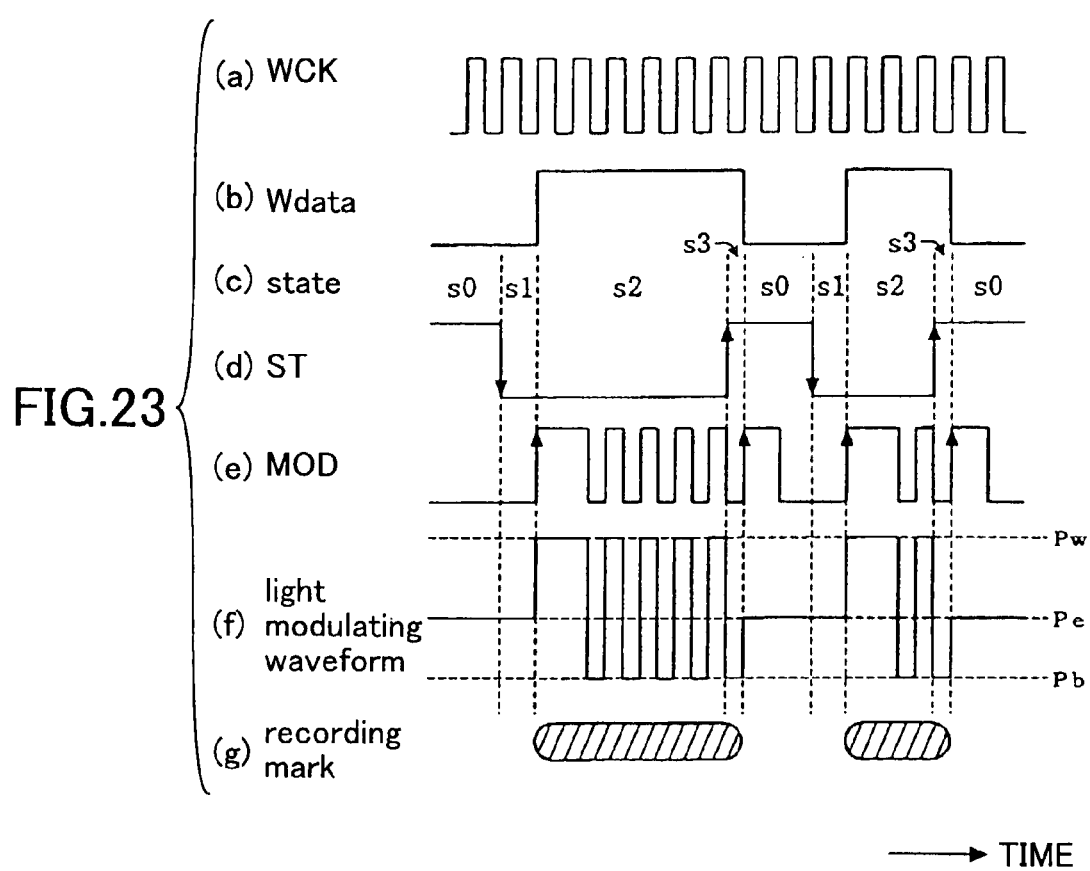
FIG. 23 is a timing chart for explaining operations of a LD control unit, a LD modulating signal generator and the LD driver shown in FIG. 22.

Next, a description will be given of the laser diode (LD) control and the LD modulation, by referring to FIGS. 22 and 23. FIG. 22 is a system block diagram showing an internal structure of the LD driver 12 shown in FIG. 2 together with related parts including the LD control unit 9 and the LD modulating signal generator 10. FIG. 23 is a timing chart for explaining the operations of the LD control unit 9, the LD modulating signal generator 10 and the LD driver 12 shown in FIG. 22.

In this case, it is assumed for the sake of convenience that the recording medium 100 is a phase change type recording medium such as the CD-RW. Hence, the laser diode LD1 of the light source 102 is modulated by a light modulating waveform shown in FIG. 23(f) to emit the laser beam, and recording marks shown in FIG. 23(g) are formed on the recording medium 100. In other words, the LD power level of the laser diode LD1 has three values, namely, a write power Pw, an erase power Pe and a bottom power Pb, as shown in FIG. 23(f). The recording marks shown in FIG. 23(g) are formed by the multi-level pulse signal shown in FIG. 23(f).

An accurate recording can be made by accurately controlling the recording power level and the pulse width and the pulse intervals of each of the pulses forming the multi-level pulse signal.

The laser diode LD1 emits the laser beam at a constant reproducing power level Pr during the reproduction. Although not shown in FIGS. 22 and 23, a high-frequency signal may be multiplexed (superimposed or mixed) to suppress the noise caused by the reflected light beam from the recording medium 100.

As shown in FIG. 22, the LD modulating signal generator 10 generates a LD modulating signal MOD shown in FIG. 23(e) and a state signal ST shown in FIG. 23(d) from a recording data signal Wdata shown in FIG. 23(b), based on a recording clock signal WCK shown in FIG. 23(a). In FIGS. 23(e) and 23(d), the signals MOD and ST are illustrated by neglecting the delays of the signals MOD and ST with respect to the recording data signal Wdata shown in FIG. 23(b), although the signals MOD and ST are usually delayed due to the circuit design of the LD modulating signal generator 10. It is also assumed for the sake of convenience that the LD modulating signal MOD is controlled to an optimum pulse width suited for the recording medium 100.

A current source section 137 outputs a driving current to the laser diode LD1 of the light source 102. A current setting unit 131 sets current values Iw, Ie (Ie0=Ie1) and Ib of current sources of the current source section 137. A switch 132 selects one of the current sources of the current source section 137 based on selection signals St0 and St1 and the LD modulating signal MOD, and outputs a modulating current value Imod. A switch 133 selects the modulating current value Imod or a reproducing current value Ir in response to a signal R/W which indicates the reproducing (read) mode or the recording (write) mode. An output current value of the switch 133 and an output LD control current value Iapc of the LD control unit 9 are added to generate a LD driving current value ILD which drives the laser diode LD1. This driving current value ILD determines the amount of light emitted from the laser diode LD1.

In other words, a light emission power P is set to P=Pw if the driving current value ILD is ILD=Iapc+Iw, set to P=Pe if ILD=Iapc+Ie, and set to P=Pb if ILD=Iapc+Ib.

Figure 24:
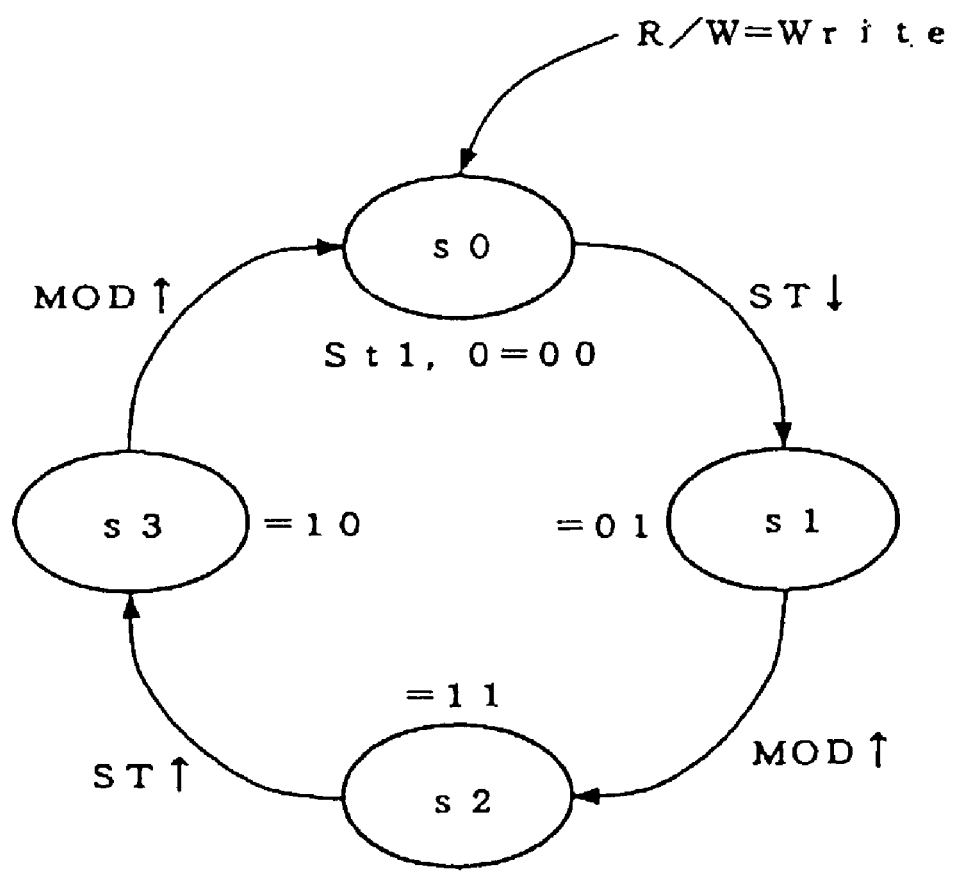
FIG. 24 is a state transition diagram for explaining an operation of a state machine shown in FIG. 22.

A state machine 130 outputs the selection signals St0 and St1 depending on the LD modulating signal MOD and the state signal ST. FIG. 24 is a state transition diagram for explaining an operation of the state machine 130 shown in FIG. 22. The selection signals St0 and St1 are determined depending on each of states S0 through S3. State transition conditions are as shown in FIG. 24, and FIG. 23(c) shows the transition states. The following Table 2 shows current values for a modulating current value Imod which is selected depending on the selection signals St0 and St1 and the LD modulating signal MOD.

TABLE 2

| STATE | St1, | St0 | MOD 0 | MOD 1 |
|---|---|---|---|---|
| s0 | 0 | 0 | Ie | Ie |
| s1 | 0 | 1 | Ie | Ie |
| s2 | 1 | 1 | Ib | Iw |
| s3 | 1 | 0 | Ib | Ie |

The photodetector PD2 receives a portion of the laser beam emitted from the laser diode LD1 of the light source 102, and produces an output monitor current (light detection signal current). The output monitor current of the photodetector PD2 is supplied to the LD control unit 9 via a current-to-voltage (I/V) converter 134, sample-and-hold (S/H) circuit 135, the input selector 1, the adjuster 2 and a sample-and-hold (S/H) circuit 136. The S/H circuit 135 samples the monitored level of the light received by the photodetector PD2 while the laser diode LD1 is irradiating the laser beam on the recording medium 100 at a predetermined laser power. For example, in the case of the light modulating waveform shown in FIG. 23(f), the S/H circuit 135 may sample the monitored level of the light received by the photodetector PD2 at the erase power Pe.

The S/H circuit 136 samples the output of the adjuster 2 during the time when the input selector 1 selects the output monitor signal of the S/H circuit 135. Otherwise, the operation is the same as that described above.

The LD control unit 9 controls the LD control current value Iapc so that the output monitor signal becomes a predetermined target value. In addition, the LD control unit 9 may input the output monitor signal which has been subjected to the A/D conversion in the A/D converter 3, and carry out a digital signal control based on the digital output monitor signal.

A timing signal generator 138 generates timing signals for controlling sample and hold timings of the S/H circuit 135 and the like in synchronism with the light modulating waveform, based on a light waveform synchronizing signal which is received from the LD modulating signal generator 10 which generates the LD modulating signal MOD.

Therefore, the pulse width of the light modulating waveform of the laser diode LD1 is determined solely by the LD modulating signal MOD. The light modulating waveform is unaffected even if a skew exists between the two signals output from the LD modulating signal generator 10, and it is possible to accurately form the recording marks on the recording medium 100.

For this reason, the LD modulating signal generator 10 may be formed by an integrated circuit which is separate from the integrated circuit forming the LD driver 12. Hence, semiconductor processes used to produce the integrated circuits of the LD modulating signal generator 10 and the LD driver 12 can be selected to suit the desired circuit characteristics thereof, thereby making it possible to realize an information recording and/or reproducing apparatus having desired cost and performance.

In other words, a high-speed operation and a high integration density are required of the LD modulating signal generator 10. Thus, the fine CMOS process is suited for producing the integrated circuit of the LD modulating signal generator 10. On the other hand, the laser diode LD1 having an operating voltage of approximately 1 V to several V is connected to the LD driver 12, and the high withstand voltage process (of 5 V or 3.3 V, for example) is required of the integrated circuit of the LD driver 12.

Normally, it is difficult to realize a high withstand voltage in the fine CMOS process. For example, in the 1.18 μm CMOS process, the withstand voltage is only on the order of 1.8 V. However, this embodiment enables the LD modulating signal generator 10 and the LD driver 12 to be respectively produced by suitable semiconductor processes.

In addition, by providing the LD modulating signal generator 10 within an integrated circuit which is mounted on the optical pickup 101, it is possible to shorten the wiring length to the LD driver 12 with respect to the LD modulating signal MOD, and to prevent deterioration of the LD modulating signal MOD and deterioration of the light modulating waveform. Moreover, because the LD modulating signal generator 10 can be provided within the integrated circuit which is provided with a circuit which requires synchronization to the light modulating waveform, it is possible to reduce the delay of each of the timing signals and to reduce the number of terminals required on the integrated circuit.

Figure 25:
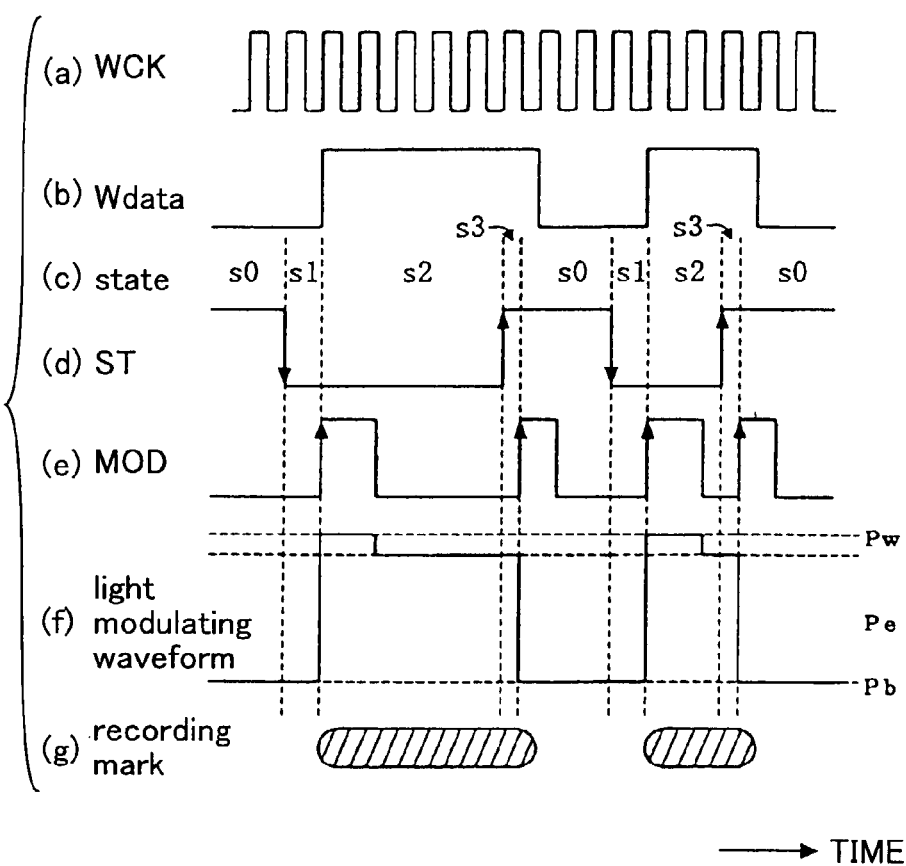
FIG. 25 is a timing chart for explaining a case where the information recording and/or reproducing apparatus is applied to a different light modulating waveform.

Next, a description will be given of a case where this embodiment of the information recording and/or reproducing apparatus is applied to a different light modulating waveform, by referring to FIG. 25. FIG. 25 is a timing chart for explaining a case where the information recording and/or reproducing apparatus is applied to the different light modulating waveform. In FIG. 25, the same designations are used as in FIG. 23.

Normally, the optimum light modulating waveform differs for each kind of recording medium. However, according to the structure shown in FIG. 22, it is possible to drive the laser diode LD1 with the optimum light modulating waveform for each kind of recording medium, by modifying the generating means for generating the LD modulating signal MOD and the state signal ST and the set current values of the current source section 137.

For example, in a case where the recording medium 100 requires a light modulating waveform shown in FIG. 25(f), the LD modulating signal MOD shown in FIG. 25(e) and the state signal ST shown in FIG. 25(d) are generated in the LD modulating signal generator 10, and the current values in the current source section 137 are set according to the following Table 3.

TABLE 3

| STATE | St1, | St0 | MOD 0 | MOD 1 |
|---|---|---|---|---|
| s0 | 0 | 0 | Ib | Ib |
| s1 | 0 | 1 | Ib | It |
| s2 | 1 | 1 | Iw | It |
| s3 | 1 | 0 | Iw | Ib |

The current values Ib, Iw and It are respectively added to the LD control current value Iapc, and cause the laser diode LD1 to emit the laser beam at the light emission powers Pb, Pw and Pt.

Accordingly, it is also possible to obtain the same effects as those described above.

In the description given heretofore, the LD power level of the laser diode LD1 has three values. However, the present invention may be applied similarly to a case where the LD power level of the laser diode LD1 has multi-levels that are more than three levels.

First, each state managed by the state machine 130 shown in FIG. 22 is set to a combination state of binary values within the multi-levels. The selection signals St0 and St1 select the current sources of the current source section 137 depending on the present values thereof. The modulation between the binary values is carried out by the LD modulating signal MOD. The state transition occurs for only one of the states non-selected by the LD modulating signal MOD. Hence, the laser diode LD1 can be driven by various light modulating waveforms by modifying the structure of the state machine 130. In addition, if the state transition conditions are made variable, it is possible to carry out an optimum light modulation depending on the kind of recording medium. Moreover, the application to the binary level modulation is facilitated.

Next, a description will be given of the integrated circuit structure within the information recording and/or reproducing apparatus.

In the embodiments described above, it is assumed for the sake of convenience that the integrated circuit 22 has the structure shown within the one-dot chain line in FIG. 2 unless otherwise indicated. However, the structure of the integrated circuit 22 is not limited to the structure shown in FIG. 2, and various modifications are possible.

The A/D converter 3 may be arranged at a circuit stage subsequent to the integrated circuit 22, by providing the input selector 1 and the adjuster 2 within the integrated circuit 22 and transferring the light detection signal ADin from the adjuster 2 to the A/D converter 3 via a FPC substrate. In this case, it is possible to reduce the circuit scale of the integrated circuit 22 which is provided on the optical pickup 101 and satisfy the demands to reduce the size of the optical pickup 101.

The light detection signal ADin transferred on a signal line of the FPC substrate is an analog signal in this case. However, if the gain adjustment is made for each light detection signal as described above, the light detection signal ADin may be adjusted to have a signal level with a sufficiently high S/N ratio so as not to be easily affected by noise. In addition, as in the embodiments described above, it is possible to similarly obtain the effects of improving the degree of freedom with which the parts of the optical pickup 101 may be arranged by reducing the number of transfer signal lines and programming connecting input terminals.

Furthermore, the servo signal computing unit 13 may be provided within the integrated circuit 22. In this case, the data to be transferred from the integrated circuit 22 are only the servo error signals, and in some cases, the number of data to be transferred becomes smaller compared to transferring each of the light detection signals prior to the operation process, thereby making it possible to reduce the transfer rate and reduce unwanted radiation.

It is also possible to arrange the A/D converter 7 at a circuit state subsequent to the integrated circuit 22, so as to transfer the (analog) wobble signal WBL. The wobble frequency may be relatively high, and be on the order of a fraction of the RF signal band, for example, depending on the media format of the recording medium 100. In such a case, a high transfer rate is unavoidable when transferring the digitally converted data by serial data transfer. But the wobble signal WBL may be transferred in order to reduce the noise caused by the unwanted radiation in this case. Moreover, if the gain of the wobble signal WBL is adjusted to a sufficiently high amplitude level, it is possible to reduce signal deterioration caused by noise, and the above described effects can be obtained without increasing the number of signal lines. The effects of using a separate integrated circuit for the LD driver 12 were described above.

Figure 26:
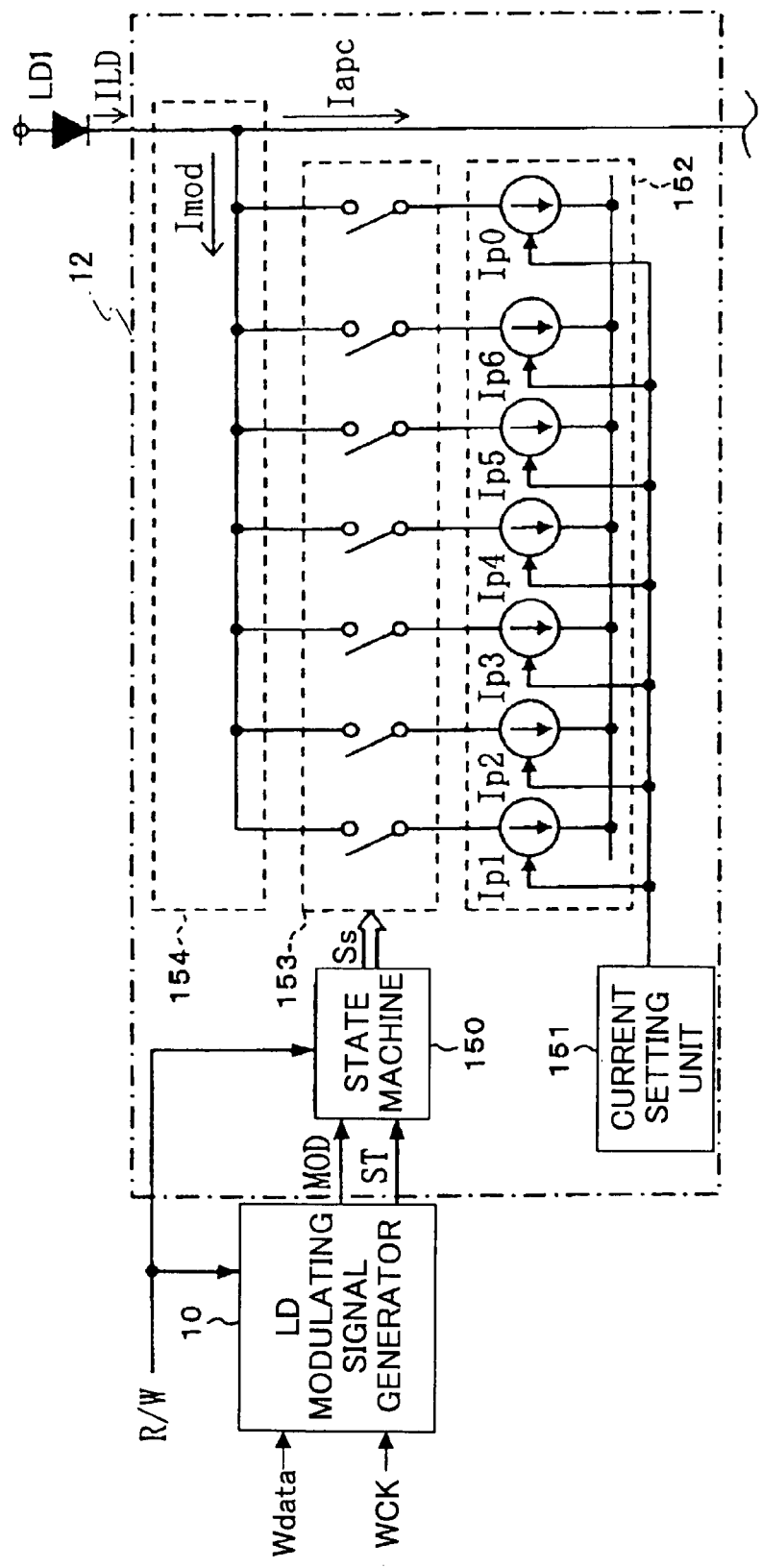
FIG. 26 is a system block diagram showing another internal structure of a LD driver shown in FIG. 2 together with related parts.
Figure 27:
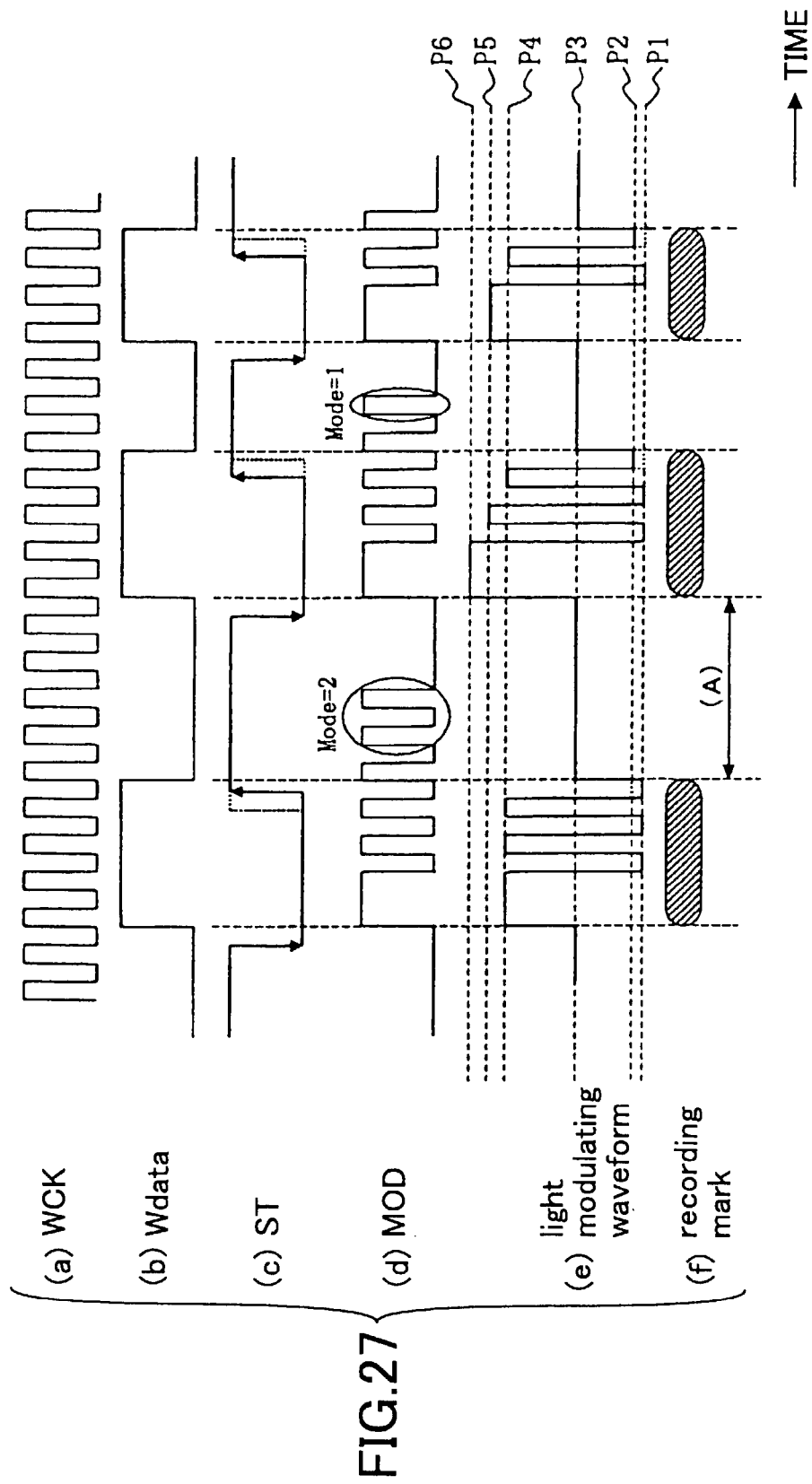
FIG. 27 is a timing chart for explaining operations of a LD modulating signal generator and the LD driver shown in FIG. 26.

Next, a description will be given of another laser diode (LD) control and the LD modulation, by referring to FIGS. 26 and 27. FIG. 26 is a system block diagram showing an internal structure of the LD driver 12 shown in FIG. 2 together with related parts including the LD modulating signal generator 10. FIG. 27 is a timing chart for explaining the operations of the LD modulating signal generator 10 and the LD driver 12 shown in FIG. 26. In FIGS. 26 and 27, those parts which are the same as those corresponding parts in FIGS. 22 and 23 are designated by the same reference numerals, and a description thereof will be omitted.

In this case, it is assumed for the sake of convenience that the laser diode LD1 of the light source 102 is modulated by a light modulating waveform shown in FIG. 27(e) to emit the laser beam, and recording marks shown in FIG. 27(f) are formed on the recording medium 100. In other words, the LD power level of the laser diode LD1 has six values P1 through P6 as shown in FIG. 27(e). The recording marks shown in FIG. 23(f) are formed by the multi-level pulse signal shown in FIG. 27(e).

A current source section 152 outputs a driving current to the laser diode LD1 of the light source 102. A current setting unit 151 sets current values Ip1 through Ip6 and a current value Ip0 of current sources of the current source section 152 in correspondence with light emission levels P1 through P6 and a reproducing level P0 of the laser diode LD1. A switch 153 selects one of the current sources of the current source section 152 based on a selection signal Ss, and a current adder 154 adds an output current of the switch 153 and the LD control current value Iapc, to generate the LD driving current value ILD which drives the laser diode LD1.

A state machine 150 manages the light emission state of the laser diode LD1 by stages Sp0 through Sp6, so that one state corresponds to one light emission state. In other words, the states Sp0 through Sp6 respectively correspond to the light emission levels P0 through P6. The state machine 150 outputs the selection signal Ss depending on the state, and switches the corresponding current source within the current source section 152.

Figure 28:
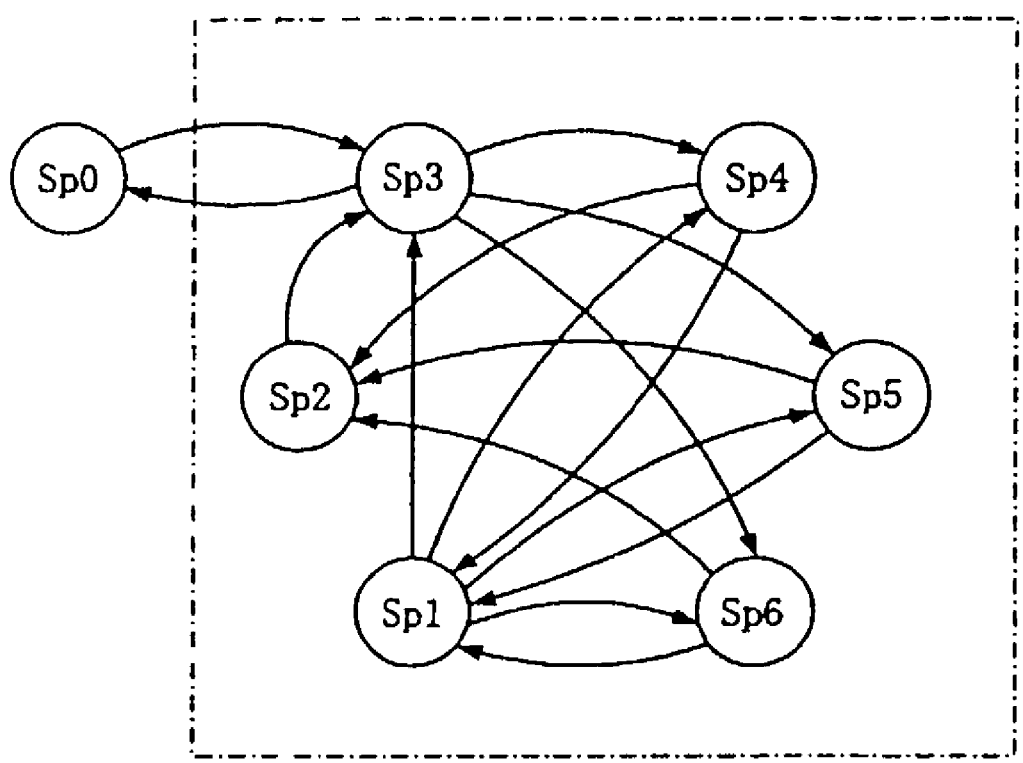
FIG. 28 is a state transition diagram for explaining an operation of a state machine shown in FIG. 26.

FIG. 28 is a state transition diagram for explaining the operation of the state machine 150. During the recording operation indicated within a one-dot chain line in FIG. 28, the state transition occurs responsive to the switching of the LD modulating signal MOD. In other words, a timing with which the light emission power level changes is determined by the LD modulating signal MOD. Hence, even if a skew exists between the two signals output from the LD modulating signal generator 10, the light modulating waveform is unaffected thereby, and it is possible to accurately form the recording marks on the recording medium 100.

The state transition conditions (a) through (f) are as follows.

(a) State Sp0: A transition is made to the state Sp3 when the signal R/W indicates the recording (write).

(b) State Sp3: A transition is made to the next state if the state signal ST has a low level and the LD modulating signal MOD rises to a high level. However, the state to which the transition is made differs depending on the value of a mode Mode. The transition is made to the state Sp4 when Mode=0, to the state Sp5 when Mode=1, and to the state Sp6 when Mode=2. When the state signal ST has a high level, the value of the mode Mode is changed depending on the number of pulses of the LD modulating signal MOD. First, the mode Mode is reset to Mode=0 by the transition to the step Sp3. In addition, while the state signal ST has the high level, the mode Mode is incremented by one (+1) every time the LD modulating signal MOD rises to the high level. For example, the mode Mode is Mode=2 during an interval (A) shown in FIG. 27.

(c) State Sp4: A transition is made to the state Sp1 when the state signal ST has a low level and the LD modulating signal MOD falls to a low level. In addition, a transition is made to the state Sp2 when the state signal ST has a high level and the LD modulating signal MOD falls to a low level.

(d) States Sp5 and Sp6: The state transition is the same as from the state Sp4. However, in this embodiment, the value of the mode Mode is decremented by one (−1) with the state transition, and the mode Mode remains the same if Mode=0. If the operation of modifying the value of the mode Mode is changed (for example, the value of the mode Mode is reset to Mode=0 with the state transition), it is possible to generate a light modulating waveform other than that shown in FIG. 27(e).

(e) State Sp1: A transition is made to the next state if the state signal ST has a low level and the LD modulating signal MOD rises to a high level. However, the state to which the transition is made differs depending on the value of the mode Mode. The transition is made to the state Sp4 when Mode=0, to the state Sp5 when Mode=1, and to the state Sp6 when Mode=2. In addition, the transition is made to the state Sp3 when the state signal ST has a high level and the LD modulating signal MOD rises to a high level.

(f) State Sp2: A transition is made to the state Sp3 when the LD modulating signal MOD rises to a high level. The state transition conditions may be set the same as for the state Sp1.

The state may return to the state Sp0 (reproducing mode) after the state first returns to the state Sp3 after the signal R/W indicates the reproduction (read). Alternatively, the state transition may forcibly be made when the signal R/W indicates the reproduction (read).

Depending on the information recording medium, when the recording mark is formed thereon, the recording mark is thermally affected by the adjacent space length on the information recording medium, and the edge of the recording mark may vary depending on the adjacent space length. Conventionally, in order to avoid the edge of the recording mark from varying, the pulse width of the light modulating waveform is varied by taking into consideration the adjacent space length.

In this, embodiment, it is possible to additionally vary the power by taking into consideration the adjacent space length. In other words, by changing the value of the mode Mode depending on the space length, it is possible to vary the power of the first pulse and the subsequent pulses.

In addition, it is also possible to set the power of a final bottom power pulse (or cooling pulse) by the rising timing of the state signal ST.

Accordingly, it is possible to achieve an equivalent of the pulse width correction depending on the adjacent space length, so that a further increase in the resolution of the pulse width control is suppressed it is possible to cope with high-speed recording.

When there are demands to increase the number of power levels or to use a more complicated light modulating waveform, the number of states may be increased, and the branching conditions of the state transition depending on the mode and the operation of changing the mode in each state may be changed.

Furthermore, when the state transition conditions including the branching conditions of the state transition are made programmable, it is possible to generate an optimum light modulating waveform depending on the information recording medium.

Because the mode Mode is controlled by the LD modulating signal MOD and the state signal ST, it is necessary to increase the number of signal lines. On the contrary, it is of course possible to cope with more complicated mode settings by additionally using a mode control signal.

Figure 29:
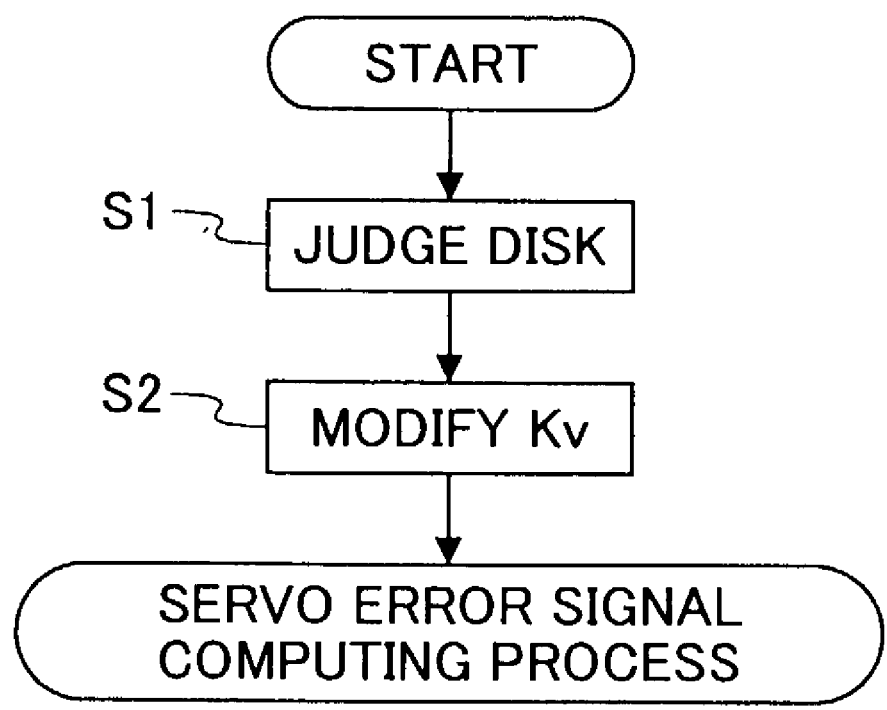
FIG. 29 is a flow chart for explaining a multiplying coefficient setting process of the servo signal computing unit shown in FIG. 18.
Figure 30:
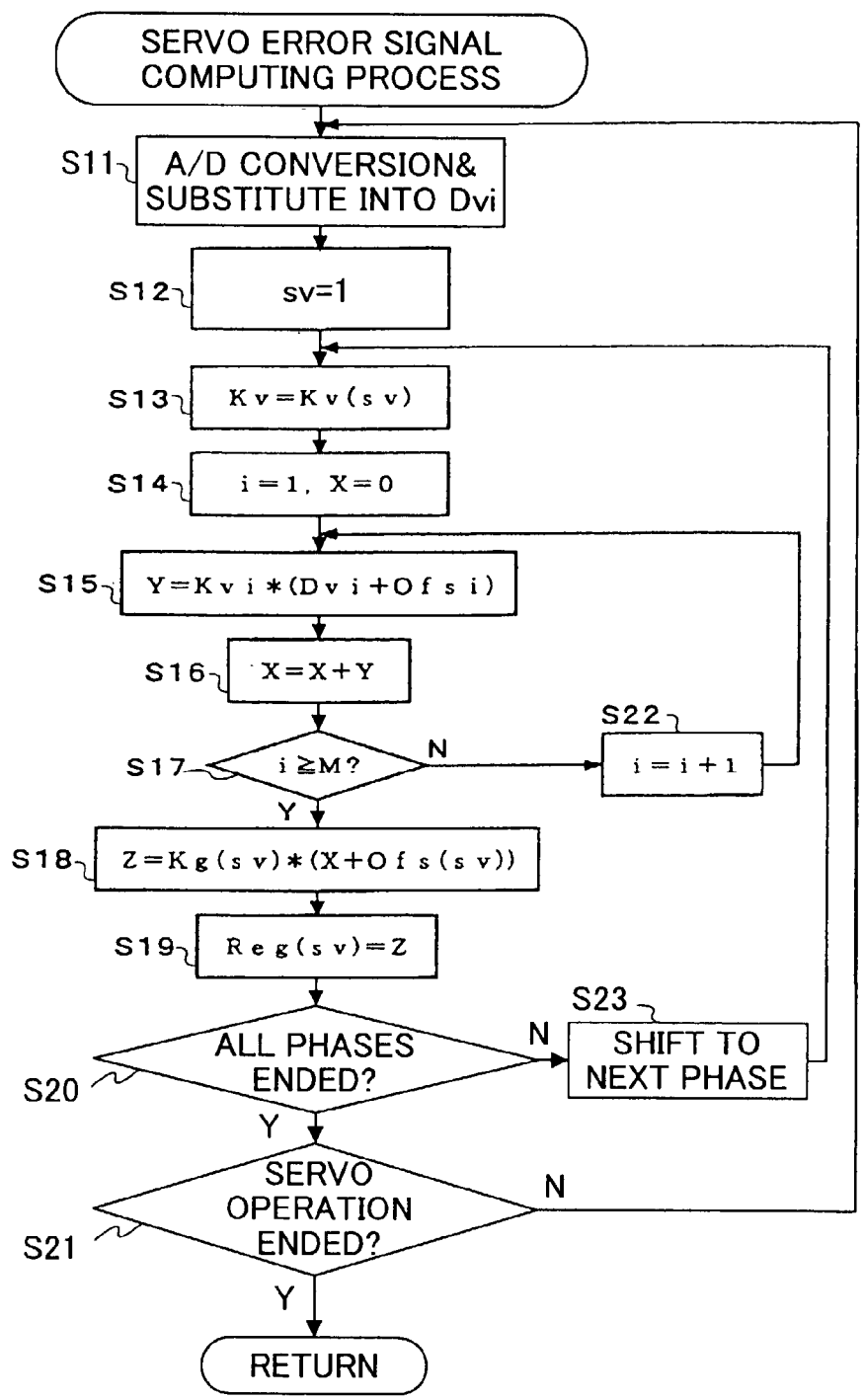
FIG. 30 is a flow chart for explaining a servo error signal generating process of the servo signal computing unit shown in FIG. 18.

Next, a description will be given of a servo error signal computing process, that is, the operation process carried out to compute the servo error signals, by referring to FIGS. 29 and 30. FIG. 29 is a flow chart for explaining a multiplying coefficient setting process of the servo signal computing unit shown in FIG. 18, and FIG. 30 is a flow chart for explaining a servo error signal generating process of the servo signal computing unit shown in FIG. 18.

In the multiplying coefficient setting process shown in FIG. 29, a media format judging step S1 carries out a disk judging process to judge the media format of the recording medium 100 which is to be subjected to the recording or reproducing operation. A known technique may be used to judge the media format of the recording medium 100.

An operation content modifying step S2 modifies the multiplying coefficients Kv of the operation coefficient register group 63 to values suited for the various servo error signals, depending on the media format of the recording medium 100 judged by the step S1. The suitable values of the multiplying coefficients Kv may be prestored in an internal memory (storing means) of the controller 19, for example. The multiplying coefficients Kv may also be modified to suitable values for the operation when the methods of computing the servo error signals differ for the recording operation and the reproducing operation.

In other words, the step S2 modifies the predetermined operation process which is carried out during the servo error signal computing process, by modifying the multiplying coefficients Kv and contents of the operation process including the multiplying process.

The servo error signal computing process is continued after the step S2, based on the modified contents of the operation process.

In the servo error signal generating process shown in FIG. 30, a digital signal conversion step S11 converts the light detection signals output from the light receiving unit 103 which detects the reflected light beam from the recording medium 100 into digital signals. More particularly, the step S11 carries out an A/D conversion to convert each of the light detection signals 1 through M into digital signals and substitutes the digital signals into variables Dvi which are held, where i=1, . . . , M.

It is assumed in this embodiment that the various servo error signals are processed time-sequentially, and the computing processes of each of the servo error signals are referred to as computing phases. The computing phase is described by a variable sv. For example, the FE computing phase is indicated by sv=1, the TE computing phase is indicated by sv=2, . . . , and the computing process of the desired servo error signal is carried out in each of computing phases. A number of computing phases is denoted by SVmax.

A step S12 initializes the computing phase to sv=1.

A step S13 switches the multiplying coefficients Kv to operation coefficients Kv(sv) suited for the computing phase sv, so that Kv=Kv(sv). In the servo error signal computing unit 13 shown in FIG. 18, this may be achieved by switching the banks of the operation coefficient register group 63.

A step S14 initializes each of the variables, so that i=0 and X=0.

A step S15 adds an offset (carries out an offset adjustment of each of the light detection signals) and multiplies a coefficient Kvi with respect to the light detection signal i (Dvi), so as to obtain Y=Kvi×(Dvi+Ofsi).

In other words, the step S15 includes an offset adding step which adds the offset adjustment value to each of the (digital) light detection signals output from the digital signal conversion step S11, and a multiplying step which multiplies a predetermined coefficient to each of the light detection signals output from the digital signal conversion step S11, and each of the light detection signals added with the offset adjustment value is input to the multiplying step.

An adding step S16 adds the operation result obtained in the step S15 to the present value of the variable X, to obtain X=X+Y. In other words, this adding step S16 generates the servo error signal by adding each of the signals obtained in the multiplying step.

A step S17 decides whether or not i≧M, and the process advances to an adjusting step S18 if the decision result in the step S17 is YES. On the other hand, if the decision result in the step S17 is NO, the process advances to a step S22 which increments i to i=i+1, and the process returns to the step S15. Hence, the steps S15 and S16 are repeated for i=1 to M.

Accordingly, the steps S14 through S17 and S22 form a multiplying step which successively multiplies the predetermined multiplying coefficient time-sequentially with respect to each of the light detection signals, and an adding step which successively adds each of the signals obtained by this multiplying step. This is equivalent to carrying out the operation process described by the following formula (13), where i=1 to M.

$$X = \Sigma \{Kvi \times (Dvi + Ofsi)\} \quad (13)$$

The operation process described by the formula (13) may be realized by a parallel processing.

The adjusting step S18 adds an offset Ofs(sv) with respect to the operation result X of the step S16 (that is, carries out an offset adjustment of each of the servo error signals), and multiplies a gain Kg(sv) (that is, carries out a gain adjustment of each of the servo error signals), so as to obtain Z=Kg(sv)×{X+Ofs(sv))}. In other words, the adjusting step S18 carries out at least one of the offset adjusting process and the gain adjusting process with respect to the servo error signals which are obtained by the adding step S16.

A step S19 substitutes the operation result Z of the adjusting step S18 to Reg(sv).

A step S20 decides whether or not the series of processes have ended in all of the computing phases, that is, decides whether or not sv≧SVmax. The process advances to a step S21 if the decision result in the step S20 is YES. If the decision result in the step S20 is NO, the process advances to a step S23 which carries out a shift process (sv=sv+1) to the next, computing phase, and the process thereafter returns to the step S13.

The step S21 decides whether or not the servo error signal computing process is to be ended. The process returns to the step S11 if the decision result in the step S21 is NO, so as to repeat the process of generating the various servo error signals. On the other hand, the process ends if the decision result in the step S21 is YES. By repeating this process at a predetermined period Tsmp, it is possible to generate the various servo error signals having the sampling frequency fsmp (=1/Tsmp).

Therefore, the steps S13 through S19 and S22 form a servo error signal computing step which generates the servo error signals by carrying out the predetermined operation process with respect to the digital signals obtained by the digital signal conversion step. In this particular case, the operation content modifying step and the servo error signal computing step are repeated to time-sequentially generate the various servo error signals.

In the above described case, the processes (steps S13 through S19) of generating each of the servo error signals in FIG. 30 are carried out time-sequentially. However, the processes may be carried out in parallel.

Figure 31:
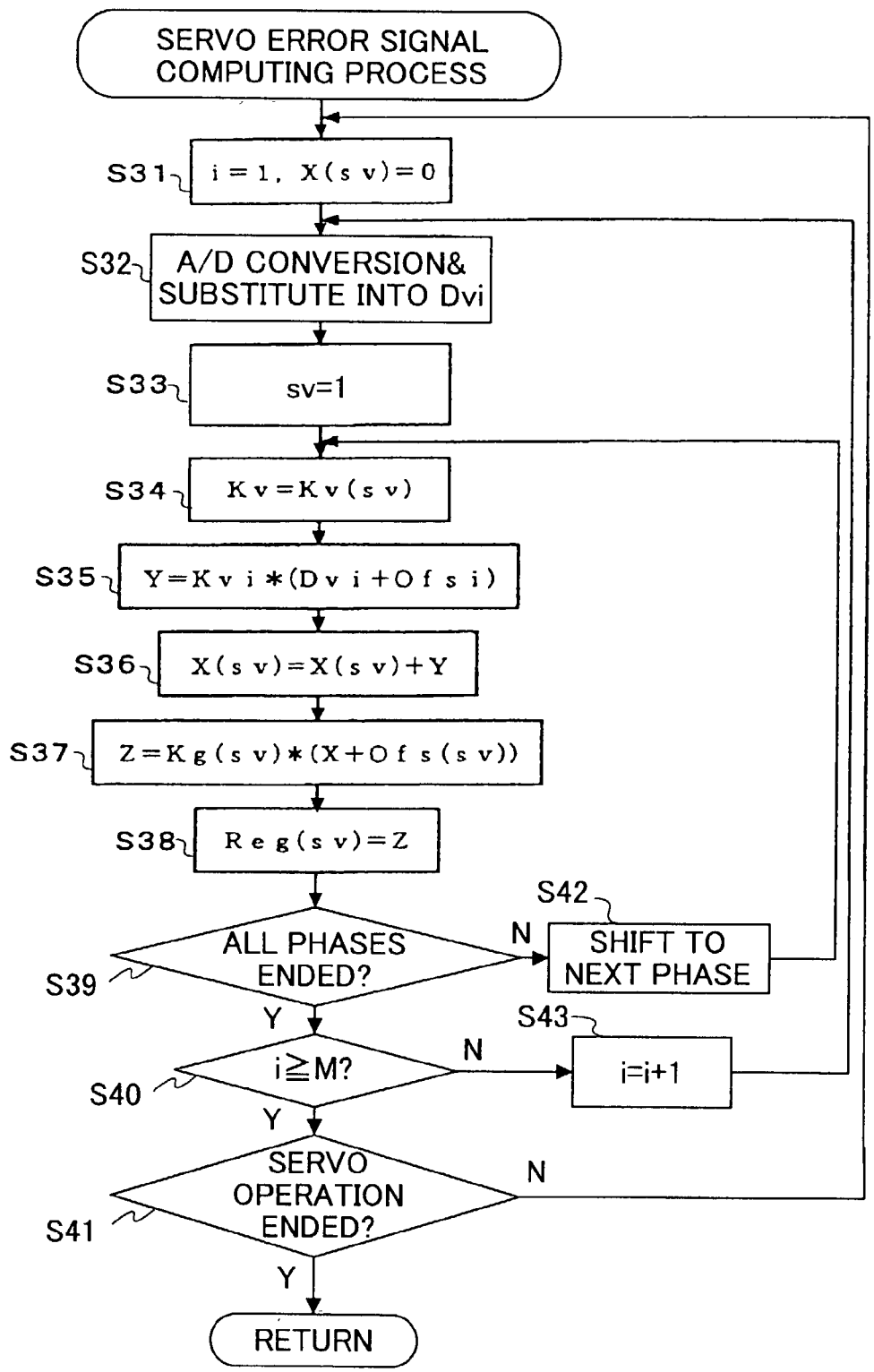
FIG. 31 is a flow chart for explaining another servo error signal generating process of the servo signal computing unit shown in FIG. 18.

FIG. 31 is a flow chart for explaining another servo error signal generating process of the servo signal computing unit shown in FIG. 18. The processing contents of each of the steps shown in FIG. 31 are similar to those shown in FIG. 30, however, the processing order differs from that of FIG. 30.

In the servo error signal generating process shown in FIG. 31, a step S31 initializes the variables to i=1 and X(sv)=0, where sv=1 to SVmax.

A step S32 carries out an A/D conversion with respect to the light detection signal (i) and substitutes the converted signal in a variable Dvi. A step S33 initializes the computing phase to sv=1. Then, the series of processes described hereunder are carried out with respect to this variable Dvi.

A step S34 switches a multiplying coefficient Kv to a multiplying coefficient Kv(sv) suited for the computing phase sv, a step S35 computes Y=Kvi×(Dvi +Ofsi), and a step S36 adds Y to the present value of a variable X(v) to obtain X(sv)=X(sv)+Y.

A step S37 adds an offset Ofs(sv) and multiplies a gain Kg(sv) to obtain Z=Kg(sv)×{X+Ofs(sv)}, and a step S38 substitutes Z to Reg(sv) to obtain Reg(sv)=Z.

A step S39 is similar to the step S20 shown in FIG. 30, and a step S40 is similar to the step S17 shown in FIG. 30. A step S41 is similar to the step S21 shown in FIG. 30, and a step S42 is similar to the step S23 shown in FIG. 30. Further, a step S43 is similar to the step S22 shown in FIG. 30.

When the above described series of processes ends for each of the computing phases, the step S43 increments the variable i by one (+1), and the steps S32 through S43 are repeated until the variable i becomes i=M.

Finally, the step S41 decides whether or not to end the servo error signal computing process, and the process returns to the step S34 to repeat the process of generating the various servo error signals if the decision result in the step S41 is NO.

Therefore, the computing process does not need to be carried out after the A/D conversion of all of the light detection signals ends. The A/D conversion of each of the light detection signals can be carried out successively, and the computing process can be carried out with respect to each A/D conversion result and the operation result of the computing process can be successively added to each of the servo error signals. As a result, it is possible to efficiently utilize the processing time.

The computing process in this case can be realized by providing SVmax registers (RegTmp) 65 in parallel in FIG. 18, and by making each register 65 have the function of the variable X(sv). One of such registers 65 can be selected by the computing phase signal Sph.

Therefore, according to the first aspect of the present invention, the signal processing apparatus may be provided with a digital signal conversion means (corresponding to the A/D converter 3) for converting at least one analog light detection signal into a digital light detection signal, and a servo error signal generating means (corresponding to the servo signal computing unit 13) for generating at least one servo error signal by subjecting the digital light detection signal to a predetermined operation process, and the servo error signal generating means may be provided with an operation content modifying means (corresponding to the internal functions of the servo signal computing unit 13 described above in conjunction with FIG. 18) for modifying contents of the operation process. In this case, the effects that are obtainable are that, it is possible to easily cope with a situation where the operation process for computing the servo error signal changes due to a change in the structure of an optical pickup, without the need to modify the circuit structure.

The operation content modifying means may include a multiplying means (corresponding to the multiplier 62) for multiplying a multiplying coefficient to a plurality of light detection signals output from the digital signal conversion means, and an adding means (corresponding to the adder 64) for adding output signals of the multiplying means, and the contents of the operation process may be modified by changing the multiplying coefficient. In this case, it is possible to obtain the above described effects using a simple circuit structure.

The multiplying means may be formed by a means for successively multiplying the multiplying coefficient in time-sequence with respect to each of the light detection signals, and the adding means may be formed by a means (corresponding to the register (RegTmp) 65) for successively adding each of the output signals of the multiplying means. In this case, the process of the servo error signal generating means can be shared in time-division, to thereby enable reduction of the circuit scale.

It is possible to provide an offset adding means (corresponding to the adder 60) for adding an offset adjustment value to each of the light detection signals output from the digital signal conversion means, and the light detection signals output from the offset adding means may be supplied to the multiplying means. In this case, it is possible to eliminate the offset of each of the light detection signals, and the signal processing can be carried out more accurately.

It is possible to provide an adjusting means (corresponding to the adder 66 and the multiplier 68) for adjusting at least one of an offset and a gain with respect to the signals output from the adding means. In this case, it is possible to carry out a correction even if the servo gain or offset varies due to inconsistencies in an information recording medium or an optical pickup, and a servo operation can be carried out stably and accurately.

The servo error signal generating means may include a means for generating the servo error signals by time-sequentially modifying the contents of the operation process by the operation content modifying means, and carrying out a predetermined operation process with respect to the light detection signals output from the digital signal conversion means. In this case, it is possible to generate various servo error signals using a single servo error signal generating means and accordingly reduce the circuit scale, by time-sequentially generating the various servo error signals by time-sequentially modifying the operation content of the servo error signal generating means.

The light detection signal may be obtained by detecting a reflected light beam from an information recording medium, and the servo error signal may be used for a servo operation when recording information on or reproducing information from the information recording medium. Hence, the signal processing apparatus may be applied to various information recording and/or reproducing apparatuses including optical disk drives.

It is possible to provide a media format judging means (corresponding to the media format judging section) for judging a media format of an information recording medium, and the servo error signal generating means may include a means for modifying the contents of the operation process based on the media format judged by the media format judging means. In this case, the contents of the operation process can be modified depending on the judged media format of the information recording medium. In addition, it is possible to cope with a plurality of kinds of information recording media having different media formats, and share a circuit in common even when the methods of computing the servo error signals differ among the information recording media having the different media formats.

It is also possible to provide a digital-to-analog conversion means (not shown) for converting the servo error signal generated by the servo error signal generating means into an analog signal. In this case, it is possible to use an existing servo process which is designed to process analog servo error signals.

Therefore, in the embodiments described above and according to the first aspect of the present invention, i-t is possible to share the computing unit in common for generating the various servo error signals, and it is possible to easily cope with a situation where the method of computing the servo error signal changes. In addition, even when the method of computing the servo error signal is different depending on the media format of the information recording medium, it is possible to generate the servo error signals appropriate for each media format by making a minimum modification to the circuit structure.

Next, a description will be given of a second aspect of the present invention.

As described above, the conventional signal processing apparatus has the following problems. The light detection signals are usually analog signals having a small amplitude, and the wiring length of the signal lines on the FPC substrate for transferring the light detection signals unavoidably becomes long. For this reason, the required S/N ratio cannot be realized in some cases. In addition, since the light receiving unit is usually formed by a multi-part photodetector which is made up of a plurality of photodetector parts, a large number of signal lines are required to transfer the light detection signals from each of the photodetector parts forming the multi-part photodetector. As a result, there is a limit to reducing the size of the FPC substrate for transferring the light detection, signals.

It is of course conceivable to reduce the wiring length of the signal lines for transferring the light detection signals, by mounting a portion of the signal processing unit on the optical pickup.

However, it is difficult to use a multi-layer (or multi-level) structure for the FPC substrate, because the bending resistance and cost of the FPC substrate increase. When the bending resistance of the FPC substrate increases, the required driving capacity of the optical pickup increases, to thereby increase the power consumption. Moreover, if the wiring which intersects the wiring for the light detection signals increases, the wiring length may become unnecessarily long, thereby making it more difficult to realize the suitable FPC substrate.

In other words, the structure of the optical pickup becomes limited by the arrangement of the input terminals for the light detection signals, and the degree of freedom of design may deteriorate, making it difficult to realize the required structure. In addition, the optical pickup may become expensive due to the strict specifications required of the optical pickup.

On the other hand, in the optical pickup which is provided with a plurality of light sources and light receiving elements in order to be compatible with information recording media having different media formats, such as the optical pickup used in the information recording and/or reproducing apparatus which can compatibly use the CD and the DVD, the constituent elements of the optical pickup increases, thereby making the above described problems of the prior art even more notable.

The second aspect of the present invention aims to solve these problems of the prior art, by not requiring a circuit modification even when a modification is made to the structure of the portion which outputs the light detection signals, and reducing the cost by relaxing the specifications required of the portion which is provided with the plurality of light sources and light receiving elements to compatibly cope with a different kinds of light detection signals. The second aspect of the present invention enables further improvements in the size reduction, cost reduction and performance of the optical pickup, and the degree of freedom of design can be improved by reducing the restrictions to the arrangement of the portion which is provided with the plurality of light sources and light receiving elements.

Therefore, according to the second aspect of the present invention, the signal processing apparatus may be provided with a signal output switching means (corresponding to the input selector 1) for inputting light detection signals and switching outputs to a plurality of kinds of circuit stages (or processing stages), and a signal output switching control means (corresponding to the control unit 11) for controlling the switching of outputs of the signal output switching means according to an output rule which is programmed in advance. In this case, the effects that are obtainable are that, regardless of input terminal to which the light detection signals from a plurality of light receiving elements are supplied, it is possible to cope with each situation by programming the signal output switching control means. As a result, it is possible to improve the degree of freedom of design, including the arrangement of the light receiving elements, the arrangement of the terminals, and the arrangement with which parts of an optical pickup such as light sources and LD drivers may be arranged.

The signal output switching means may include a means for inputting the light detection signals and switching the outputs to the plurality of kinds of circuit stages by controlling ON/OFF states of switches, and the signal output switching control means may include a means for generating selection signals for controlling the ON/OFF states of the switches based on the output rule and controlling the switching of the outputs of the signal output switching means based on the selection signals. In this case, it is possible to similarly obtain the effects described above, and it is unnecessary to modify a circuit which carries out the operation process, even if the structure of the optical pickup is modified.

It is possible to provide a temporary holding means (corresponding to the data holding unit 34 and the first through Mth S/H circuits SH1 through SHM shown in FIG. 10) for temporarily holding the light detection signals output from the signal output switching means, and an operation process means (corresponding to the servo error signal computing unit 13, the structure shown in FIG. 13 and the signal computing unit 45 shown in FIG. 8) for carrying out the operation process of the plurality of kinds of circuit stages based on the light detection signals held by the temporary holding means. In this case, it is possible to easily obtain the above described effects using a simple structure.

The signal processing apparatus may be provided with a signal output switching means (corresponding to the input selector 1) for inputting light detection signals and switching outputs to a plurality of kinds of circuit stages (or processing stages), a temporary holding means (corresponding to the data holding unit 34 and the first through Mth S/H circuits SH1 through SHM shown in FIG. 10) for temporarily holding the light detection signals output from the signal output switching means, an operation process means (corresponding to the servo error signal computing unit 13, the structure shown in FIG. 13 and the signal computing unit 45 shown in FIG. 8) for carrying out the operation process of the plurality of kinds of circuit stages based on the light detection signals held by the temporary holding means, and a signal holding control means (corresponding to the control unit 11) for generating hold signals for storing the light detection signals output from the signal output switching means in the temporary holding means according to a hold rule which is programmed in advance and controlling the holding of the temporary holding means based on the hold signals. In this case, it is also possible to obtain the above described effects.

The signal output switching means may include a means for inputting the light detection signals and switching the outputs to the plurality of kinds of circuit stages by controlling ON/OFF states of switches. In this case, it is possible to similarly obtain the effects described above, and the circuit scale can be reduced because a circuit of the subsequent circuit stage may be shared in common by time-sequential processes.

The signal holding control means may include a means for generating the hold signals for time-sequentially storing one of the light detection signals output from the signal output switching means based on the hold rule which is programmed in advance and controlling the holding of the temporary holding means based on the hold signals. In this case, it is possible to similarly obtain the effects described above and also similarly reduce the circuit scale.

It is possible to provide a time division number setting means (corresponding to the internal functions of the control unit 11) for setting a number of time divisions when carrying out the time-sequential processes. In this case, it is possible to set the number of time divisions when carrying out the time-sequential processes, and it is possible to select only the data required in the signal processing of the subsequent circuit stage. As a result, it is possible to omit unnecessary data processing, and to improve the sampling frequency fsmp or enlarge the interval Ti.

It is possible to provide a sample and hold means (corresponding to the S/H circuit 49 shown in FIG. 11) for sampling and holding the light detection signals at the same timing and inputting the light detection signals to the signal output switching means. In this case, it is possible to obtain the values at the identical time even when there is a possibility of a delay error occurring, and a more accurate signal generation is possible because noise components of the same phase can be mutually cancelled although a low-pass filter cannot eliminate such noise components.

The signal processing apparatus may further be provided with a current-to-voltage conversion means (corresponding to the I/V converter 50 shown in FIG. 12) for converting a current signal into a voltage signal, a voltage buffer means (corresponding to the voltage buffer 51 shown in FIG. 12) for buffering and outputting the voltage signal, and a selecting means (corresponding to the selector 56) for selectively inputting to the signal output switching means the light detection signal output from the current-to-voltage conversion means if each of the light detection signal is a current signal and the light detection signal output from the voltage buffer means if each of the light detection signals is a voltage signal. In this case, it is possible to cope by programming, regardless of whether the light detection signals are current signals or voltage signals and regardless of the input terminals of the signal output switching means to which the light detection signals are input.

It is possible to provide a polarity selecting means (corresponding to the polarity selector 53 shown in FIG. 13) for selecting the polarity of each of the light detection signals and inputting the light detection signals with the selected polarity to the signal output switching means. In this case, it is possible to unify the polarity regardless of the polarity of each of the light detection signals, so that the processing at the subsequent circuit stages is facilitated, and it is possible to effectively utilize an A/D converter when used in the subsequent circuit stages.

Furthermore, it is possible to provide an add-subtract means (corresponding to the operational amplifier 142 shown in FIG. 15) for adding or subtracting combinations of the light detection signals output from the signal output switching means. In this case, it is possible to select arbitrary light detection signals, invert the polarity of the light detection signals, and carry out an add-subtract operation with respect to a plurality of arbitrary light detection signals. No circuit modification is required even when the structure of the optical pickup is modified, and the degree of freedom of design is improved by reducing the restrictions with respect to the arrangements within the optical pickup.

It is possible to provide a means (corresponding to the servo signal computing unit 13 and the signal computing unit 45 shown in FIG. 10) for carrying out a predetermined operation process with respect to the light detection signals which are subjected to the add-subtract operation in the add-subtract means. In this case, it is possible to further increase the accuracy of the operation, in addition to obtaining the above described effects.

In addition, it is possible to provide a digital signal conversion means for converting the output signals of the signal output switching means into digital signals, and to temporarily store the digital signals in a plurality of holding means of the temporary holding means. In this case, it is possible to carry out the signal processing in the subsequent circuit stages by a digital signal processing, and simplify the process and carry out the process using a simple structure.

The plurality of holding means may be formed by sample and hold means.

It is possible to provide an adjusting means for adjusting an offset or gain with respect to the output signals of the signal output switching means, and to set an offset adjustment value or gain adjustment value to the adjusting means depending on the modified operation process. In this case, the offset and gain adjustments can be carried out independently for each of the light detection signals using the same circuit, and the light detection signals can be processed with a high accuracy in the subsequent circuit stages even if a level difference exists in the light detection signals output from the light receiving elements.

The polarity of the output signals of the adjusting means may be unified to one polarity, by adding a reference voltage to the offset adjustment value of the adjusting means if the polarity of the light detection signal is on the negative side with respect to the reference voltage, and subtracting the reference voltage from the offset adjustment value of the adjusting means if the polarity of the light detection signal is on the positive side with respect to the reference voltage. In this case, it is possible to obtain the above described effects without increasing the circuit scale.

The selection signals may be changed time-sequentially, and the output signals of the add-subtract means may be temporarily stored in the plurality of holding means. In this case, it is possible to further reduce the circuit scale because the add-subtract means may be shared and used in common with other operations, in addition to obtaining the above described effects.

It is possible to provide a digital signal conversion means for converting the output signals of the add-subtract means into digital signals, and to temporarily store the digital signals in a plurality of holding means of the temporary holding means. In this case, it is possible to carry out the signal processing in the subsequent circuit stages by a digital signal processing, and simplify the process and carry out the process using a simple structure.

The add-subtract means may be added with a means for adjusting at least one of an offset and a gain. In this case, the light detection signals can be processed with a high accuracy in the subsequent circuit stages even if a level difference exists in the light detection signals output from the light receiving elements.

Therefore, in the embodiments described above and according to the second aspect of the present invention, it is unnecessary to make a circuit modification even when a modification is made to the structure of the portion which outputs the light detection signals, and it is possible to reduce the cost by relaxing the specifications required of the portion which is provided with the plurality of light sources and light receiving elements to compatibly cope with a different kinds of light detection signals. Hence, it is possible to enable further improvements in the size reduction, cost reduction and performance of the optical pickup, and the degree of freedom of design can be improved by reducing the restrictions to the arrangement of the portion which is provided with the plurality of light sources and light receiving elements.

Next, a description will be given of a third aspect of the present invention.

As described above, when using the FPC substrate for transferring the light detection signals in the prior art, there is a limit to reducing the size of the FPC substrate due to the number signal lines required, and it is difficult to secure a sufficiently large space on the FPC substrate. On the other hand, if the width of the signal lines is reduced to reduce the size of the FPC substrate, the signal deterioration increases due to the noise.

The third aspect of the present invention aims to solve these problems of the prior art, by not requiring a circuit modification even when a modification is made to the structure of the portion which outputs the light detection signals, and reducing the cost by relaxing the specifications required of the portion which is provided with the plurality of light sources and light receiving elements to compatibly cope with a different kinds of light detection signals. The third aspect of the present invention enables reduced signal deterioration due to noise when transferring the signals on the FPC substrate, and reduces the number of signal lines required to transfer the light detection signals.

Therefore, according to the third aspect of the present invention, the signal processing apparatus may be provided with a signal output switching means (corresponding to the input selector 1) for switching output of analog light detection signals to a plurality of kinds of circuit stages (or process stages), a digital signal conversion means (corresponding to the A/D converter 3) for time-sequentially converting the light detection signals output from the signal output switching means from analog signals into digital signals, a transfer means (corresponding to the first and second interfaces 32 and 33) for transferring the light detection signals output from the digital signal conversion means, and an operation process means (corresponding to the servo signal computing unit 13) for carrying out operation processes of the plurality of circuit stages based on the light detection signals transferred by the transfer means. In this case, digital signals are transferred on the signal lines of the FPC substrate. Since the signal lines may be arranged close to each light receiving element which outputs the analog light detection signal, it becomes unnecessary to transfer the light detection signals which are often signals having small amplitudes over a long distance, thereby making the light detection signals less likely to be affected by noise. In addition, the process in the operation process means can be realized by a digital signal processing, and it is possible to simplify the process and carry out the process using a simple structure.

The signal processing apparatus may be provided with a signal output switching means (corresponding to the input selector 1) for switching output of analog light detection signals to a plurality of kinds of circuit stages (or process stages), a digital signal conversion means (corresponding to the A/D converter 3) for time-sequentially converting the light detection signals output from the signal output switching means from analog signals into digital signals, a plurality of first holding means (corresponding to the data holding unit 34) for temporarily holding the digital signals output from the digital signal conversion means, an operation process means (corresponding to the servo signal computing unit 13) for carrying out operation processes of the plurality of circuit stages based on the digital signals held by the first holding means, a plurality of second holding means (corresponding to the servo error signal register group (RegSV) 70) for temporarily holding the output signals of the operation process means, and a transfer means (corresponding to the first and second interfaces 32 and 33) for transferring the output signals held by the second holding means or the light detection signals held by the first holding means and a portion of the output signals held by the second holding means. The number of transfer data may decrease by transferring each of the light detection signal data prior to the operation process, and in this case, it is possible to reduce the transfer rate. As a result, it is possible to reduce unwanted radiation.

The signal processing apparatus may be provided with an analog signal processing means (corresponding to the high-speed analog signal processor 5) for inputting analog light detection signals and carrying out an analog signal processing in an RF signal band, a signal output switching means (corresponding to the input selector 1) for switching output of the analog light detection signals and the light detection signals output from the analog signal processing means to a plurality of kinds of circuit stages (or process stages), a digital signal conversion means (corresponding to the A/D converter 3) for time-sequentially converting the light detection signals output from the signal output switching means from analog signals into digital signals, a transfer means (corresponding to the first and second interfaces 32 and 33) for transferring the light detection signals output from the digital signal conversion means, and an operation process means (corresponding to the servo signal computing unit 13) for carrying out operation processes of the plurality of circuit stages based on the light detection signals transferred by the transfer means. In this case, the analog signal processing means is used for the portion which requires the signal processing in the RF band. In addition, since the A/D conversion is carried out and the digital data is transferred when the required band becomes narrow, it is possible to prevent signal deterioration caused by noise during the data transfer, even when a high-speed A/D converter is not used. Moreover, the same circuit can be used for the light detection signals prior to the generation of the other servo error signals, and the transfer signal lines can also be shared. As a result, it is possible to reduce the circuit scale and to reduce the number of transfer signal lines.

The transfer means may transfer the signals time-divisionally, and transfer both the light detection signals converted by the digital signal conversion means and control command signals.

When the light detection signal is not input or the input light detection signal does not need to be processed, the transfer means may transfer only the control command signals. During a time in which no information recording or reproducing operation is carried out, such as during a start-up of the information recording and/or reproducing apparatus or a standby (or wait) mode of the information recording and/or reproducing apparatus, there is no need to transfer the light detection signals output from the digital signal conversion means and only the control command signals need to be transferred. Hence, it is possible to quickly perform the initialization of the command registers and the like required when a large amount of command communication needs to be made.

It is possible to provide an adjusting means (corresponding to the adjuster 2) for adjusting at least an offset or gain with respect to the light detection signals output from the signal output switching means, and a gain computing means (corresponding to functions provided within the control unit 11) for computing the gain adjustment value based on the light detection signals output from the digital signal conversion means or the output signals of the operation process means and resetting the gain adjustment value to the adjusting means. In this case, it is possible to carry out the gain and offset adjustments independently with respect to each of the light detection signals using the same circuit, and an accurate analog-to-digital conversion of the signals is possible even if a level difference exists among the light detection signals output from the light receiving elements.

It is possible to provide an adjusting means (corresponding to the adjuster 2) for adjusting at least one of an offset and gain with respect to the light detection signals output from the signal output switching means, an adding means (corresponding to the adder 81) for successively adding a predetermined number of light detection signals of the light detection signals time-sequentially output from the digital signal conversion means, and a gain computing means (corresponding to the gain computing unit 83) for computing a gain adjustment value so that an output signal of the adding means approximately matches a predetermined target value which is set in advance and resets the gain adjustment value in the adjusting means. In this case, it is possible to automatically control a sum signal (that is, each of the light detection signals) to become approximately a predetermined value. Hence, even when the amount of light received by the light receiving elements change due to changes in the amount of light emitted from the light source and the reflectivity of the information recording medium, it is possible to stably carry out the analog-to-digital conversion accurately, thereby enabling a stable servo operation.

It is possible to provide a gain storing means (corresponding to the gain register 85) for storing a predetermined gain adjustment value which is computed in advance with respect to the adjusting means, and a gain adjustment value selecting means (corresponding to the gain selector 84) for switching and selecting one of the gain adjustment values from the gain storing means and the gain computing means to reset the selected gain adjustment value in the adjusting means. Hence, it is possible to similarly obtain the above described effects.

It is possible to provide a means (corresponding to an internal function of the control unit 11) for reading a present value of the gain adjustment value computed by the gain computing means. In this case, it is possible to compute the light detection signal level prior to the gain adjustment.

It is possible to provide a data conversion means (corresponding to the data converter (not shown)) for carrying out a data conversion which increases the number of bits depending on the offset adjustment value and the gain adjustment value of the adjusting means with respect to the light detection signals output from the digital signal conversion means, and supplying the converted data to the operation process means. In this case, it is possible to carry out the operation process with a high accuracy without increasing the number of bits when converting the light detection signals into digital signals.

Furthermore, the transfer means may include means (corresponding to the structure shown in FIG. 8) for carrying out serial data transfer. In this case, it is possible to greatly reduce the number of signal lines required for the data transfer.

Therefore, in the embodiments described above and according to the third aspect of the present invention, no circuit modification is required even when a modification is made to the structure of the portion which outputs the light detection signals, and the cost can be reduced by relaxing the specifications required of the portion which is provided with the plurality of light sources and light receiving elements to compatibly cope with a different kinds of light detection signals. It is also possible to reduce signal deterioration due to noise when transferring the signals on the FPC substrate, and reduce the number of signal lines required to transfer the light detection signals.

Next, a description will be given of a fourth aspect of the present invention.

The fourth aspect of the present invention aims to solve the problems of the prior art which are basically the same as the problems the second and third aspects of the present invention aim to solve, by not requiring a circuit modification even when a modification is made to the structure of the portion which outputs the light detection signals, and reducing the cost by relaxing the specifications required of the portion which is provided with the plurality of light sources and light receiving elements to compatibly cope with a different kinds of light detection signals. The fourth aspect of the present invention enables reduced signal deterioration due to noise when transferring the signals on the FPC substrate, and reduces the number of signal lines required to transfer the light detection signals. Hence, it is possible to easily realize an integrated circuit which is suited for being mounted on an optical pickup to process light detection signals output from light receiving elements and to realize an information recording and/or reproducing apparatus which uses such an integrated circuit.

Therefore, according to the fourth aspect of the present invention, the signal processing apparatus may be provided with a signal output switching means (corresponding to the input selector 1) for switching output of analog light detection signals to a plurality of kinds of circuit stages (or process stages), a signal output switching control means (corresponding to the control unit 11) for controlling the switching of outputs of the signal output switching means according to an output rule which is programmed in advance, a digital signal conversion means (corresponding to the A/D converter 3) for time-sequentially converting the light detection signals output from the signal output switching means from analog signals into digital signals, a transfer means (corresponding to the first and second interfaces 32 and 33) for transferring the light detection signals output from the digital signal conversion means, and an operation process means (corresponding to the servo signal computing unit 13) for carrying out operation processes of the plurality of circuit stages based on the light detection signals transferred by the transfer means.

The signal processing apparatus may be provided with a signal output switching means (corresponding to the input selector 1) for switching output of analog light detection signals to a plurality of kinds of circuit stages (or process stages), a signal output switching control means (corresponding to the control unit 11) for controlling the switching of outputs of the signal output switching means according to an output rule which is programmed in advance, a digital signal conversion means (corresponding to the A/D converter 3) for time-sequentially converting the light detection signals output from the signal output switching means from analog signals into digital signals, a plurality of first holding means (corresponding to the data holding unit 34) for temporarily holding the digital signals output from the digital signal conversion means, an operation process means (corresponding to the servo signal computing unit 13) for carrying out operation processes of the plurality of circuit stages based on the light detection signals held by the first holding means, a plurality of second holding means (corresponding to the servo error signal register group (RegSV) 70) for temporarily holding the output signals of the operation process means, and a transfer means (corresponding to the first and second interfaces 32 and 33) for transferring the output signals held by the second holding means or the light detection signals held by the first holding means and a portion of the output signals held by the second holding means.

The signal processing apparatus may be provided with an analog signal processing means (corresponding to the high-speed analog signal processor 5) for inputting analog light detection signals and carrying out an analog signal processing in an RF signal band, a signal output switching means (corresponding to the input selector 1) for switching output of the analog light detection signals and the light detection signals output from the analog signal processing means to a plurality of kinds of circuit stages (or process stages), a signal output switching control means (corresponding to the control unit 11) for controlling the switching of outputs of the signal output switching means according to an output rule which is programmed in advance, a digital signal conversion means (corresponding to the A/D converter 3)

for time-sequentially converting the light detection signals output from the signal output switching means from analog signals into digital signals, a transfer means (corresponding to the first and second interfaces 32 and 33) for transferring the light detection signals output from the digital signal conversion means, and ah operation process means (corresponding to the servo signal computing unit 13) for carrying out operation processes of the plurality of circuit stages based on the light detection signals transferred by the transfer means.

The signal processing apparatus may be provided with a signal output switching means (corresponding to the input selector 1) for switching output of analog light detection signals to a plurality of kinds of circuit stages (or process stages), a digital signal conversion means (corresponding to the A/D converter 3) for time-sequentially converting the light detection signals output from the signal output switching means from analog signals into digital signals, a transfer means (corresponding to the first and second interfaces 32 and 33) for transferring the light detection signals output from the digital signal conversion means, a temporary holding means (corresponding to the data holding unit 34) for temporarily holding the light detection signals transferred by the transfer means, an operation process means (corresponding to the servo signal computing unit 13) for carrying out operation processes of the plurality of circuit stages based on the light detection signals held by the temporary holding means, and a signal holding control means (corresponding to the control unit 11) for generating hold signals for storing the light detection signals output from the signal output switching means in the temporary holding means according to a hold rule which is programmed in advance and controlling the holding of the temporary holding means based on the hold signals.

The signal processing apparatus may be provided with a signal output switching means (corresponding to the input selector 1) for switching output of analog light detection signals to a plurality of kinds of circuit stages (or process stages), a digital signal conversion means (corresponding to the A/D converter 3) for time-sequentially converting the light detection signals output from the signal output switching means from analog signals into digital signals, a plurality of first holding means (corresponding to the data holding unit 34) for temporarily holding the digital signals output from the digital signal conversion means, a signal holding control means (corresponding to the control unit 11) for generating hold signals for storing the light detection signals output from the signal output switching means in the first holding means according to a hold rule which is programmed in advance and controlling the holding of the first holding means based on the hold signals, an operation process means (corresponding to the servo signal computing unit 13) for carrying out operation processes of the plurality of circuit stages based on the light detection signals held by the first holding means, a plurality of second holding means (corresponding to the servo error signal register group (RegSV) 70) for temporarily holding the output signals of the operation process means, and a transfer means (corresponding to the first and second interfaces 32 and 33) for transferring the output signals held by the second holding means or the light detection signals held by the first holding means and a portion of the output signals held by the second holding means.

The signal processing apparatus may be provided with an analog signal processing means (corresponding to the high-speed analog signal processor 5) for inputting analog light detection signals and carrying out an analog signal processing in an RF signal band, a signal output switching means (corresponding to the input selector 1) for switching output of the analog light detection signals and the light detection signals output from the analog signal processing means to a plurality of kinds of circuit stages (or process stages), a digital signal conversion means (corresponding to the A/D converter 3) for time-sequentially converting the light detection signals output from the signal output switching means from analog signals into digital signals, a transfer means (corresponding to the first and second interfaces 32 and 33) for transferring the light detection signals output from the digital signal conversion means, a temporary holding means (corresponding to the data holding unit 34) for temporarily holding the light detection signals transferred by the transfer means, an operation process means (corresponding to the servo signal computing unit 13) for carrying out operation processes of the plurality of circuit stages based on the light detection signals held by the temporary holding means, and a signal holding control means (corresponding to the control unit 11) for generating hold signals for storing the light detection signals output from the signal output switching means in the temporary holding means according to a hold rule which is programmed in advance and controlling the holding of the temporary holding means based on the hold signals.

The signal processing apparatus may be provided with a signal output switching means (corresponding to the input selector 1) for switching output of analog light detection signals to a plurality of kinds of circuit stages (or process stages), a signal output switching control means (corresponding to the control unit 11) for controlling the switching of outputs of the signal output switching means according to an output rule which is programmed in advance, a digital signal conversion means (corresponding to the A/D converter 3) for time-sequentially converting the light detection signals output from the signal output switching means from analog signals into digital signals, and a servo error signal generating means (corresponding to the servo signal computing unit 13) for generating servo signals by carrying out operation processes of the plurality of circuit stages based on the light detection signals output from the digital signal conversion means.

The signal processing apparatus may be provided with a signal output switching means (corresponding to the input selector 1) for switching output of analog light detection signals to a plurality of kinds of circuit stages (or process stages), a temporary holding means (corresponding to the data holding unit 34) for temporarily holding the light detection signals output from the signal output switching means, a signal holding control means (corresponding to the control unit 11) for generating hold signals for storing the light detection signals output from the signal output switching means in the temporary holding means according to a hold rule which is programmed in advance and controlling the holding of the temporary holding means based on the hold signals, a servo error signal generating means (corresponding to the servo signal computing unit 13) for generating servo signals by carrying out operation processes of the plurality of circuit stages based on the light detection signals held by the temporary holding means, and an operation content modifying means (corresponding to the internal functions of the servo signal computing unit 13 described above in conjunction with FIG. 18) for modifying contents of the operation process of the servo error signal generating means.

The signal processing apparatus may be provided with a signal output switching means (corresponding to the input selector 1) for switching output of analog light detection signals to a plurality of kinds of circuit stages (or process stages), a digital signal conversion means (corresponding to the A/D converter 3) for time-sequentially converting the light detection signals output from the signal output switching means from analog signals into digital signals, a transfer means (corresponding to the first and second interfaces 32 and 33) for transferring the light detection signals output from the digital signal conversion means, and a servo error signal generating means (corresponding to the servo signal computing unit 13) for generating servo signals by carrying out operation processes of the plurality of circuit stages based on the light detection signals transferred by the transfer means.

The signal processing apparatus may be provided with a signal output switching means (corresponding to the input selector 1) for switching output of analog light detection signals to a plurality of kinds of circuit stages (or process stages), a digital signal conversion means (corresponding to the A/D converter 3) for time-sequentially converting the light detection signals output from the signal output switching means from analog signals into digital signals, a servo error signal generating means (corresponding to the servo signal computing unit 13) for generating servo signals by carrying out operation processes of the plurality of circuit stages based on the digital signals output from the digital signal conversion means, a transfer means (corresponding to the first and second interfaces 32 and 33) for transferring the servo error signals output from the servo error signal generating means, and an operation content modifying means (corresponding to the internal functions of the servo signal computing unit 13 described above in conjunction with FIG. 18) for modifying contents of the operation process of the servo error signal generating means.

The signal processing apparatus may be provided with an analog signal processing means (corresponding to the high-speed analog signal processor 5) for inputting analog light detection signals and carrying out an analog signal processing in an RF signal band, a signal output switching means (corresponding to the input selector 1) for switching output of the analog light detection signals and the light detection signals output from the analog signal processing means to a plurality of kinds of circuit stages (or process stages), a digital signal conversion means (corresponding to the A/D converter 3) for time-sequentially converting the light detection signals output from the signal output switching means from analog signals into digital signals, a transfer means (corresponding to the first and second interfaces 32 and 33) for transferring the light detection signals output from the digital signal conversion means, a servo error signal generating means (corresponding to the servo signal computing unit 13) for generating servo signals by carrying out operation processes of the plurality of circuit stages based on the light detection signals transferred by the transfer means, and an operation content modifying means (corresponding to the internal functions of the servo signal computing unit 13 described above in conjunction with FIG. 18) for modifying contents of the operation process of the servo error signal generating means.

The signal processing apparatus may be provided with a signal output switching means (corresponding to the input selector 1) for switching output of analog light detection signals to a plurality of kinds of circuit stages (or process stages), a signal output switching control means (corresponding to the control unit 11) for controlling the switching of outputs of the signal output switching means according to an output rule which is programmed in advance, a digital signal conversion means (corresponding to the A/D converter 3) for time-sequentially converting the light detection signals output from the signal output switching means from analog signals into digital signals, a transfer means (corresponding to the first and second interfaces 32 and 33) for transferring the digital signals output from the digital signal conversion means, a servo error signal generating means (corresponding to the servo signal computing unit 13) for generating servo signals by carrying out operation processes of the plurality of circuit stages based on the light detection signals transferred by the transfer means, and an operation content modifying means (corresponding to the internal functions of the servo signal computing unit 13 described above in conjunction with FIG. 18) for modifying contents of the operation process of the servo error signal generating means.

The signal processing apparatus may be provided with a signal output switching means (corresponding to the input selector 1) for switching output of analog light detection signals to a plurality of kinds of circuit stages (or process stages), a signal output switching control means (corresponding to the control unit 11) for controlling the switching of outputs of the signal output switching means according to an output rule which is programmed in advance, a digital signal conversion means (corresponding to the A/D converter 3) for time-sequentially converting the light detection signals output from the signal output switching means from analog signals into digital signals, a servo error signal generating means (corresponding to the servo signal computing unit 13) for generating servo signals by carrying out operation processes of the plurality of circuit stages based on the light detection signals output from the digital signal conversion means, a transfer means (corresponding to the first and second interfaces 32 and 33) for transferring the servo error signals output from the servo error signal generating means, and an operation content modifying means (corresponding to the internal functions of the servo signal computing unit 13 described above in conjunction with FIG. 18) for modifying contents of the operation process of the servo error signal generating means.

Therefore, in the embodiments described above and according to the fourth aspect of the present invention, no circuit modification is required even when a modification is made to the structure of the portion which outputs the light detection signals, and the cost can be reduced by relaxing the specifications required of the portion which is provided with the plurality of light sources and light receiving elements to compatibly cope with a different kinds of light detection signals. It is also possible to reduce signal deterioration due to noise when transferring the signals on the FPC substrate, and reduce the number of signal lines required to transfer the light detection signals. Thus, it is also possible to easily realize an integrated circuit which is suited for being mounted on an optical pickup to process light detection signals output from light receiving elements and to realize an information recording and/or reproducing apparatus which uses such an integrated circuit.

Next, a description will be given of a fifth aspect of the present invention.

The fifth aspect of the present invention aims to solve the problems of the prior art which are basically the same as the problems the first through fourth aspects of the present invention aim to solve, by sharing the computing unit in common for generating the various servo error signals, and by not requiring a modification in the circuit structure even when the method of computing the servo error signals changes due to a modification in the structure of the optical pickup. The fifth aspect of the present invention enables sharing of the circuit in common for different methods of computing the servo error signals by compatibly coping with various media formats of the information recording medium.

According to the fifth aspect of the present invention, the signal processing method which carries out a signal processing related to a recording operation or a reproducing operation with respect to an information recording medium based on light detection signals which are output from a light receiving means which detects a light beam reflected from the information recording medium may be provided with a digital signal conversion step which converts the light detection signals into digital signals, a servo error signal computing step which generates servo error signals by carrying out a predetermined operation process with respect to the digital signals obtained in the digital signal conversion step, and an operation content modifying step which modifies contents of the predetermined operation process carried out in the servo error signal computing step. Hence, even when the structure of the optical pickup is modified and the method of computing the servo error signals changes, it is possible to cope with the modification by modifying the operation process.

The servo error signal computing step may include a multiplying step which multiplies a predetermined multiplying coefficient to each of the digital signals obtained in the digital signal conversion step, and an adding step which generates the servo error signals by adding each of the signals obtained by the multiplying step. In addition, the operation content modifying step may include a step which modifies the predetermined multiplying coefficient to modify contents of an operation process of the multiplying step. In this case, the servo error signals can be generated by a simple process.

The multiplying step may include a step which time-sequentially multiplies the predetermined multiplying coefficient to each of the digital signals, and the adding step may include a step which successively adds each of the signals obtained by the multiplying step. In this case, the servo error signals can be generated by a simple process.

The operation content modifying step and the servo error signal computing step may be repeated to time-sequentially generate the servo error signals. In this case, the same servo error signal computing step can be used in common for the various servo error signals, and the process of generating the servo error signals is further simplified.

It is possible to provide a processing step which carries out the operation content modifying step, the multiplying step and the adding step with respect to one of the digital signals obtained by the digital signal conversion step for each of the servo error signals, and successively carry out this processing step for each of the light detection signals. In this case, it is possible to successively start the operation process with respect to each of the light detection signals, without having to wait for the A/D conversion to end with respect to all of the light detection signals, and the processing time can be used efficiently.

It is possible to provide an offset adding step which adds an offset adjustment value to each of the digital signals obtained by the digital signal conversion step, and to input each of the signals added with the offset adjustment value by the offset adding step to the multiplying step. In this case, it is possible to carry out an accurate signal processing because the offset can be eliminated for each of the signals.

It is possible to provide an adjusting step which carries out at least one of an offset adjusting process and a gain adjusting process with respect to the servo error signals obtained by the adding step. In this case, a stable servo operation can be carried out accurately, because the necessary correction can be made even when the servo gain or the offset varies due to inconsistencies in the information recording medium or the optical pickup.

It is possible to provide a media format judging step which judges a media format of the information recording medium, and the operation content modifying step may modify the contents of the predetermined operation process depending on the media format judged by the media format judging step. In this case, it is possible to compatibly cope with a plurality of kinds of information recording media having different media formats, and also cope with the case where the method of computing the servo error signals differs among the different media formats.

Therefore, in the embodiments described above and according to the fifth aspect of the present invention, it is possible to share the computing unit in common for generating the various servo error signals, and to not require a modification in the circuit structure even when the method of computing the servo error signals changes due to a modification in the structure of the optical pickup. The fifth aspect of the present invention enables sharing of the circuit in common for different methods of computing the servo error signals by compatibly coping with various media formats of the information recording medium.

Further, the present invention is not limited to these embodiments, but various variations and modifications may be made without departing from the scope of the present invention.

What is claimed is:

1. A signal processing apparatus comprising:
   signal output switching means for inputting light detection signals and switching outputs to a plurality of kinds of circuit stages;
   temporary holding means for temporarily holding the light detection signals output from said signal output switching means;
   operation process means for carrying out an operation process of the plurality of kinds of circuit stages based on the light detection signals held by said temporary holding means; and
   programmable signal holding control means for generating hold signals for storing the light detection signals output from said signal output switching means in said temporary holding means according to a hold rule which is programmed in advance and controlling the holding of said temporary holding means based on the hold signals.

2. The signal processing apparatus as claimed in claim 1, wherein said signal holding control means includes means for generating the hold signals for time-sequentially storing one of the light detection signals output from said signal output switching means based on the hold rule which is programmed in advance and controlling the holding of said temporary holding means based on the hold signals.

3. A signal processing apparatus comprising:
   signal output switching means for switching output of analog light detection signals to a plurality of kinds of circuit stages;
   digital signal conversion means for time-sequentially converting the light detection signals output from said signal output switching means from analog signals into digital signals;
   a plurality of first holding means for temporarily holding the digital signals output from said digital signal conversion means;

operation process means for carrying out operation processes of the plurality of circuit stages based on the digital signals held by said first holding means;
a plurality of second holding means for temporarily holding the output signals of said operation process means; and
transfer means for transferring the output signals held by said second holding means or the light detection signals held by said first holding means and a portion of the output signals held by said second holding means.

4. A signal processing apparatus comprising:
signal output switching means for switching output of analog light detection signals to a plurality of kinds of circuit stages;
digital signal conversion means for time-sequentially converting the light detection signals output from said signal output switching means from analog signals into digital signals;
transfer means for transferring the light detection signals output from said digital signal conversion means;
operation process means for carrying out operation processes of the plurality of circuit stages based on the light detection signals transferred by said transfer means;
adjusting means for adjusting at least an offset or gain with respect to the light detection signals output from said signal output switching means; and
gain computing means for computing a gain adjustment value based on the light detection signals output from said digital signal conversion means or the output signals of said operation process means and resetting the gain adjustment value to said adjusting means.

5. The signal processing apparatus as claimed in claim 4, wherein said transfer means transfers the signals time-divisionally, and transfers both the light detection signals converted by said digital signal conversion means and control command signals.

6. The signal processing apparatus as claimed in claim 5, wherein said transfer means transfers only the control command signals when the light detection signal is not input or the input light detection signal does not need to be processed.

7. The signal processing apparatus as claimed in claim 4, further comprising: data conversion means for carrying out a data conversion which increases the number of bits depending on the offset adjustment value and the gain adjustment value of said adjusting means with respect to the light detection signals output from said digital signal conversion means, and supplying the converted data to said operation process means.

8. The signal processing apparatus as claimed in claim 4, wherein said transfer means includes means for carrying out serial data transfer.

9. A signal processing apparatus comprising:
signal output switching means for switching output of analog light detection signals to a plurality of kinds of circuit stages;
digital signal conversion means for time-sequentially converting the light detection signals output from said signal output switching means from analog signals into digital signals;
transfer means for transferring the light detection signals output from said digital signal conversion means;
operation process means for carrying out operation processes of the plurality of circuit stages based on the light detection signals transferred by said transfer means;
adjusting means for adjusting at least one of an offset and gain with respect to the light detection signals output from said signal output switching means;
adding means for successively adding a predetermined number of light detection signals of the light detection signals time-sequentially output from said digital signal conversion means; and
gain computing means for computing a gain adjustment value so that an output signal of said adding means approximately matches a predetermined target value which is set in advance and resets the gain adjustment value in said adjusting means.

10. The signal processing apparatus as claimed in claim 9, further comprising:
gain storing means for storing a predetermined gain adjustment value which is computed in advance with respect to said adjusting means; and
gain adjustment value selecting means for switching and selecting one of the gain adjustment values from said gain storing means and said gain computing means to reset the selected gain adjustment value in said adjusting means.

11. The signal processing apparatus as claimed in claim 9, further comprising: means for reading a present value of the gain adjustment value computed by said gain computing means.

12. A signal processing apparatus comprising:
signal output switching means for switching output of analog light detection signals to a plurality of kinds of circuit stages;
signal output switching control means for controlling the switching of outputs of said signal output switching means according to an output rule which is programmed in advance;
digital signal conversion means for time-sequentially converting the light detection signals output from said signal output switching means from analog signals into digital signals;
a plurality of first holding means for temporarily holding the digital signals output from said digital signal conversion means;
operation process means for carrying out operation processes of the plurality of circuit stages based on the light detection signals held by said first holding means;
a plurality of second holding means for temporarily holding the output signals of said operation process means; and
transfer means for transferring the output signals held by said second holding means or the light detection signals held by said first holding means and a portion of the output signals held by said second holding means.

13. The signal processing apparatus as claimed in claim 12, wherein said signal output switching means includes means for inputting the light detection signals and switching the outputs to the plurality of kinds of circuit stages by controlling ON/OFF states of switches.

14. The signal processing apparatus as claimed in claim 13, wherein said signal output switching control means includes means for generating selection signals for controlling the ON/OFF states of the switches based on the output rule and controlling the switching of the outputs of said signal output switching means based on the selection signals.

15. The signal processing apparatus as claimed in claim 14, further comprising: time division number setting means for setting a number of time divisions when carrying out time-sequential processes.

16. The signal processing apparatus as claimed in claim 12, further comprising: sample and hold means for sampling and holding the light detection signals at the same timing and inputting the light detection signals to said signal output switching means.

17. The signal processing apparatus as claimed in claim 12, further comprising:
current-to-voltage conversion means for converting a current signal into a voltage signal;
voltage buffer means for buffering and outputting the voltage signal; and
selecting means for selectively inputting to said signal output switching means the light detection signal output from said current-to-voltage conversion means if each of the light detection signal is a current signal and the light detection signal output from said voltage buffer means if each of the light detection signals is a voltage signal.

18. The signal processing apparatus as claimed in claim 12, further comprising: polarity selecting means for selecting a polarity of each of the light detection signals and inputting the light detection signals with the selected polarity to said signal output switching means.

19. The signal processing apparatus as claimed in claim 12, further comprising: add-subtract means for adding or subtracting combinations of the light detection signals output from said signal output switching means.

20. The signal processing apparatus as claimed in claim 19, further comprising: means for carrying out a predetermined operation process with respect to the light detection signals which are subjected to an add-subtract operation in said add-subtract means.

21. A signal processing apparatus comprising:
digital signal conversion means for time-sequentially converting the light detection signals output from said signal output switching means from analog signals into digital signals;
transfer means for transferring the light detection signals output from said digital signal conversion means; and
operation process means for carrying out operation processes of the plurality of circuit stages based on the light detection signals transferred by said transfer means;
a plurality of first holding means for temporarily holding the digital signals output from said digital signal conversion means;
operation process means for carrying out operation processes of the plurality of circuit stages based on the light detection signals held by said first holding means;
a plurality of second holding means for temporarily holding the output signals of said operation process means; and
transfer means for transferring the output signals held by said second holding means or the light detection signals held by said first holding means and a portion of the output signals held by said second holding means.

22. A signal processing apparatus comprising:
analog signal processing means for inputting analog light detection signals and carrying out an analog signal processing in an RF signal band;
signal output switching means for switching output of the analog light detection signals and the light detection signals output from said analog signal processing means to a plurality of kinds of circuit stages;
signal output switching control means for controlling the switching of outputs of said signal output switching means according to an output rule which is programmed in advance; and
digital signal conversion means for time-sequentially converting the light detection signals output from said signal output switching means from analog signals into digital signals;
a plurality of first holding means for temporarily holding the digital signals output from said digital signal conversion means;
operation process means for carrying out operation processes of the plurality of circuit stages based on the light detection signals held by said first holding means;
a plurality of second holding means for temporarily holding the output signals of said operation process means; and
transfer means for transferring the output signals held by said second holding means or the light detection signals held by said first holding means and a portion of the output signals held by said second holding means.

23. A signal processing apparatus comprising:
signal output switching means for switching output of analog light detection-signals to a plurality of kinds of circuit stages;
digital signal conversion means for time-sequentially converting the light detection signals output from said signal output switching means from analog signals into digital signals;
transfer means for transferring the light detection signals output from said digital signal conversion means;
temporary holding means for temporarily holding the light detection signals transferred by said transfer means;
operation process means for carrying out operation processes of the plurality of circuit stages based on the light detection signals held by said temporary holding means; and
programmable signal holding control means for generating hold signals for storing the light detection signals output from said signal output switching means in said temporary holding means according to a hold rule which is programmed in advance and controlling the holding of said temporary holding means based on the hold signals.

24. A signal processing apparatus comprising:
signal output switching means for switching output of analog light detection signals to a plurality of kinds of circuit stages;
digital signal conversion means for time-sequentially converting the light detection signals output from said signal output switching means from analog signals into digital signals;
a plurality of first holding means for temporarily holding the digital signals output from said digital signal conversion means;
signal holding control means for generating hold signals for storing the light detection signals output from said signal output switching means in said first holding means according to a hold rule which is programmed in advance and controlling the holding of said first holding means based on the hold signals;
operation process means for carrying out operation processes of the plurality of circuit stages based on the light detection signals held by said first holding means;

a plurality of second holding means for temporarily holding the output signals of said operation process means; and transfer means for transferring the output signals held by said second holding means or the light detection signals held by said first holding means and a portion of the output signals held by said second holding means.

25. A signal processing apparatus comprising:

analog signal processing means for inputting analog light detection signals and carrying out an analog signal processing in an RF signal band;

signal output switching means for switching output of the analog light detection signals and the light detection signals output from said analog signal processing means to a plurality of kinds of circuit stages;

digital signal conversion means for time-sequentially converting the light detection signals output from said signal output switching means from analog signals into digital signals;

transfer means for transferring the light detection signals output from said digital signal conversion means;

temporary holding means for temporarily holding the light detection signals transferred by said transfer means;

operation process means for carrying out operation processes of the plurality of circuit stages based on the light detection signals held by said temporary holding means; and programmable signal holding control means for generating hold signals for storing the light detection signals output from said signal output switching means in said temporary holding means according to a hold rule which is programmed in advance and controlling the holding of said temporary holding means based on the hold signals.

26. A signal processing apparatus comprising:

signal output switching means for switching output of analog light detection signals to a plurality of kinds of circuit stages;

temporary holding means for temporarily holding the light detection signals output from said signal output switching means;

programmable signal holding control means for generating hold signals for storing the light detection signals output from said signal output switching means in said temporary holding means according to a hold rule which is programmed in advance and controlling the holding of said temporary holding means based on the hold signals;

servo error signal generating means for generating servo signals by carrying out operation processes of the plurality of circuit stages based on the light detection signals held by said temporary holding means; and operation content modifying means for modifying contents of the operation process of said servo error signal generating means.

* * * * *